(12) United States Patent
Wittenbreder

(10) Patent No.: US 6,198,260 B1
(45) Date of Patent: Mar. 6, 2001

(54) ZERO VOLTAGE SWITCHING ACTIVE RESET POWER CONVERTERS

(75) Inventor: Ernest H. Wittenbreder, Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 0 days.

(21) Appl. No.: 09/587,598

(22) Filed: Jun. 5, 2000

(51) Int. Cl.[7] .................................................. G05F 1/59
(52) U.S. Cl. ............................ 323/271; 323/282; 363/16
(58) Field of Search ................................... 323/271, 282, 323/351; 363/16, 20, 21

(56) References Cited

U.S. PATENT DOCUMENTS

| | | | |
|---|---|---|---|
| 4,857,822 | * 8/1989 | Tabisz et al. | 323/282 |
| 4,931,716 | * 6/1990 | Jovanovic et al. | 323/271 |
| 5,057,986 | * 10/1991 | Henze et al. | 363/20 |
| 5,066,900 | * 11/1991 | Bassett | 323/282 |
| 5,173,846 | * 12/1992 | Smith | 363/20 |
| 5,402,329 | 3/1995 | Wittenbreder | 363/16 |
| 5,636,106 | * 6/1997 | Batarseh et al. | 363/16 |
| 5,736,842 | * 4/1998 | Jovanovic et al. | 363/21 |
| 5,959,438 | * 9/1999 | Jovanovic et al. | 363/21 |
| 6,051,961 | * 4/2000 | Jang et al. | 323/271 |
| 6,069,803 | * 5/2000 | Cross | 363/21 |

OTHER PUBLICATIONS

Henze, Martin, and Parsley, "Zero Voltage Switching in High Frequency Power Converters Using Pulse Width Modulation," 1988, pp.1–8.

* cited by examiner

*Primary Examiner*—Jeffrey Sterrett

(57) ABSTRACT

A generalized active reset switching network using a small choke, a pair of switches, and a capacitor is revealed. The application of the generalized active reset switching network to any of a wide variety of hard switching power converter topologies yields equivalent power converters with zero voltage switching properties, without the requirement that the magnetizing current in the main power choke be reversed during each switching cycle. In the subject invention the energy required to drive the critical zero voltage switching transition is provided by the small choke that forms part of the generalized active reset switching network. The application of the generalized active reset switching network to buck, boost, buck boost, Cuk, and SEPIC converters is shown. A variation of the generalized active reset switching network which adds a single diode to clamp ringing associated with the parasitic capacitance of off switches is also revealed.

8 Claims, 68 Drawing Sheets

Figure 4 and Figure 9 Connections for Buck, Boost, and Buck Boost Converter Topologies

|   | Buck | Boost | Buck Boost |
|---|---|---|---|
| A | Input Positive Termnal | Input Negative Terminal | Input Positive Terminal |
| B | Input Negative Terminal or Output Negative Terminal | Output Positive Terminal | Output Negative Terminal |
| C | Input Negative Terminal or Output Negative Terminal | Output Positive Terminal | Output Negative Terminal |
| D | Output Positive Terminal | Input Positive Terminal | Input Negative Terminal or Output Positive Terminal |
| E | Input Positive Terminal | Input Negtive Terminal | Input Positive Terminal |

Table 1

ZERO VOLTAGE SWITCHING ACTIVE
RESET POWER CONVERTERS

This invention was revealed in Disclosure Document Nr. 460,697 filed Aug. 16, 1999.

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter, when the switch is in the on state, the voltage across the switch is zero, so the power loss is zero. When the switch is in the off state, the power loss is zero, because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The energy lost in each switching transition is equal to the time integral of the product of switch voltage and switch current. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode when the capacitor's voltage is zero. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element, such as an inductor or transformer, and turning on the switch after the parallel diode has begun to conduct. During the turn on transition the voltage across the switch is held at zero, clamped by the parallel diode. The various zero voltage switching (ZVS) techniques differ in the control and modulation schemes used to accomplish regulation, in the energy storage mechanisms used to accomplish the zero voltage turn on transition, and in a few cases on some unique switch timing mechanisms.

One of the ZVS techniques uses an inductor or transformer with relatively low inductance so that the inductor current reverses sign during each switching cycle. An example of a buck converter with this property is shown in FIG. 1 and its wave forms are illustrated in FIG. 2. One advantage of this technique is that the switching transitions are all zero voltage transitions driven by the stored energy and current in the inductor. Another advantage is that the inductor can be made small and the inductance needs to be small in order that the current can be reversed during each switching cycle. The disadvantages are that the output current reverses each cycle so that the output capacitor must be relatively large and must store a substantial amount of energy and be able to accommodate the large ripple currents. Although the inductor can be made smaller because the inductance is reduced, the size reduction of the inductor is not as large as might be suggested by the reduction in inductance value. In a typical hard switching buck converter the output choke would be saturation limited. Its core losses would be small by comparison to its copper losses. With a small value inductor with large current swings the inductor will more likely be core loss limited, so that the cross section, the core gap, and the number of turns would need to be increased to reduce the flux swing and associated core losses. Also, in the typical hard switching buck converter in which the inductor current has a large DC component and a small AC component the AC copper winding losses are typically very small. In the FIG. 1 circuit the issue of AC winding losses must be addressed by suitable magnetic circuit element design (Litz wire or properly placed and oriented copper foil or strip) or AC winding losses will be substantial. Another disadvantage of the small inductance value technique is that there will be much higher peak currents in the choke winding and in the switches which will result in additional conduction losses in those elements. Another disadvantage of the small inductance value technique is that the energy and current available to drive the zero voltage transitions decreases as the load current increases so that in an over load condition there may be no energy available to drive a zero voltage transition and there may be substantial switching losses at the same time that the conduction losses are at their highest levels. In general, almost any power converter can be made to have zero voltage switching by this mechanism. That is, almost any power converter can be designed so that the current in its principal magnetic circuit element(s) reverses each cycle so that the stored energy in its magnetic storage element(s) is directed in a way which will enable a zero voltage transition on every switching transition.

OBJECTS AND ADVANTAGES

An object of the subject invention is to provide a power converter which is relatively simple and is capable of delivering high output power at high efficiencies and high switching frequencies.

Another object is to provide a converter design with minimal snubber requirements and superior EMI performance.

Another object is to provide a simple resonant transition converter design that can be readily used with the single frequency pulse width modulated controller integrated circuits.

Another object is to provide a resonant switching transition mechanism which can be designed to provide zero voltage switching over the full range of line voltage and load conditions.

Another object is to provide a generalized resonant switching mechanism that can be applied to a wide variety of simple non-isolated and isolated converter topologies.

Another object is to provide a high power conversion scheme with reduced conduction losses.

Another object is to provide a high frequency soft switching converter with low output filter capacitor requirements.

Further objects and advantages of my invention will become apparent from a consideration of the drawings and ensuing description.

These and other objects of the invention are provided by a novel circuit technique that uses a generalized active reset switching cell consisting of two switches, a reset capacitor, and a small resonator choke. The critical zero voltage switching transitions are accomplished using the stored magnetic energy in the small resonator choke.

Figure 4:
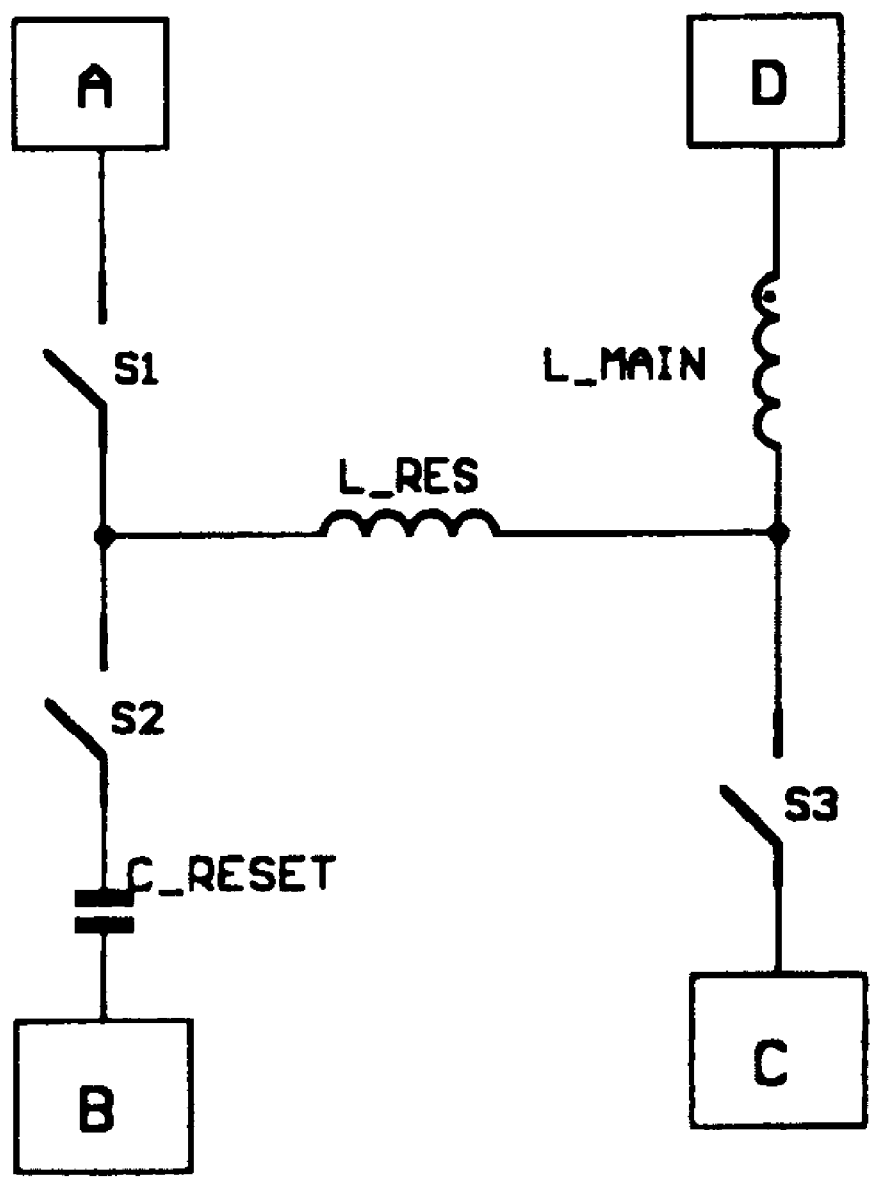
FIG. 4 illustrates a generalized single main choke converter using the generalized active reset switching cell of FIG. 3.

Table 1 indicates how the terminals of the FIG. 4 circuit are connected to from buck, boost, and buck boost converters.

Figure 5:
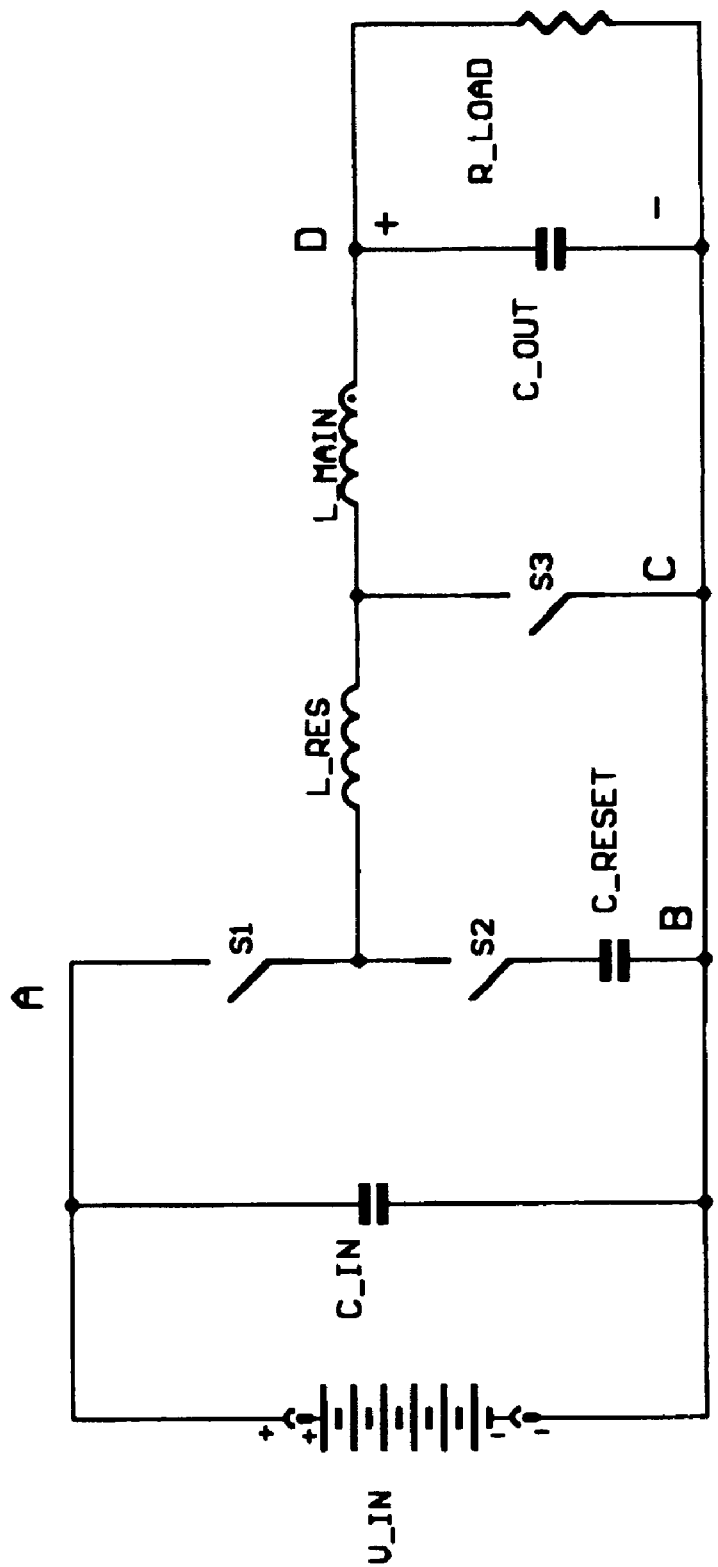

FIG. 5 illustrates the FIG. 4 circuit with the terminals connected to form a buck converter.

Figure 6:
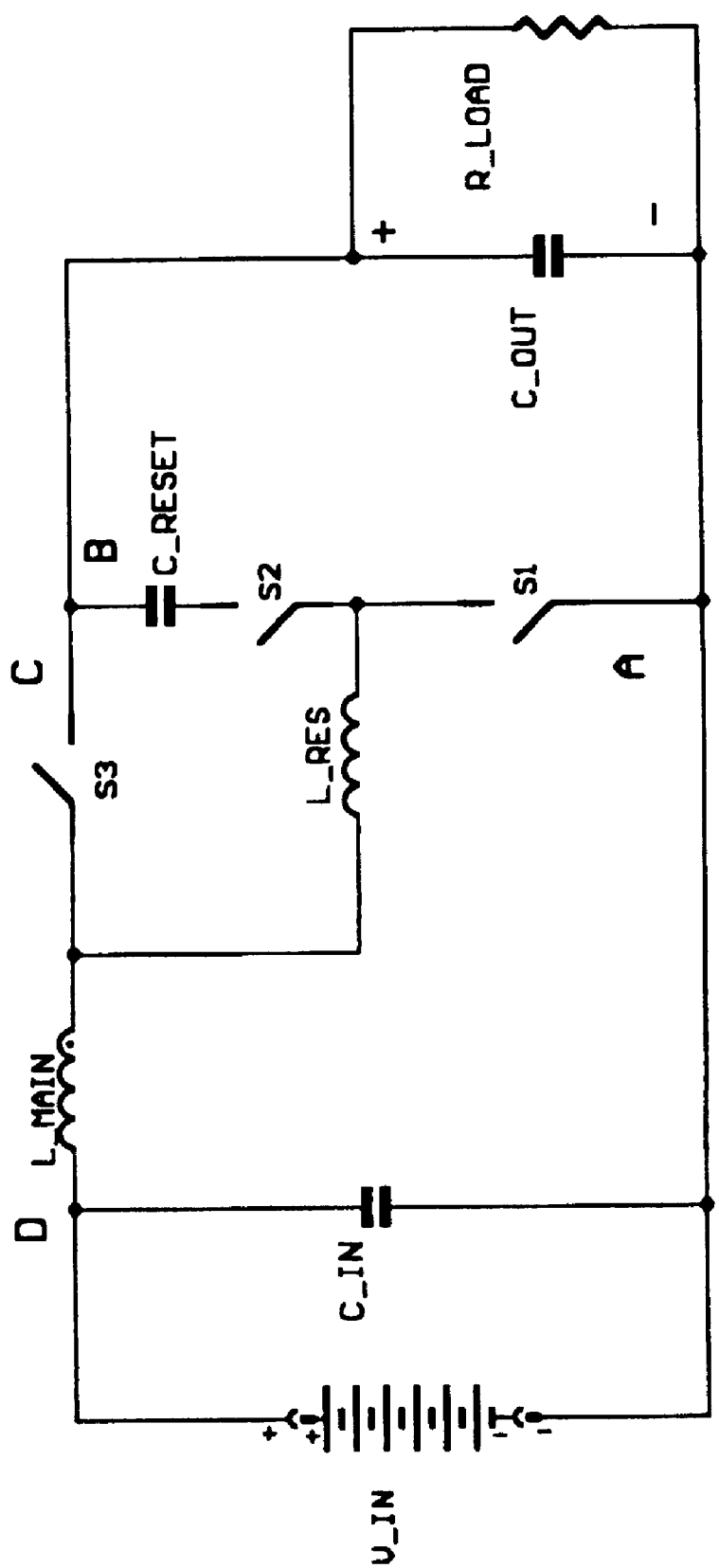

FIG. 6 illustrates the FIG. 4 circuit with the terminals connected to form a boost converter.

Figure 7:
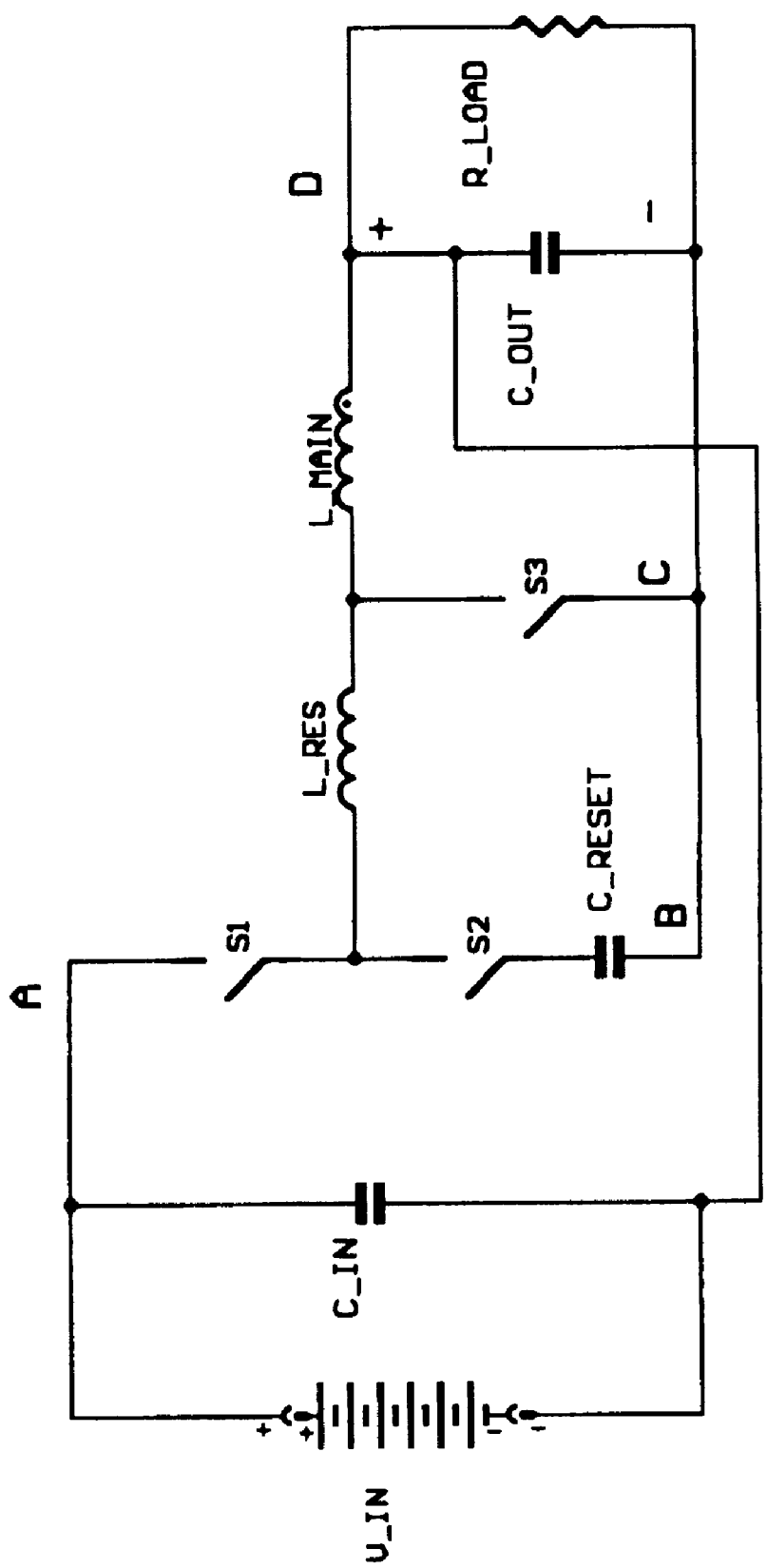

FIG. 7 illustrates the FIG. 4 circuit with the terminals connected to form a buck boost converter.

Figure 8:
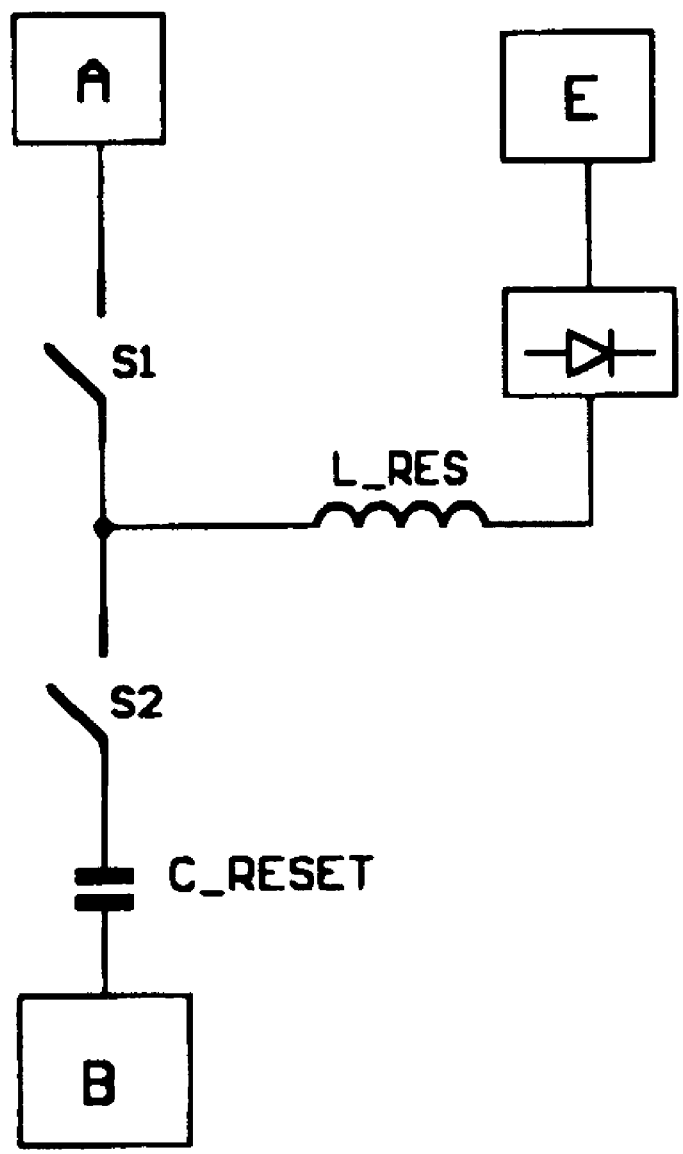

FIG. 8 illustrates the generalized active reset switching cell augmented by a rectifier whose purpose is to clamp ringing associated with the small inductor.

Figure 9:
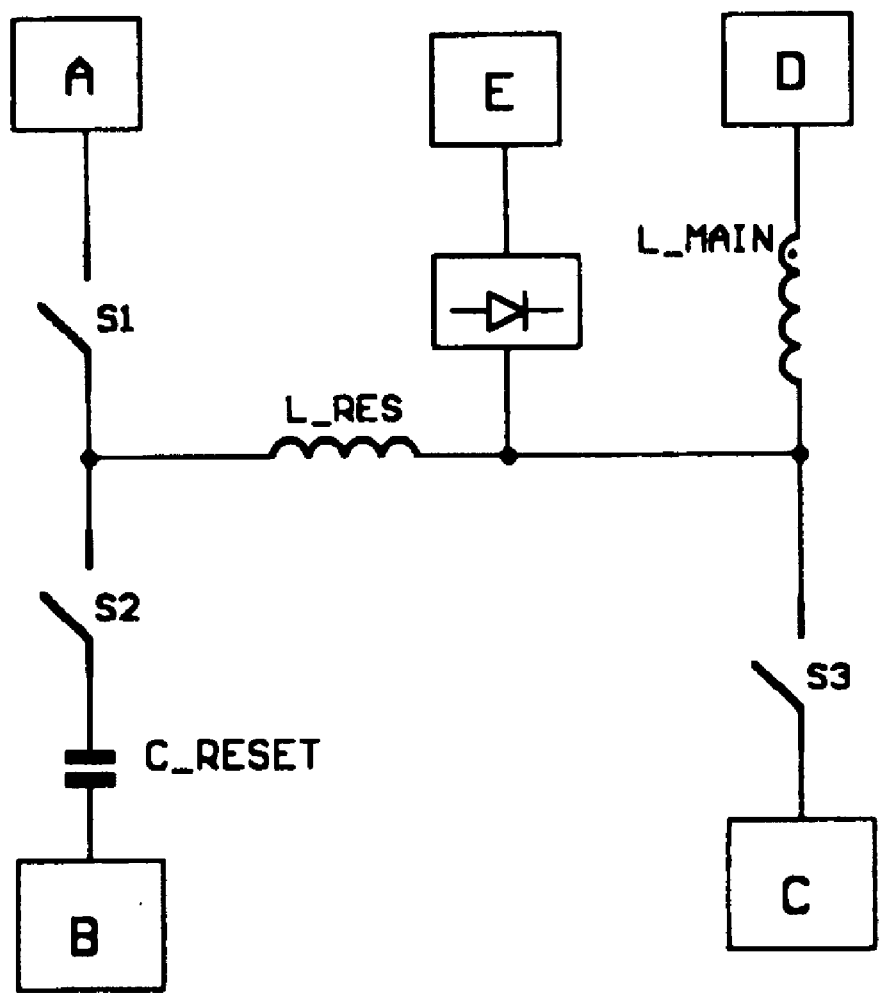

FIG. 9 illustrates a generalized single main choke power converter using the generalized active reset switching cell of FIG. 8.

Figure 10:
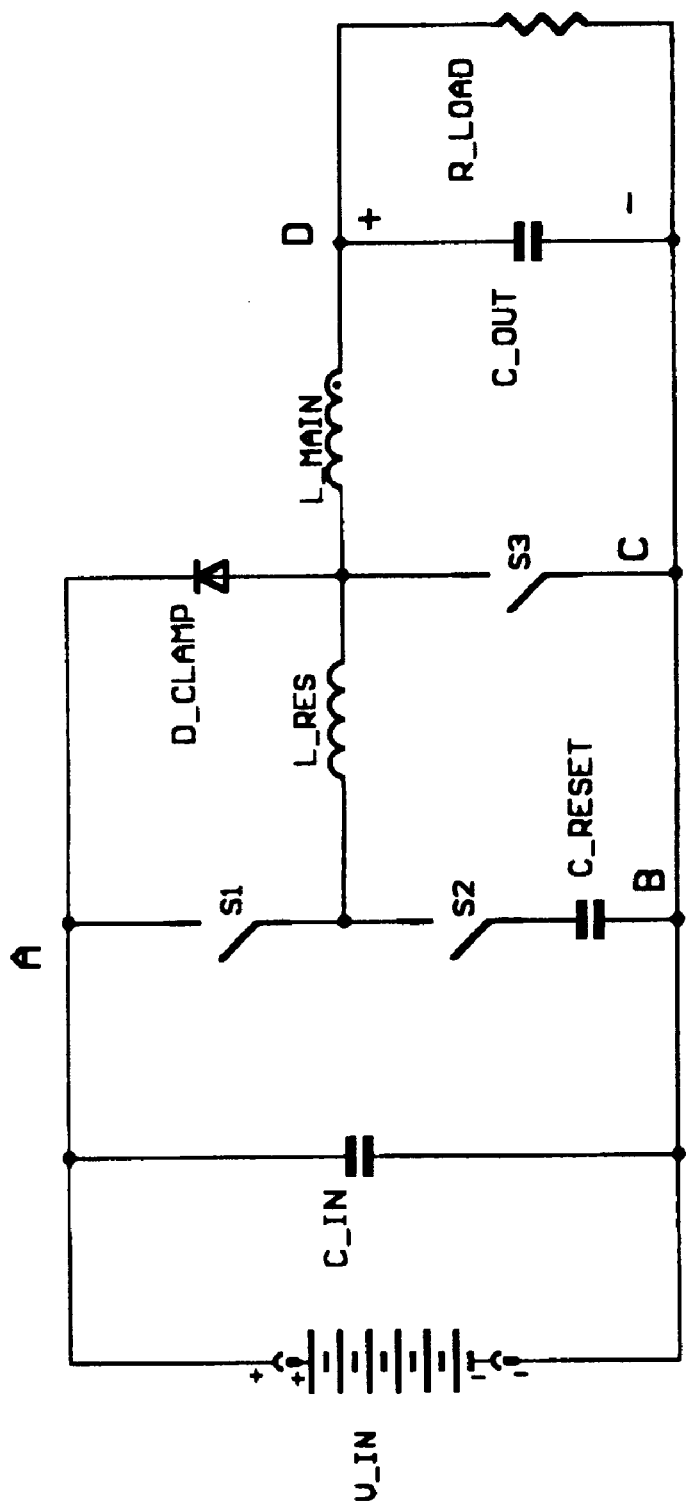

FIG. 10 illustrates the circuit of FIG. 9 with its terminals connected to form a buck converter.

Figure 11:
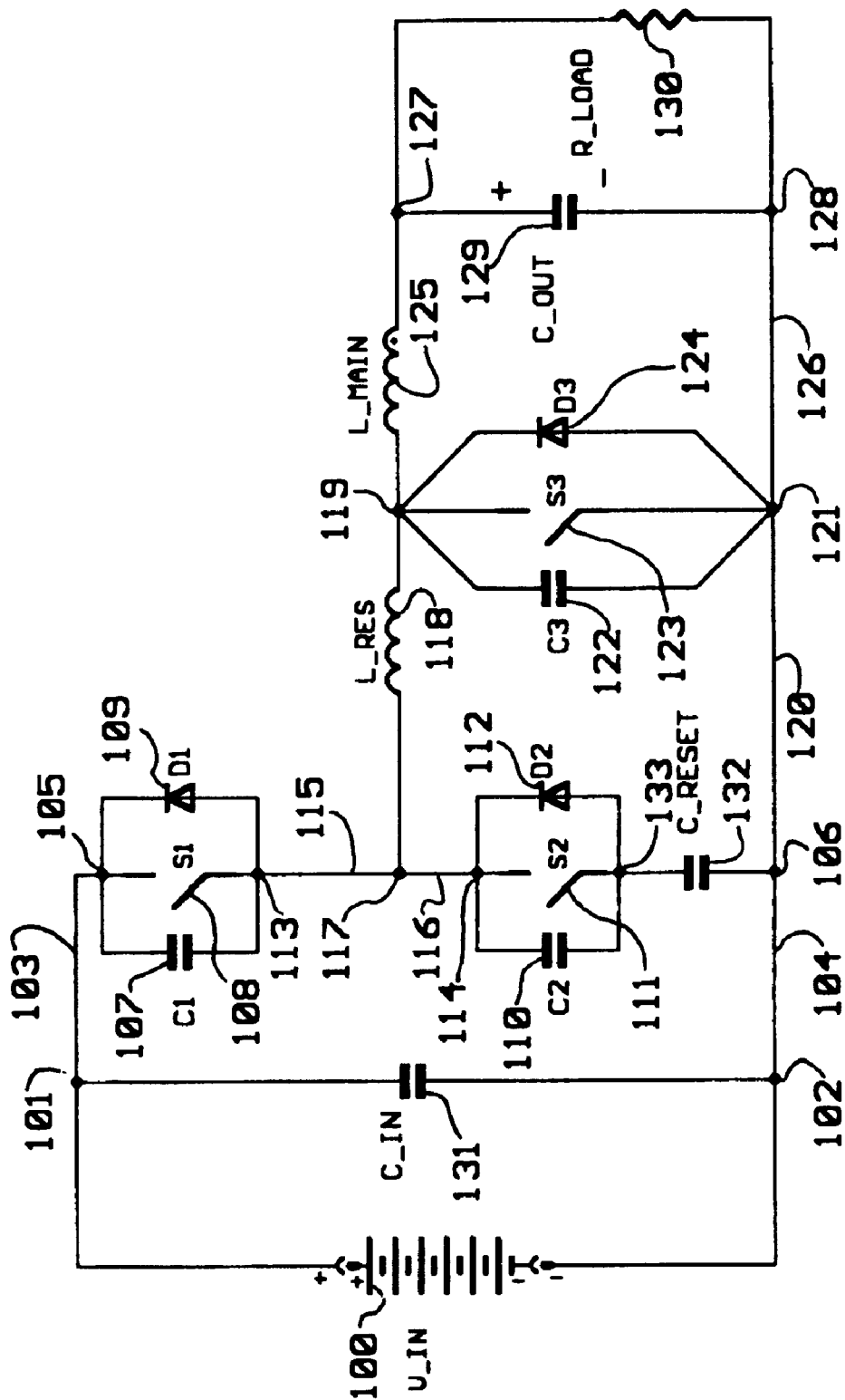

FIG. 11 illustrates a buck implementation of the subject invention.

Figure 12:
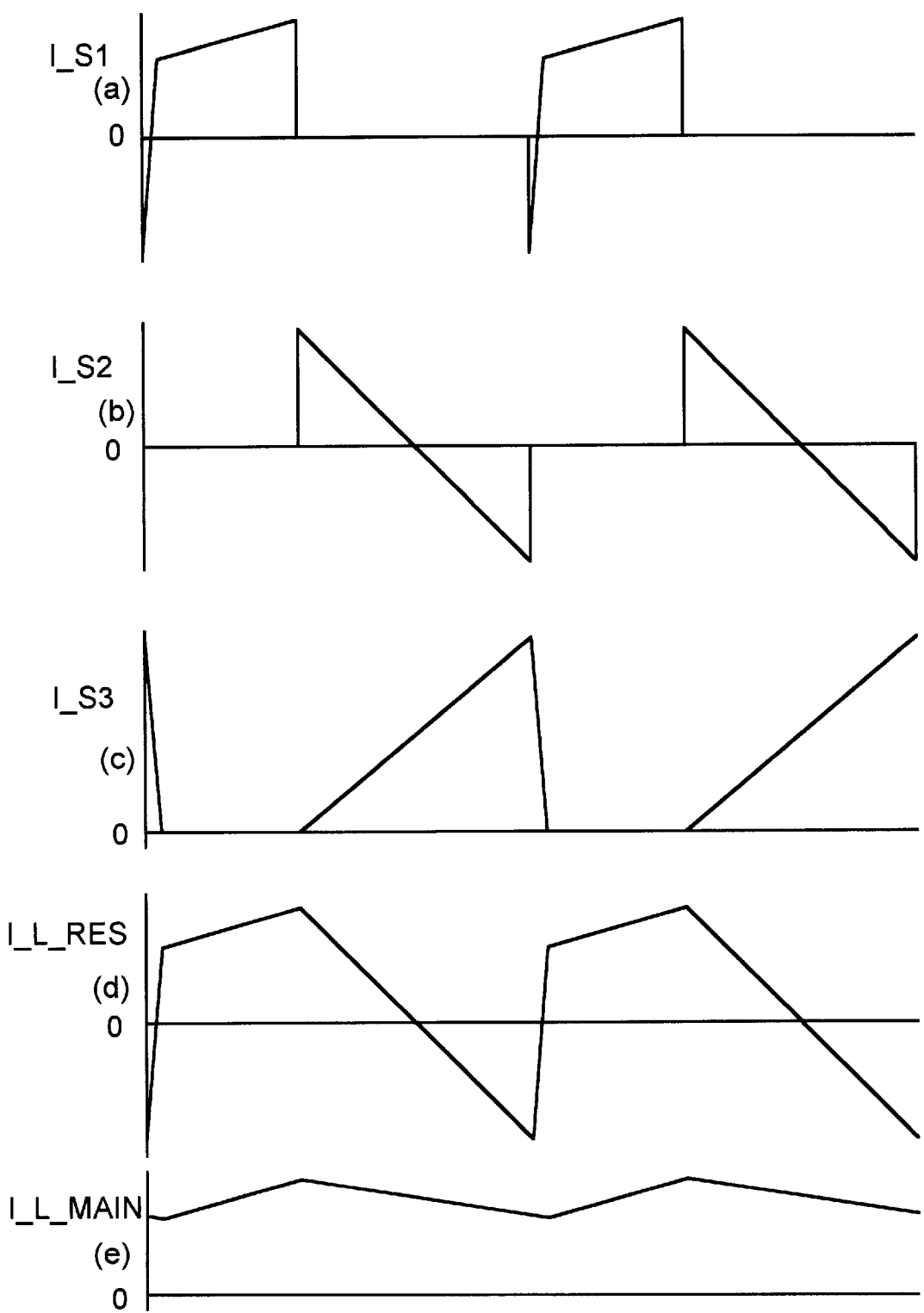

FIG. 12 illustrates switch and inductor current wave forms of the FIG. 11 circuit.

Figure 13:
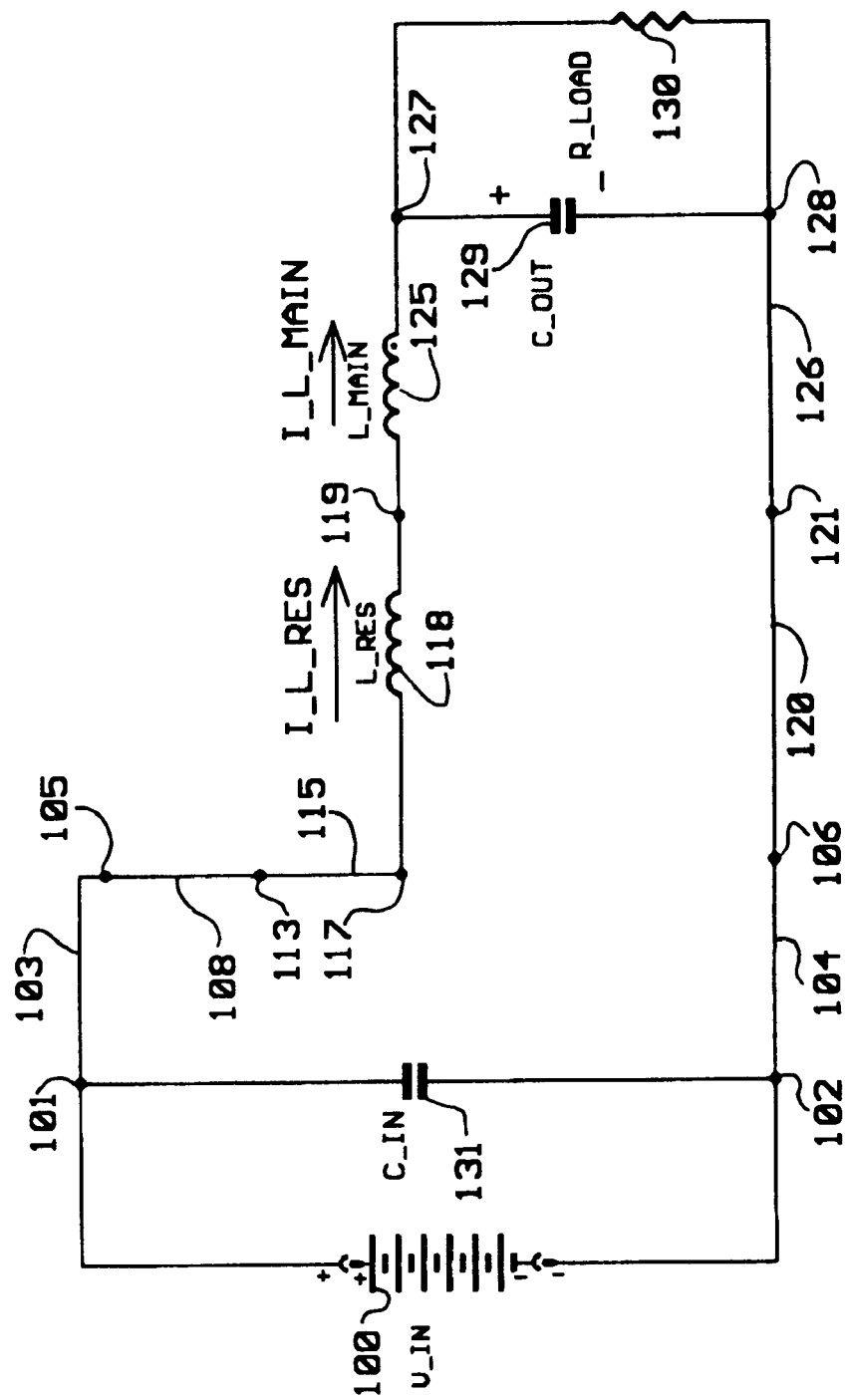

FIG. 13 illustrates an initial condition and on state of the FIG. 11 circuit.

Figure 14:
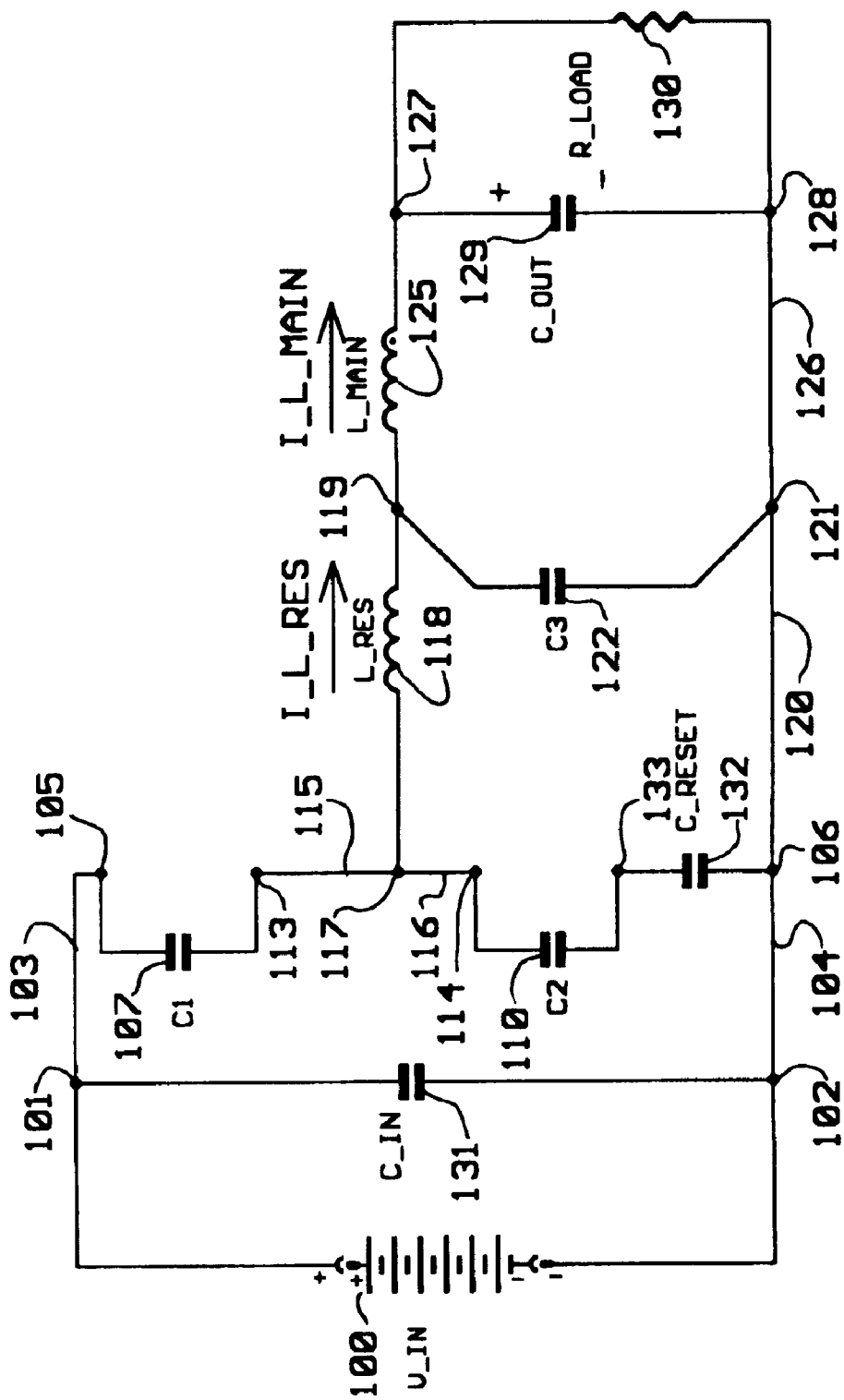

FIG. 14 illustrates a first phase of a turn off transition of the FIG. 11 circuit.

Figure 15:
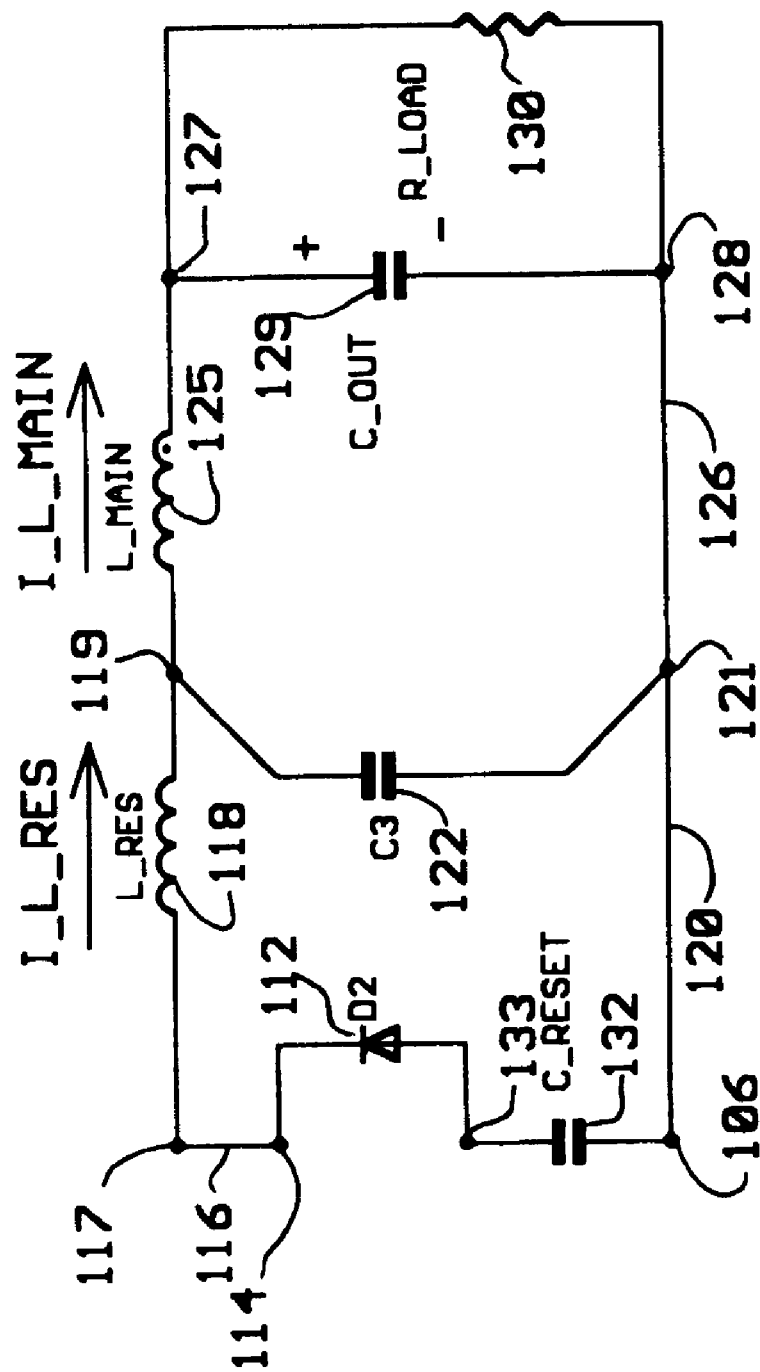

FIG. 15 illustrates a second phase of a turn off transition of the FIG. 11 circuit.

Figure 16:
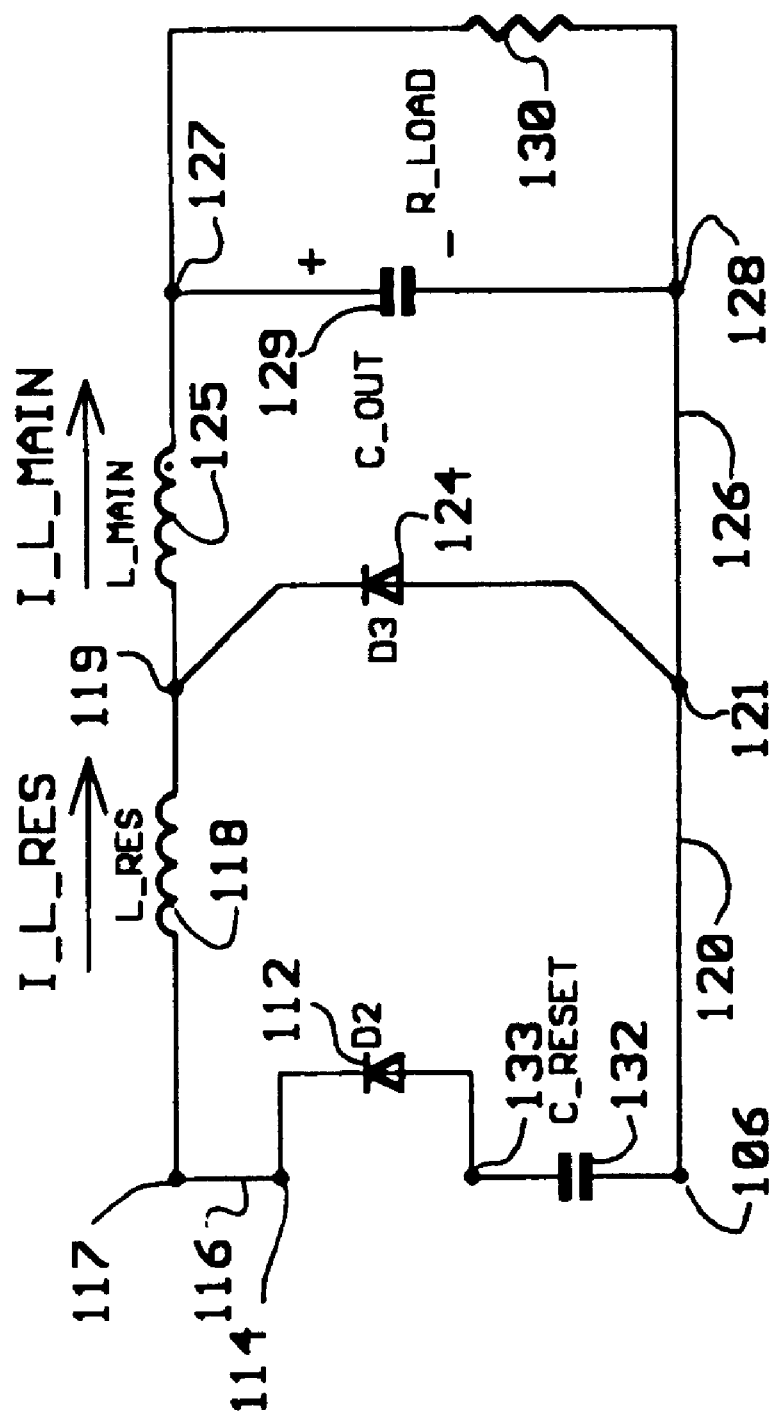

FIG. 16 illustrates a third phase of a turn off transition of the FIG. 11 circuit.

Figure 17:
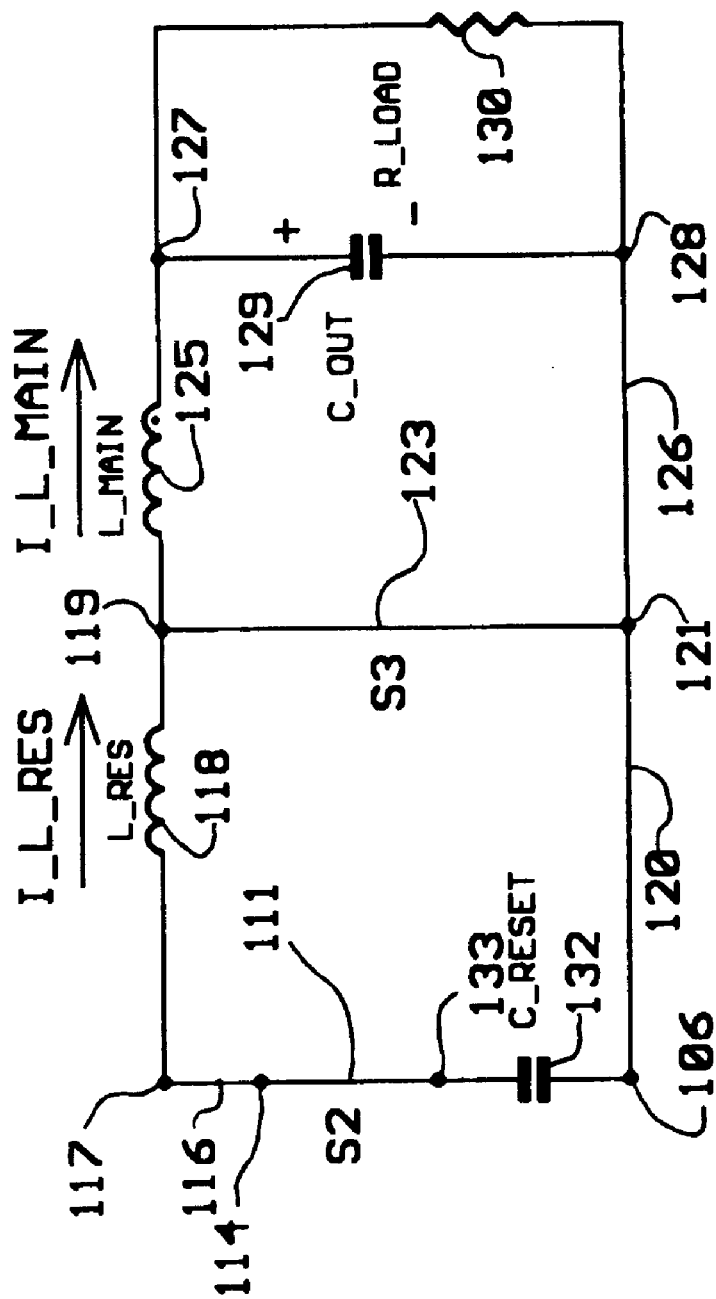

FIG. 17 illustrates the off state of the FIG. 11 circuit.

Figure 18:
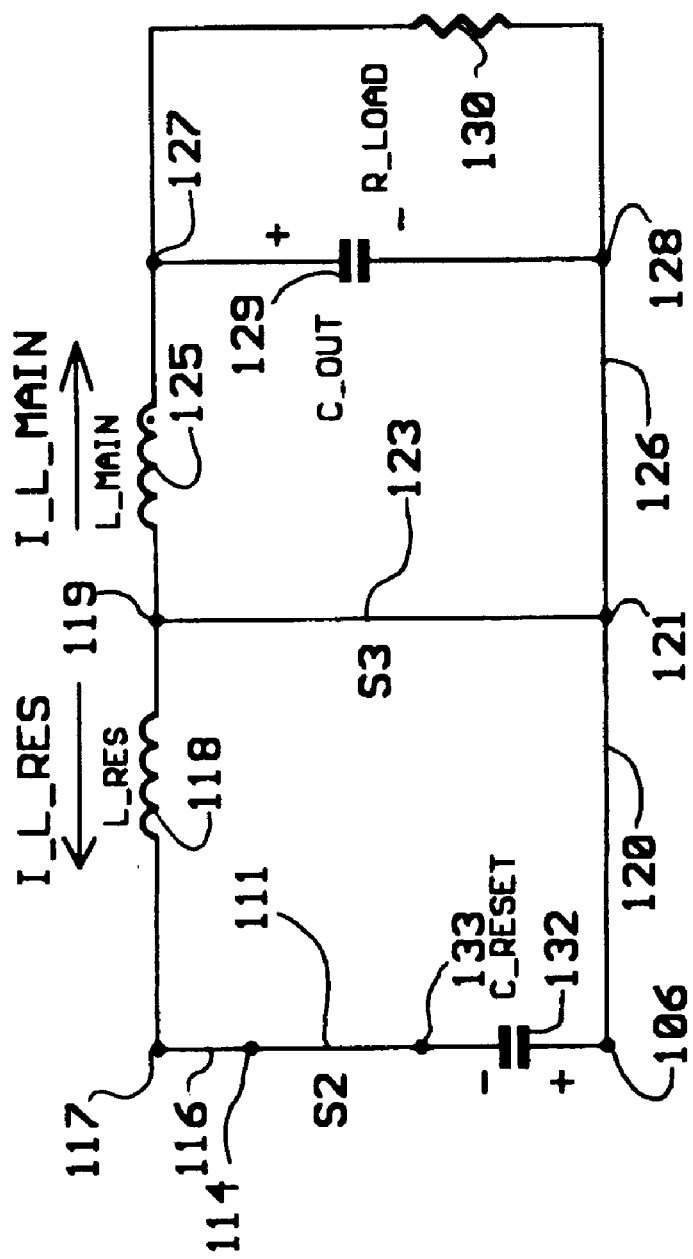

FIG. 18 is another illustration of the off state of the FIG. 11 circuit.

Figure 19:
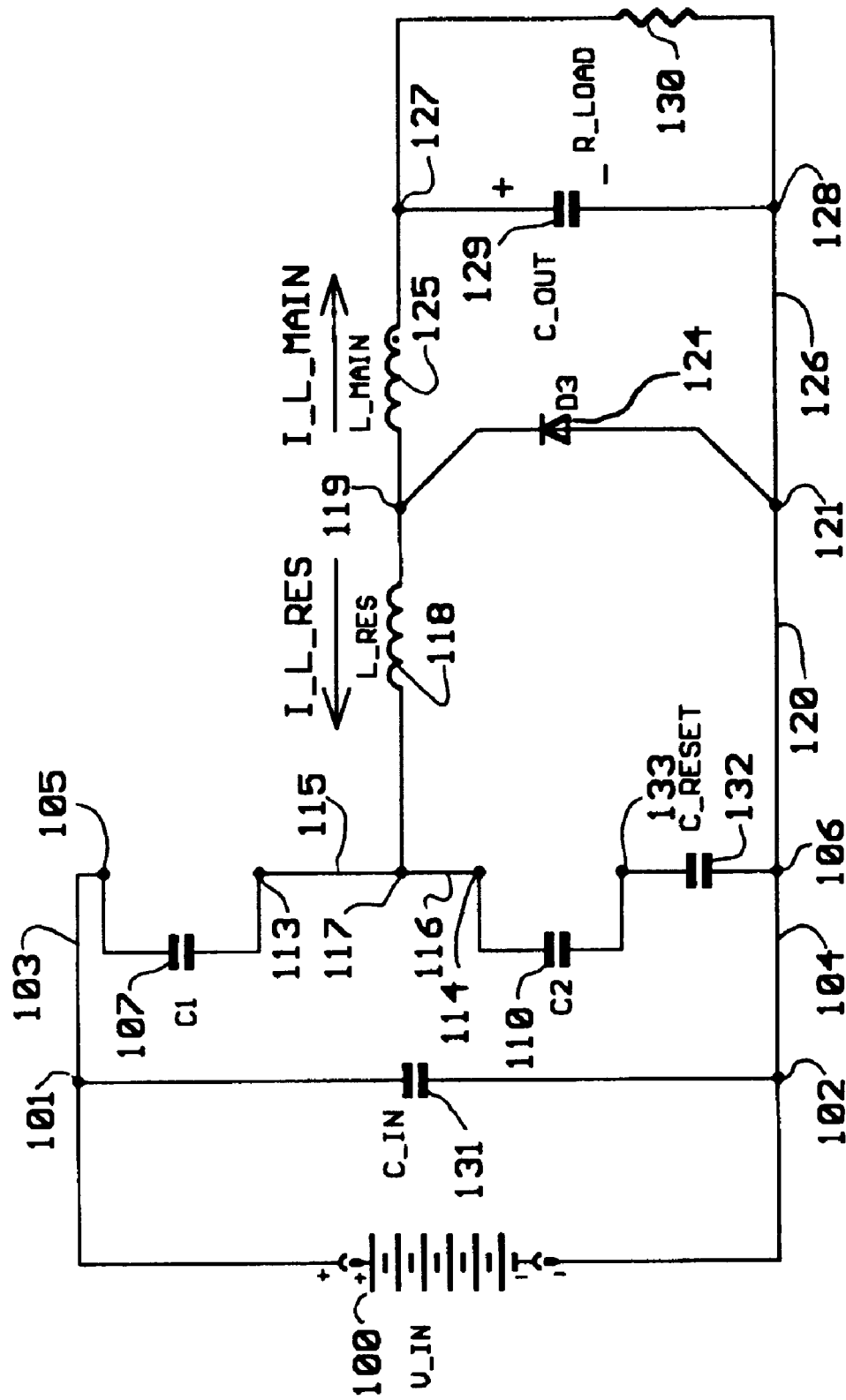

FIG. 19 illustrates a first phase of a turn on transition of the FIG. 11 circuit.

Figure 20:
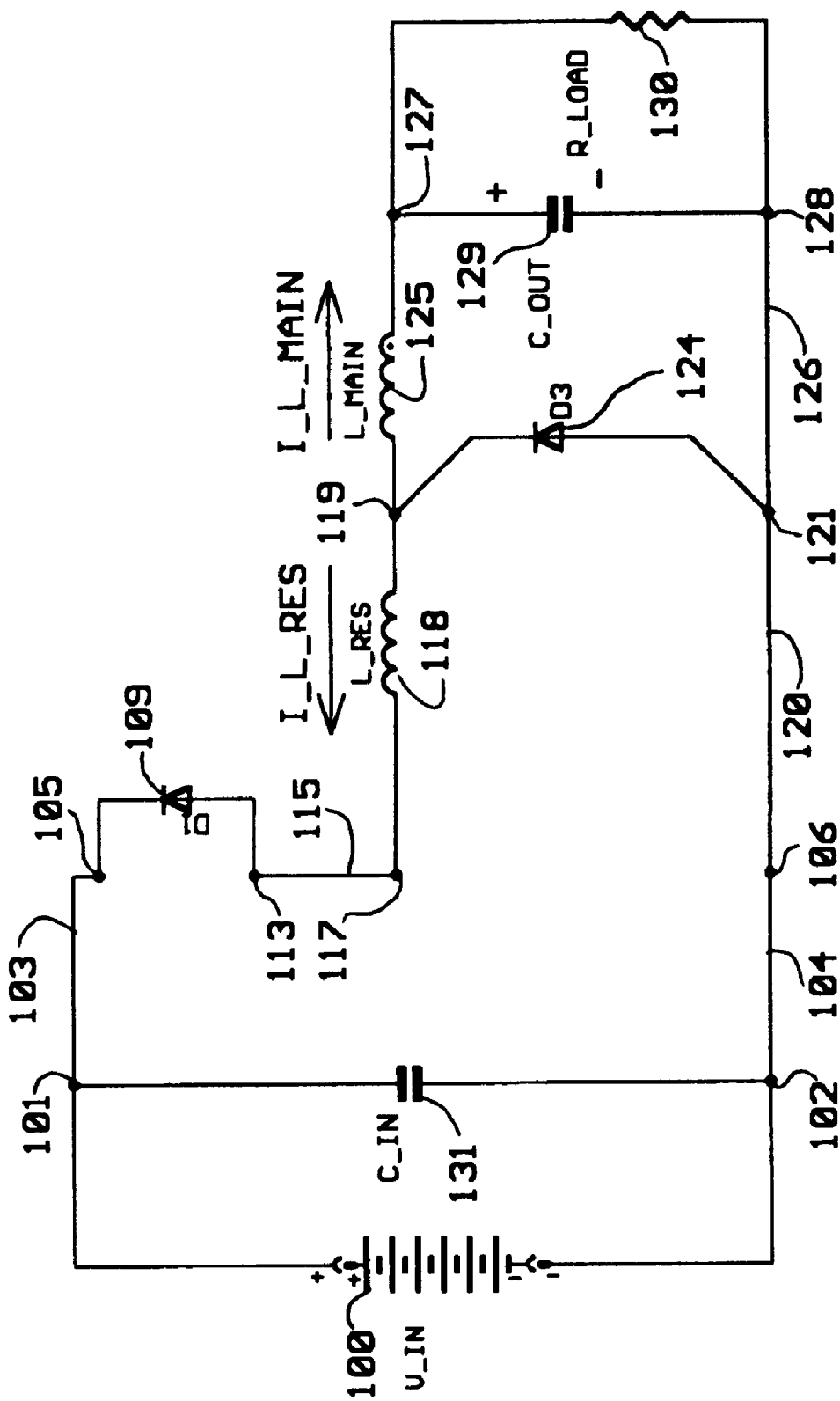

FIG. 20 illustrates a second phase of a turn on transition of the FIG. 11 circuit.

Figure 21:
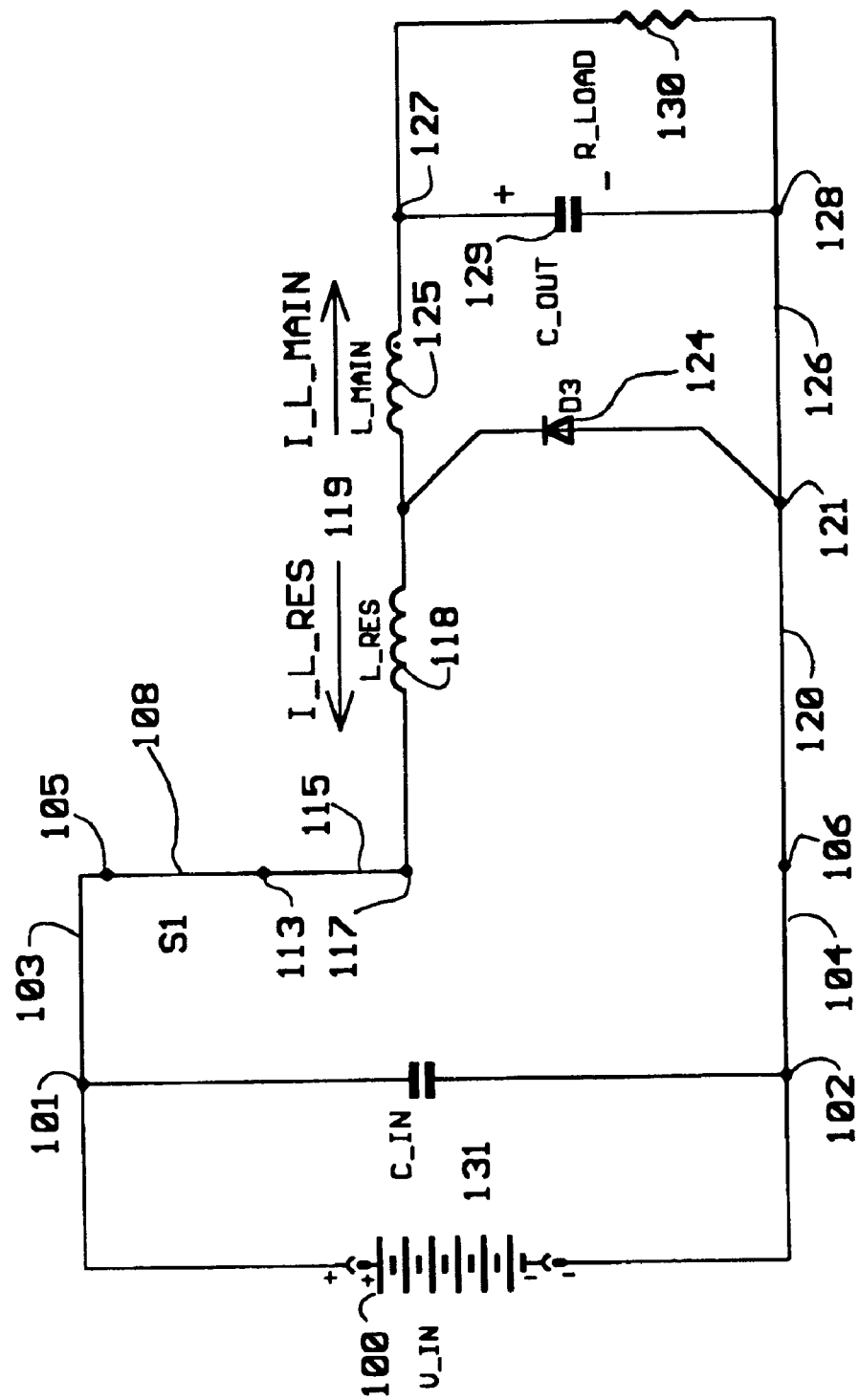

FIG. 21 illustrates a third phase of a turn on transition of the FIG. 11 circuit.

Figure 22:
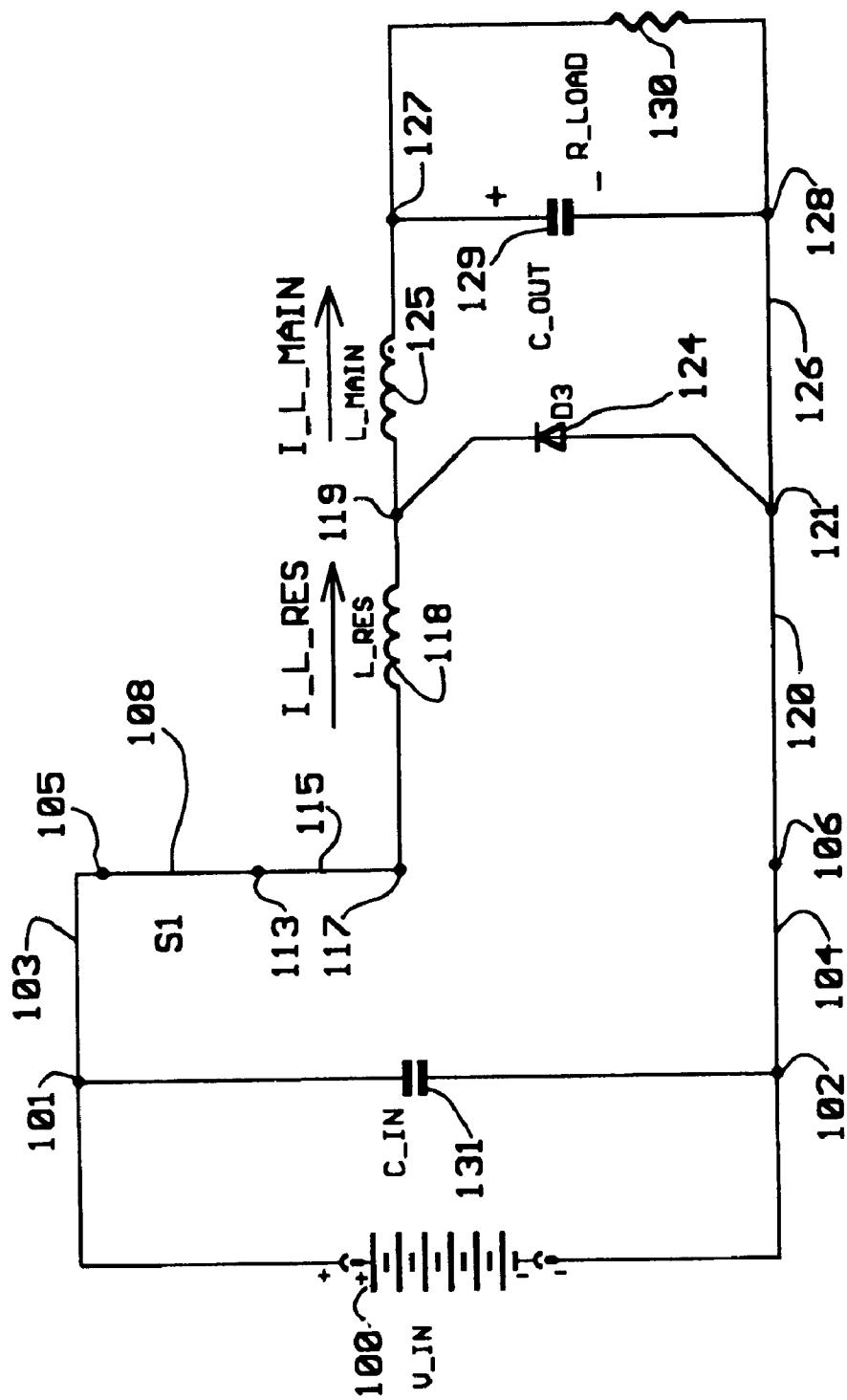

FIG. 22 illustrates a fourth phase of a turn on transition of the FIG. 11 circuit.

Figure 23:
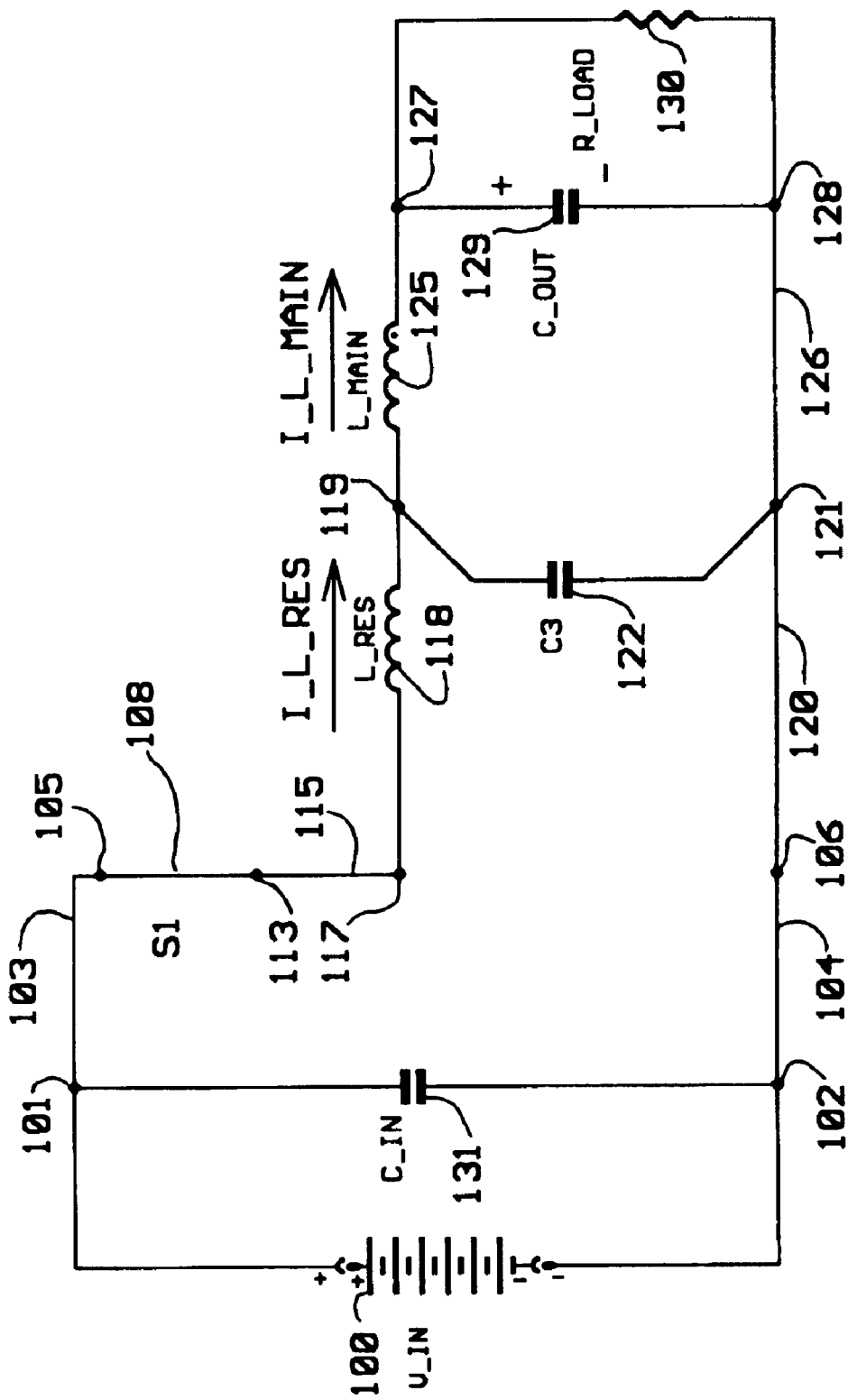

FIG. 23 illustrates a fifth phase of a turn on transition of the FIG. 11 circuit.

Figure 24:
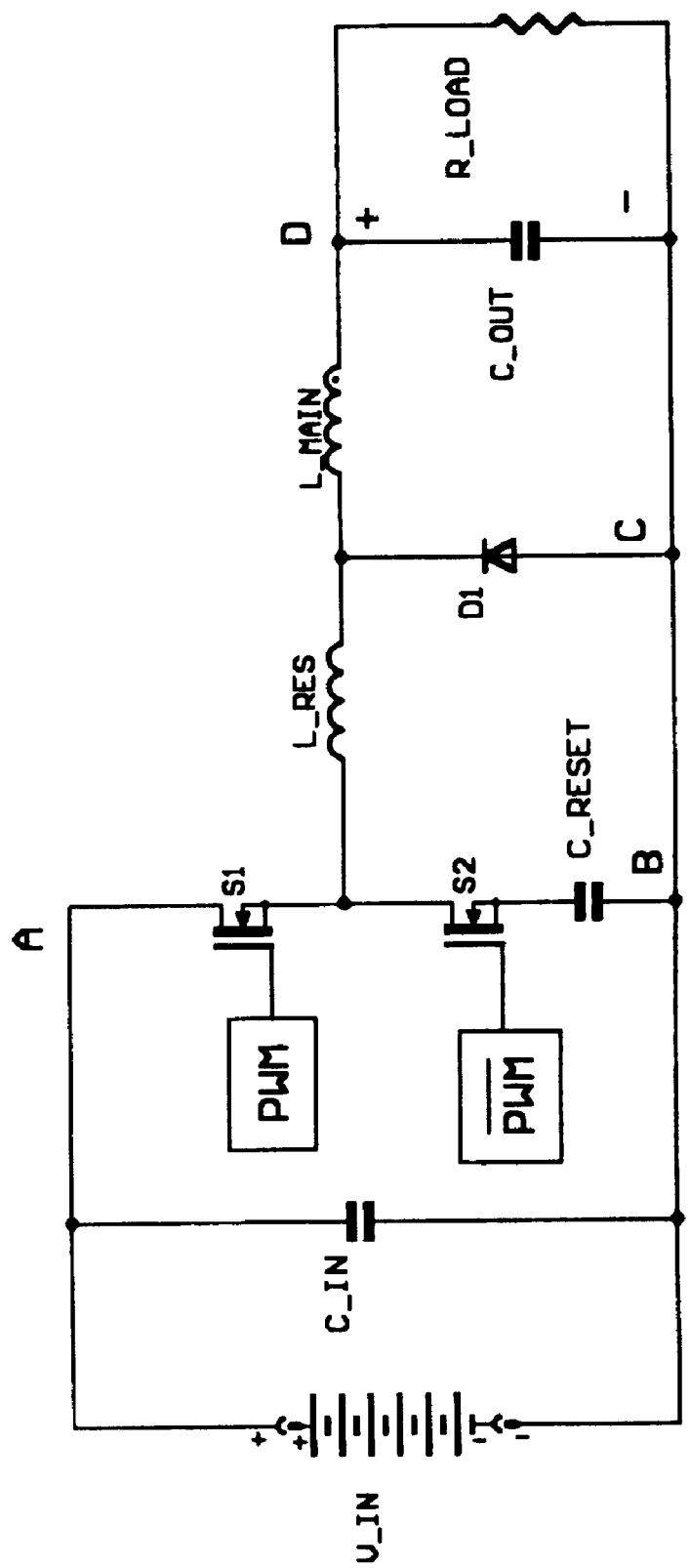

FIG. 24 illustrates an embodiment of the FIG. 11 circuit in which the S1 and S2 switches are implemented using power mosfets and the S3 switch is implemented with a diode rectifier.

Figure 25:
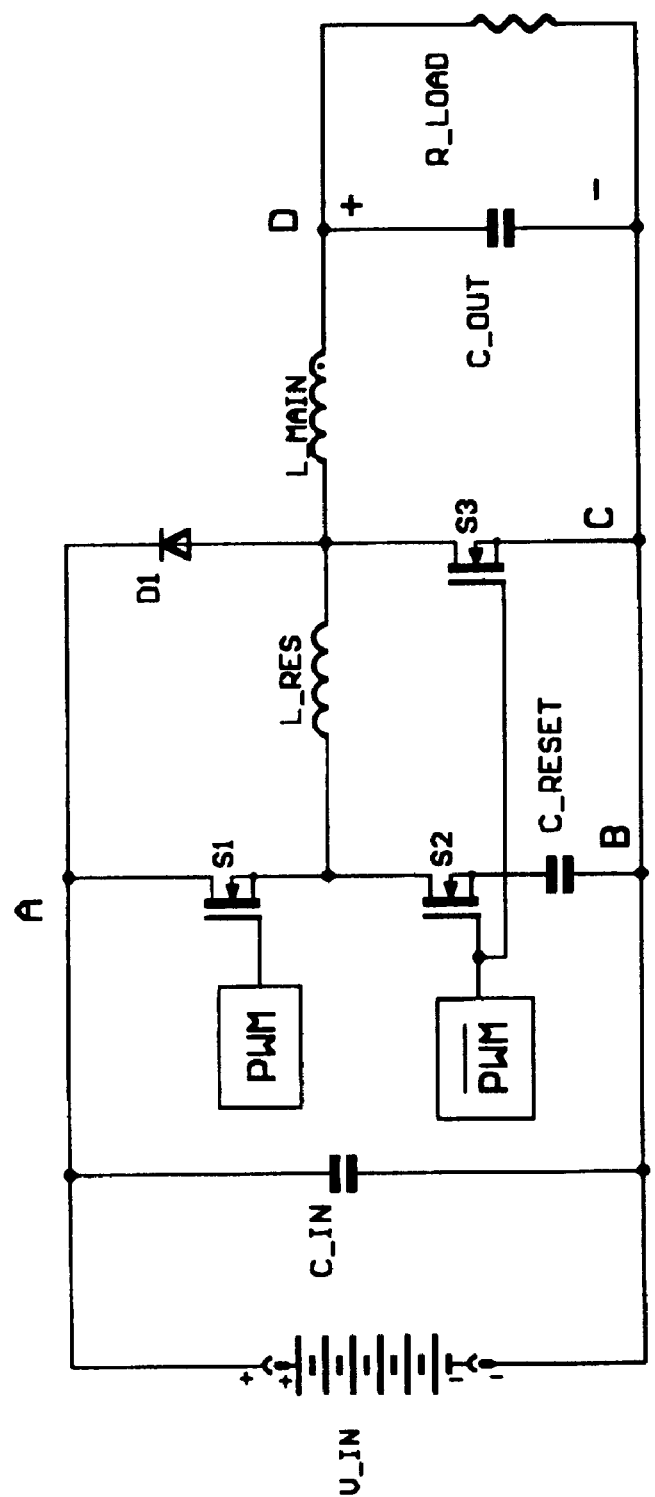

FIG. 25 illustrates an embodiment of the FIG. 11 circuit in which all three switches are implemented with power mosfets and augmented by a diode to clamp ringing associated with the small inductor and the parasitic capacitance of the third switch.

Figure 26:
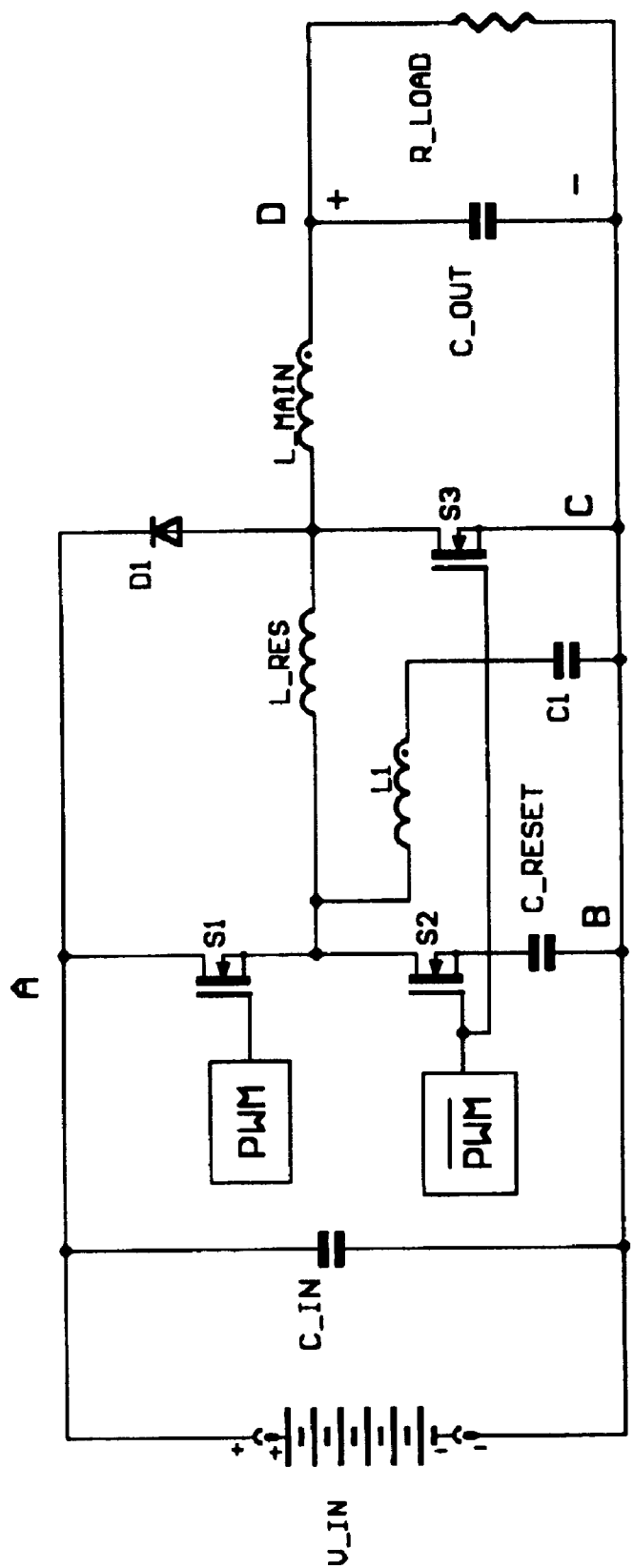

FIG. 26 illustrates the FIG. 25 circuit augmented by an LC tank circuit that provides a speed up mechanism for the switching transitions.

Figure 27:
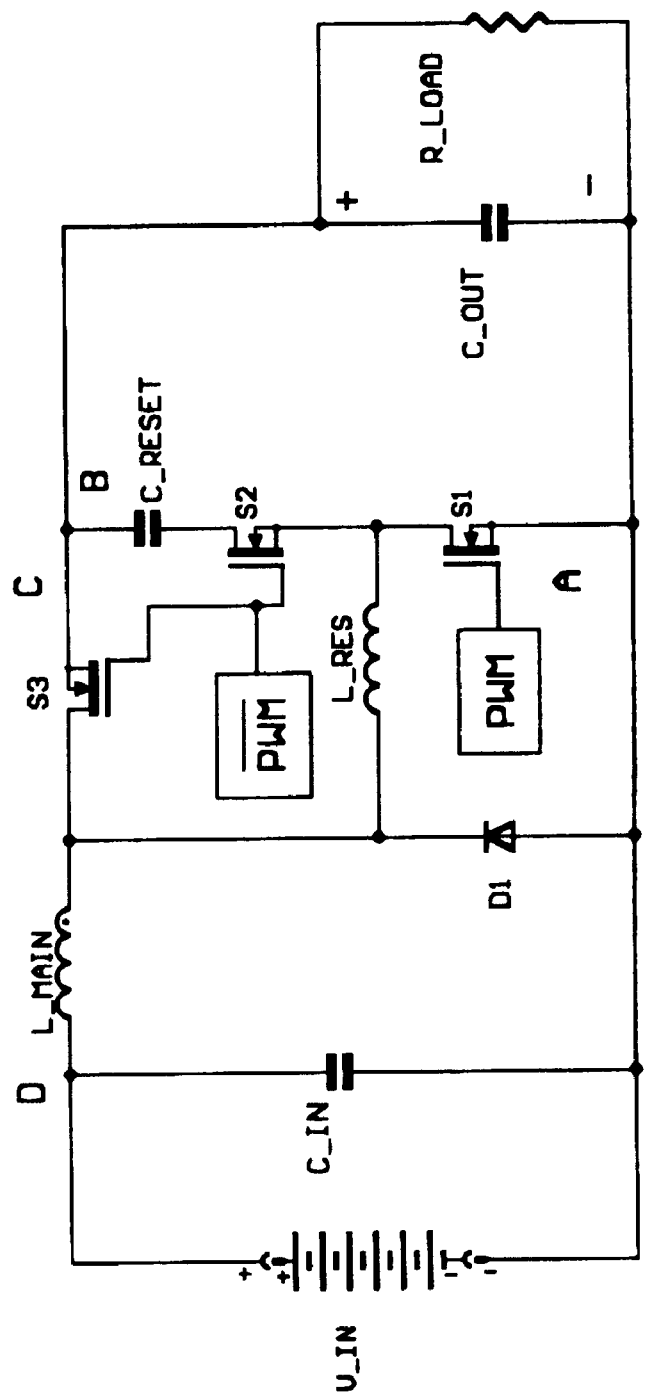

FIG. 27 illustrates the FIG. 25 circuit with its terminals rearranged to form a boost converter.

Figure 28:
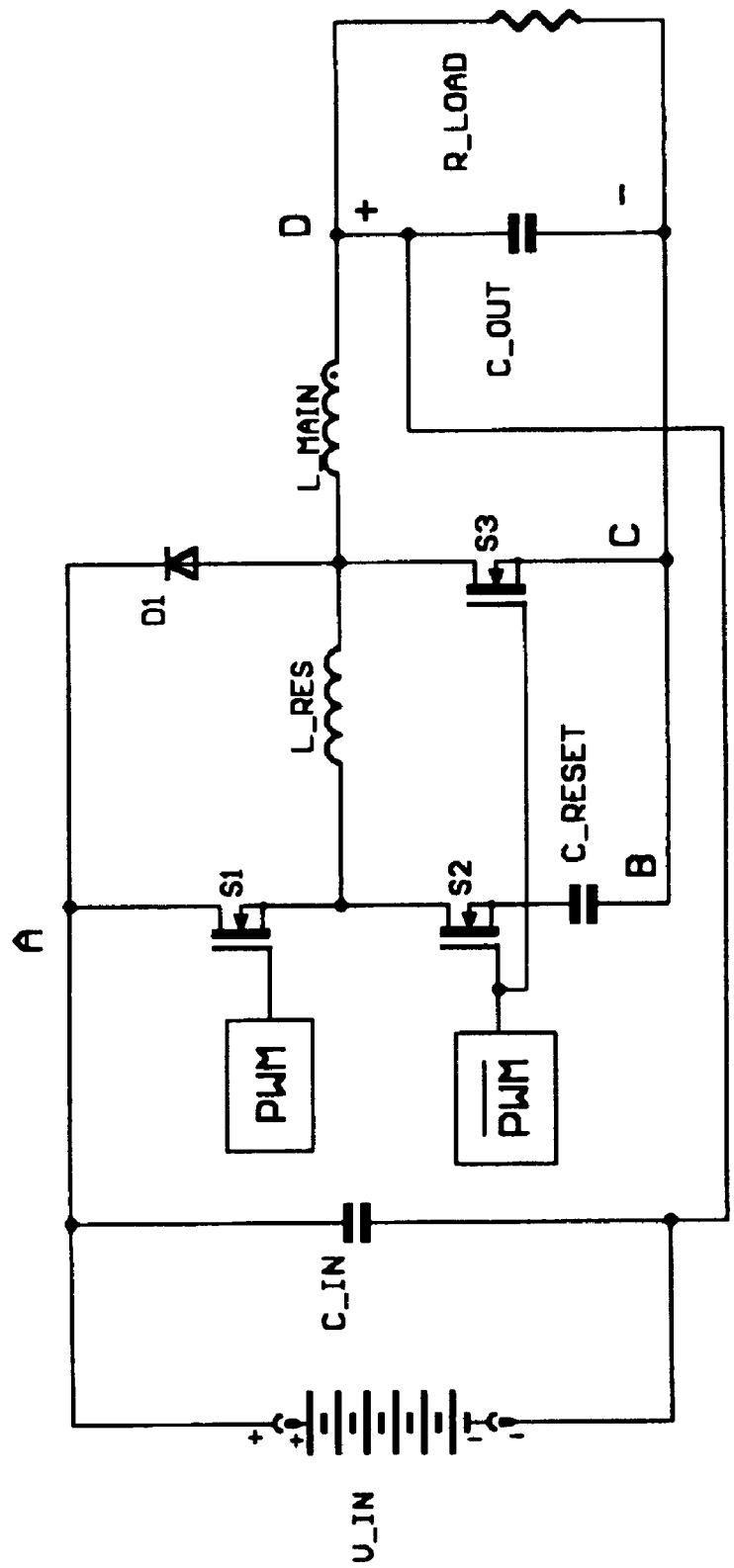

FIG. 28 illustrates the FIG. 25 circuit with its terminals rearranged to form a buck boost converter.

Figure 29:
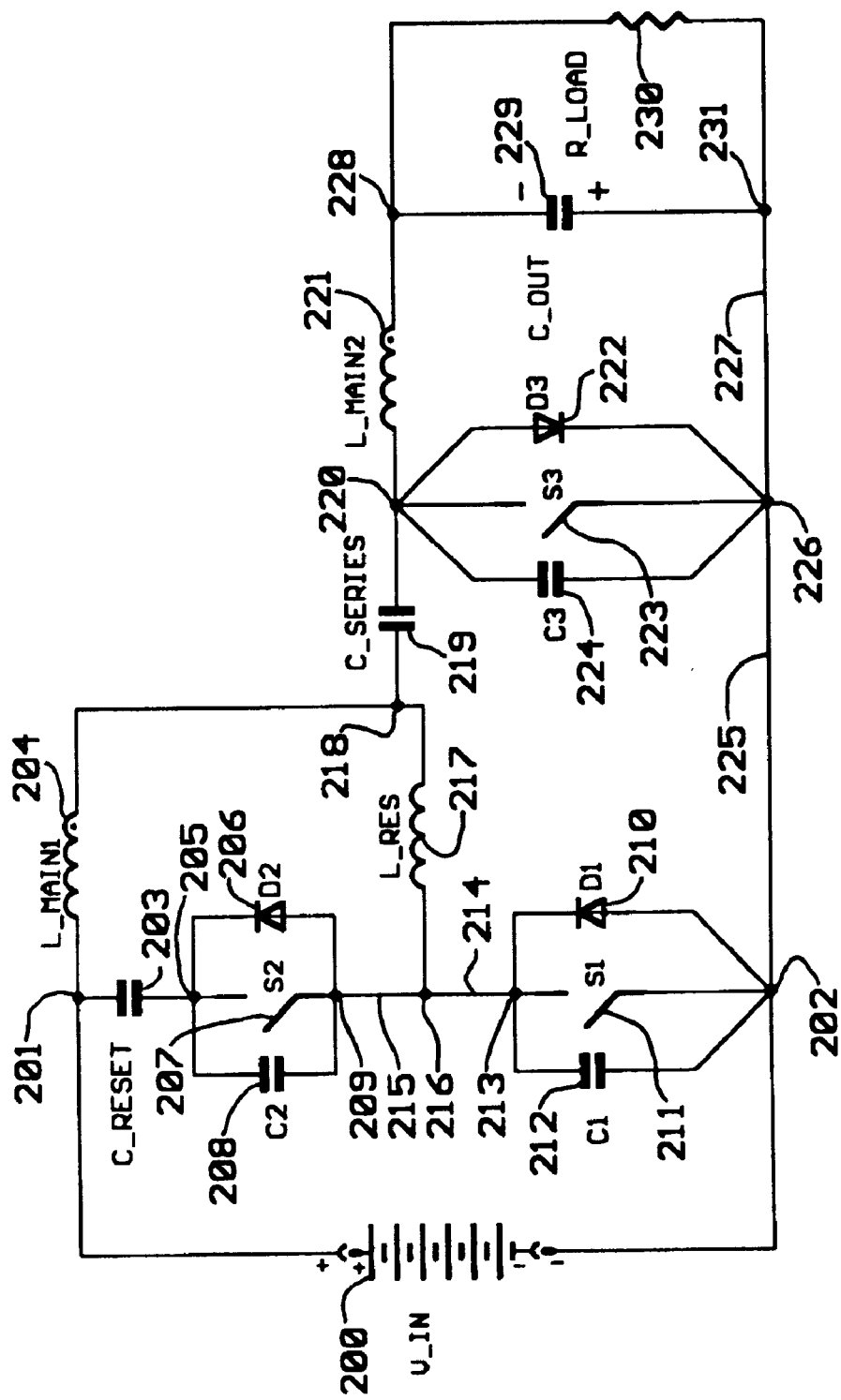

FIG. 29 illustrates a Cuk implementation of the subject invention.

Figure 30:
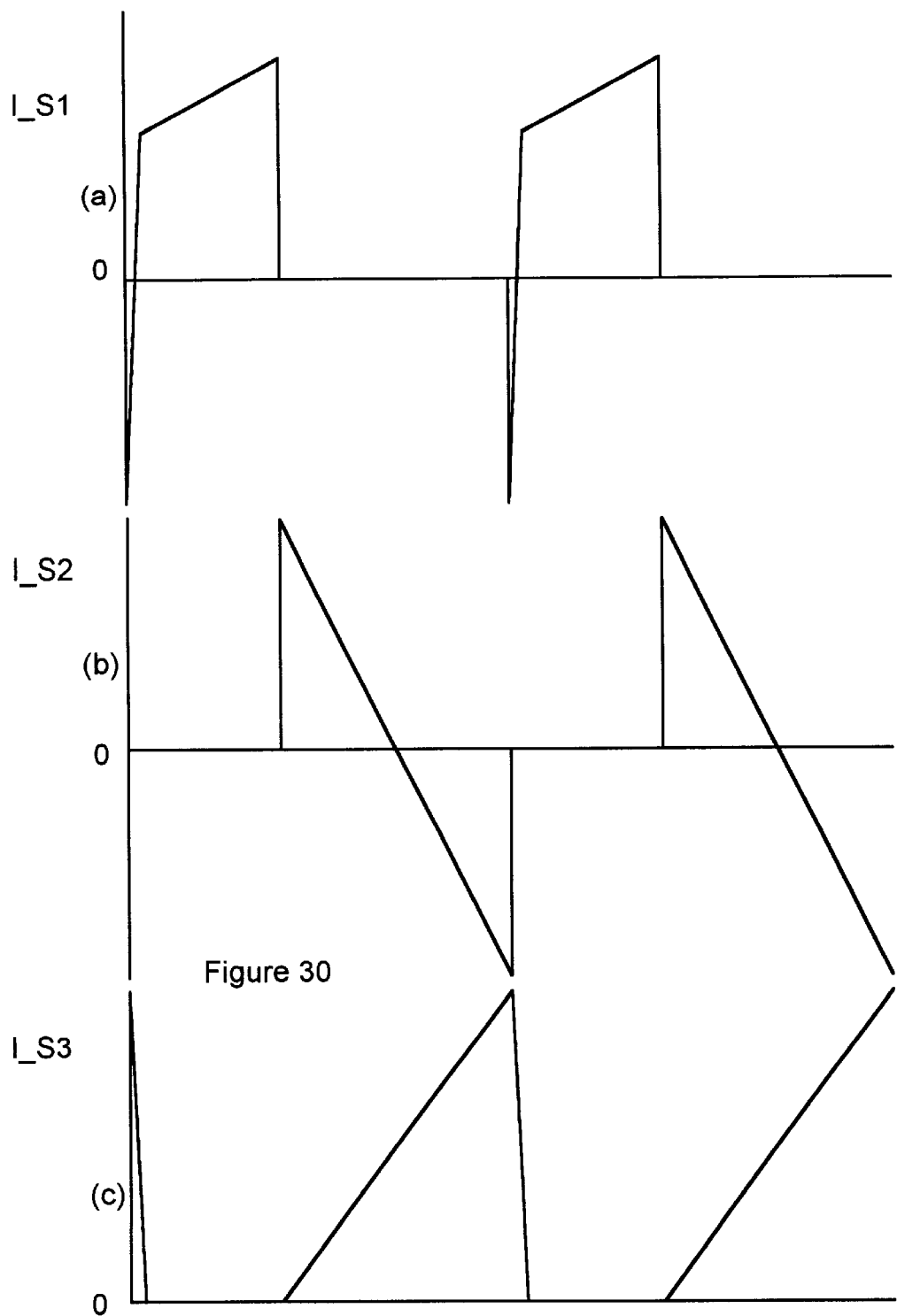

FIG. 30 illustrates the switch current wave forms of the FIG. 29 circuit.

Figure 31:
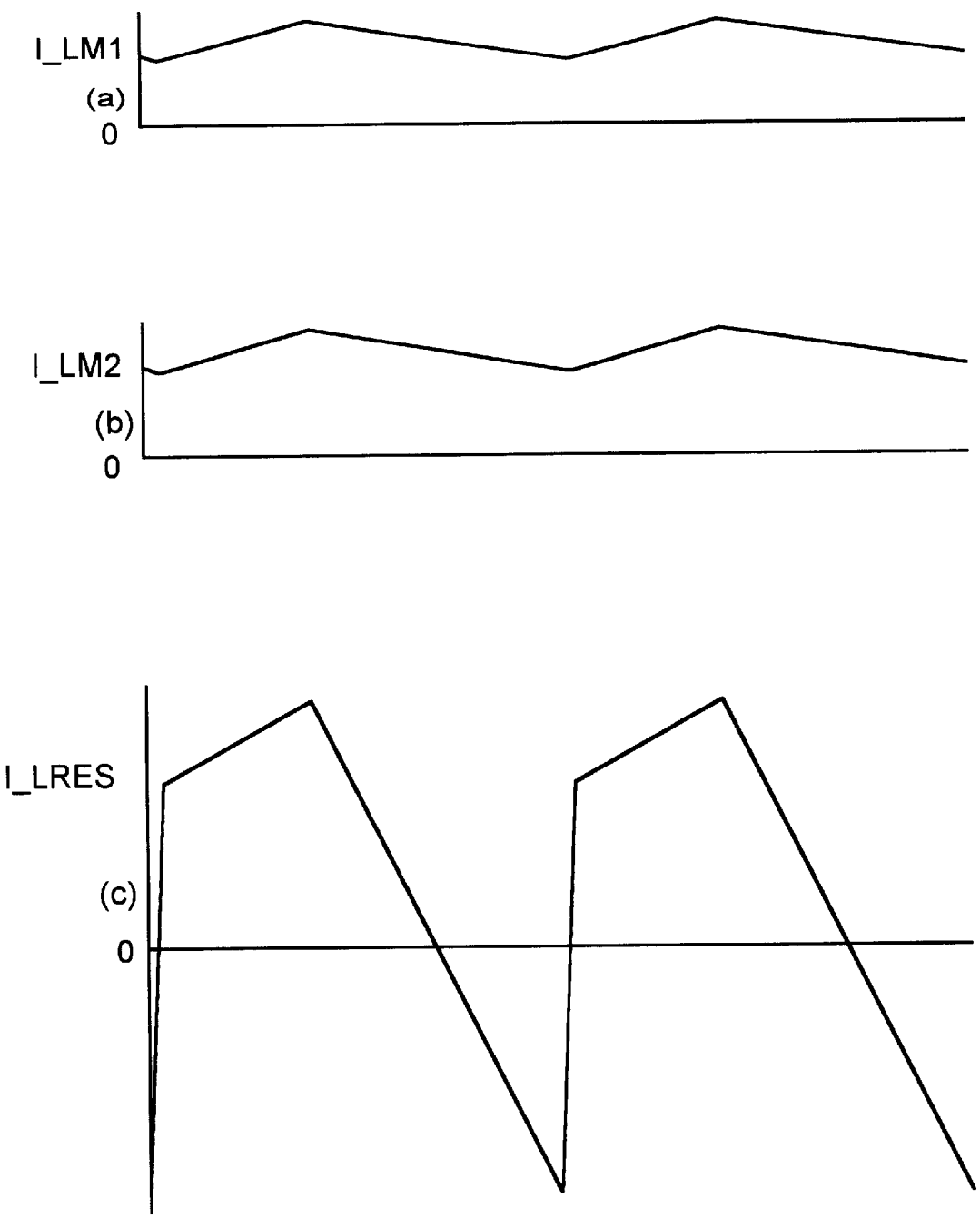

FIG. 31 illustrates the inductor current wave forms of the FIG. 29 circuit.

Figure 32:
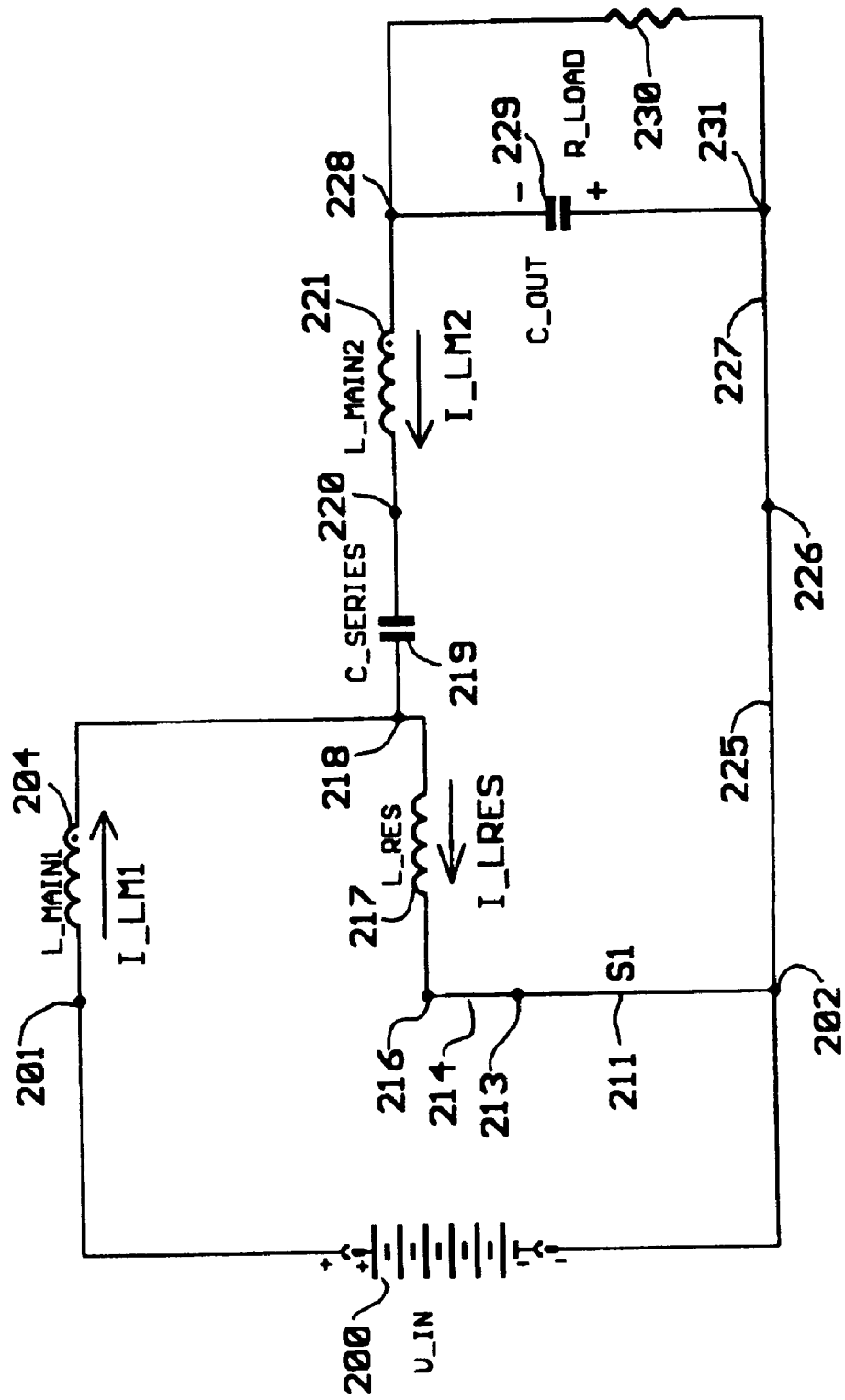

FIG. 32 illustrates an initial condition and on state of the FIG. 29 circuit.

Figure 33:
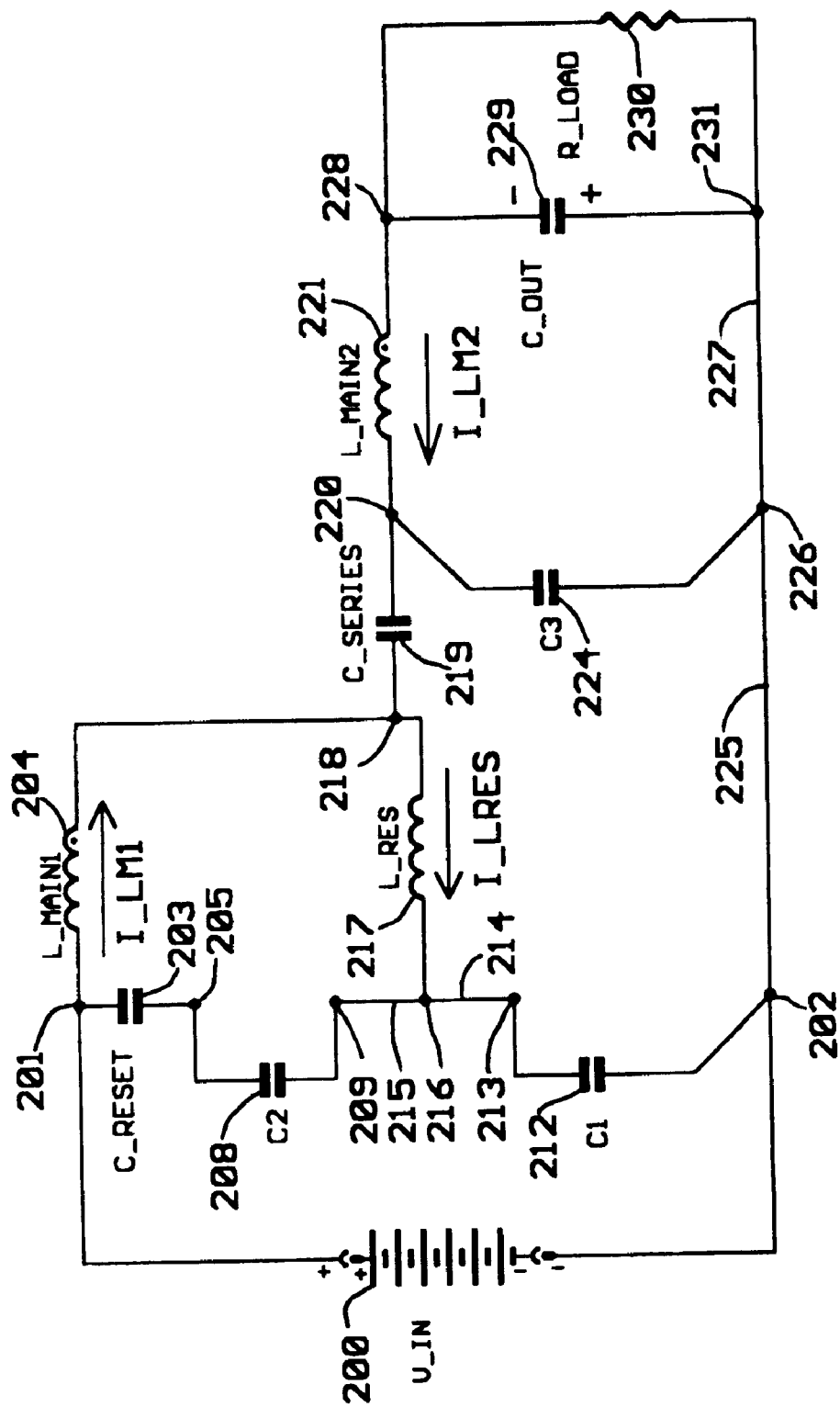

FIG. 33 illustrates a first phase of the off transition of the FIG. 29 circuit.

Figure 34:
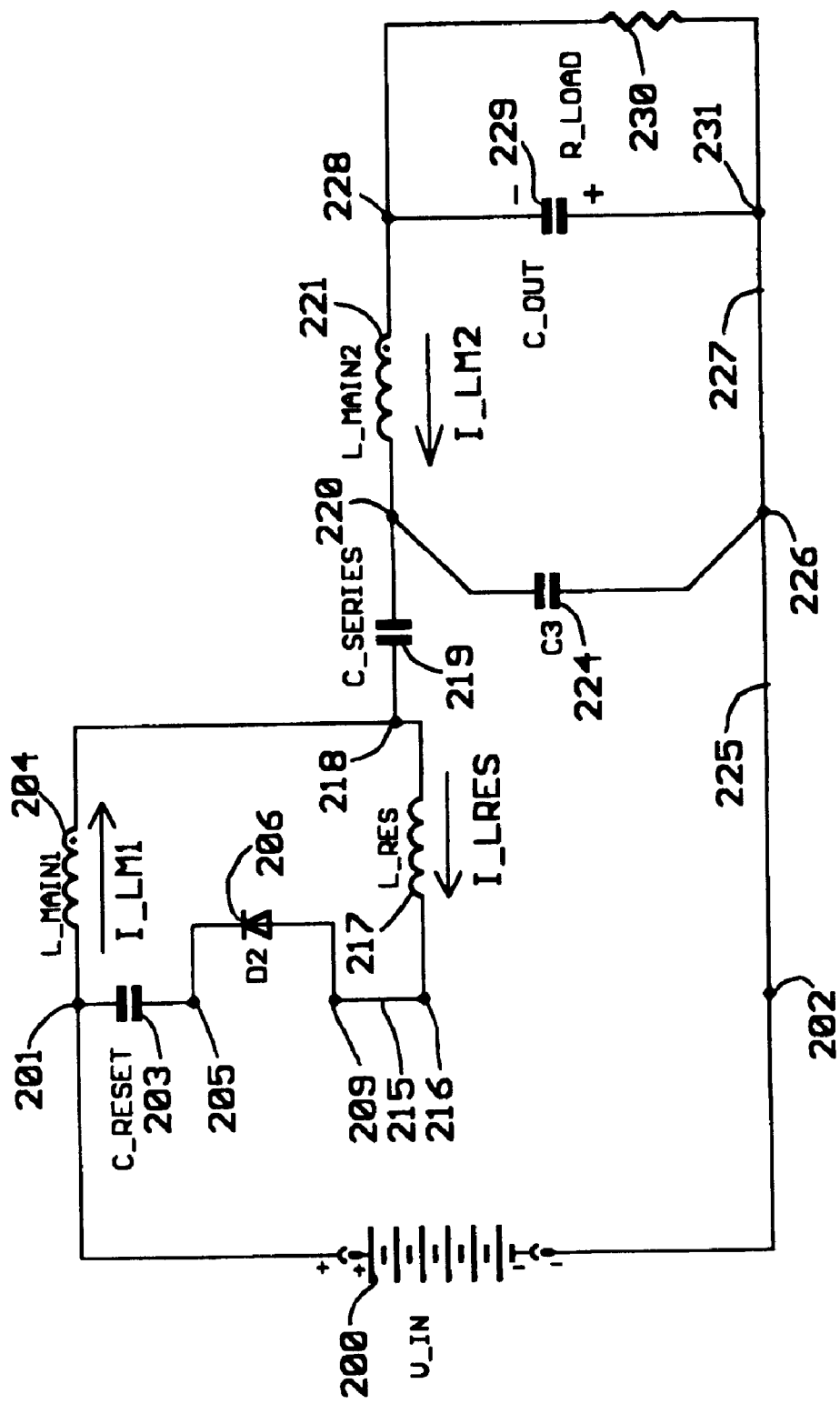

FIG. 34 illustrates a second phase of the off transition of the FIG. 29 circuit.

Figure 35:
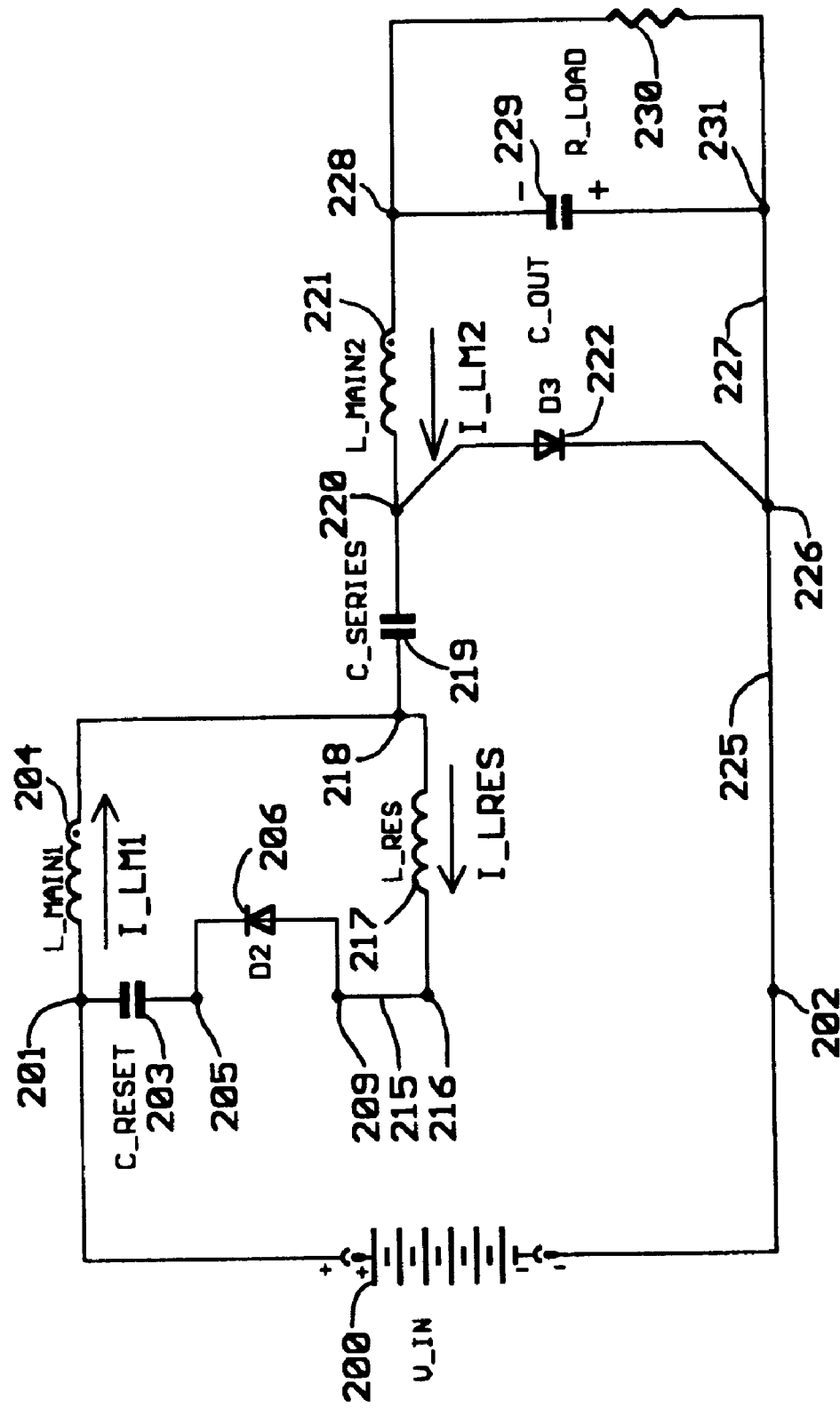

FIG. 35 illustrates a third phase of the off transition of the FIG. 29 circuit.

Figure 36:
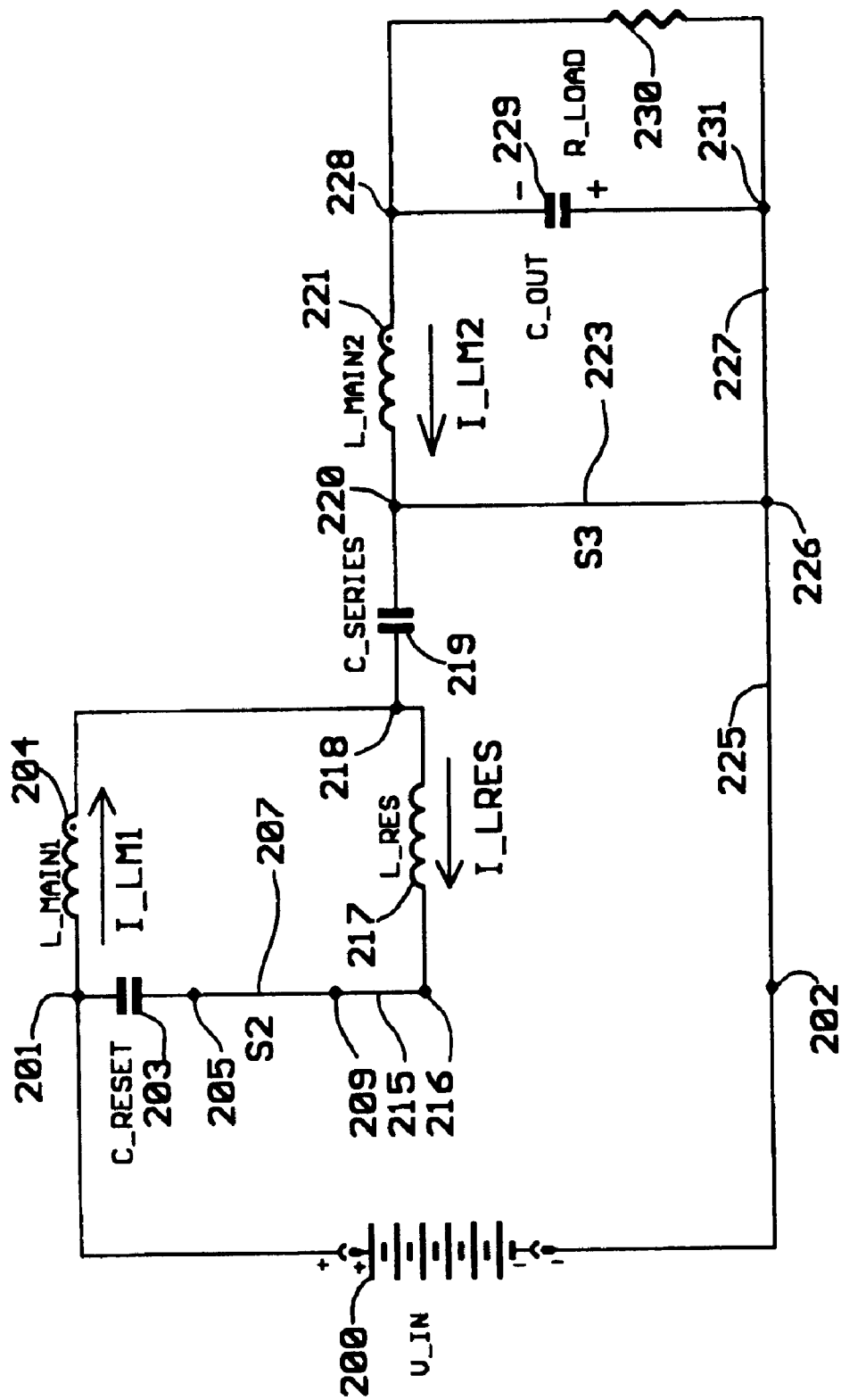

FIG. 36 illustrates the off state of the FIG. 29 circuit.

Figure 37:
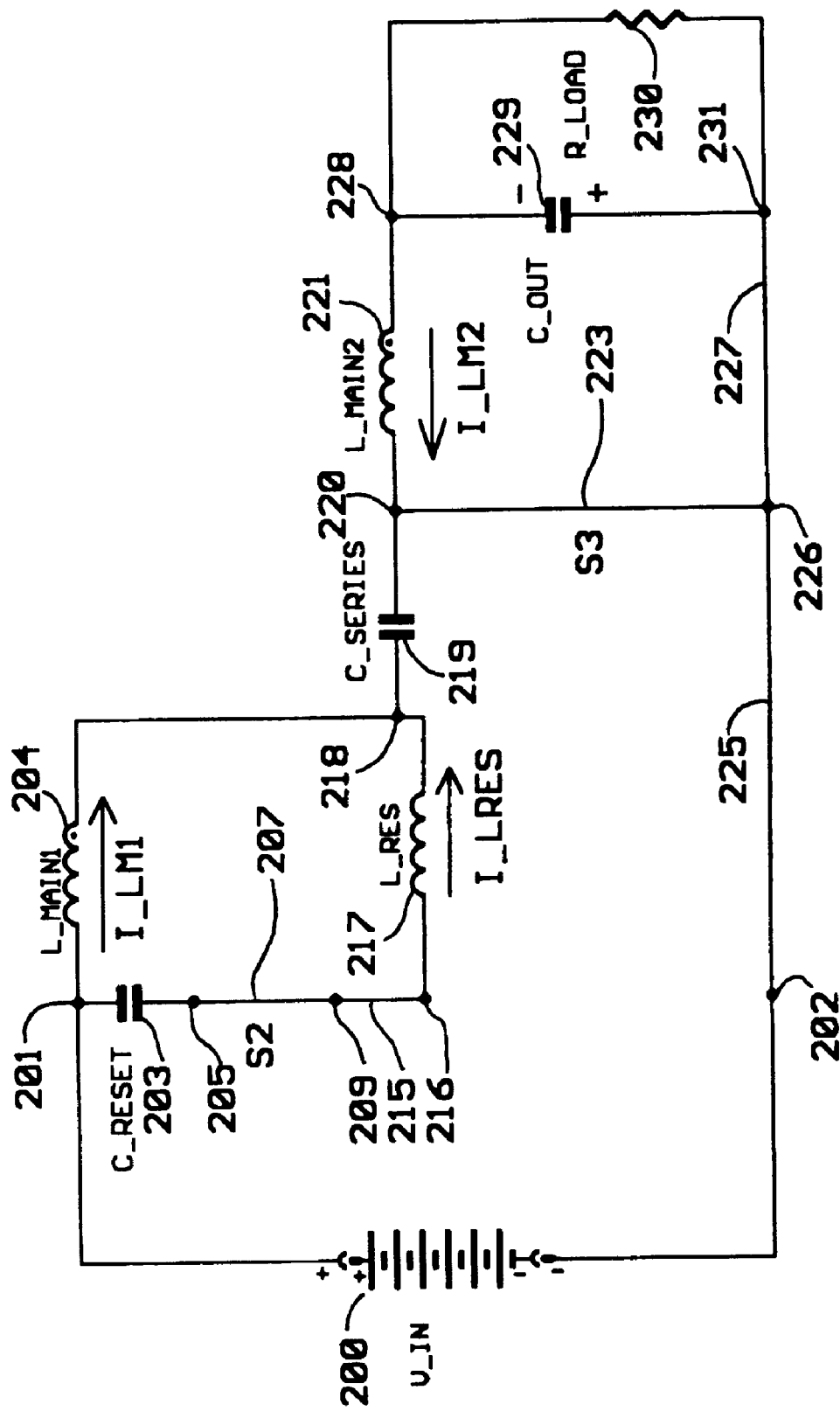

FIG. 37 is another illustration of the off state of the FIG. 29 circuit.

Figure 38:
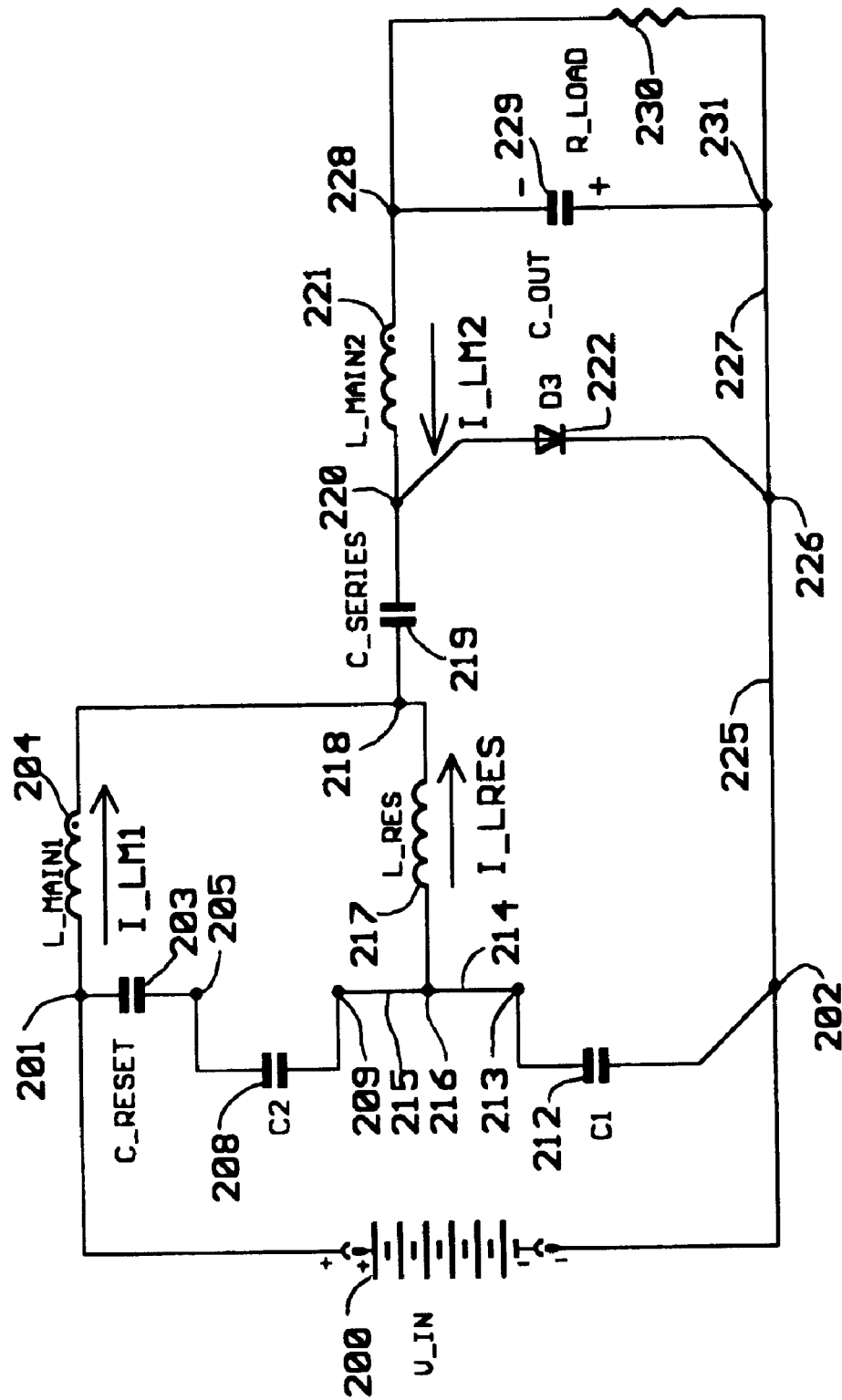

FIG. 38 illustrates a first phase of the turn on transition of the FIG. 29 circuit.

Figure 39:
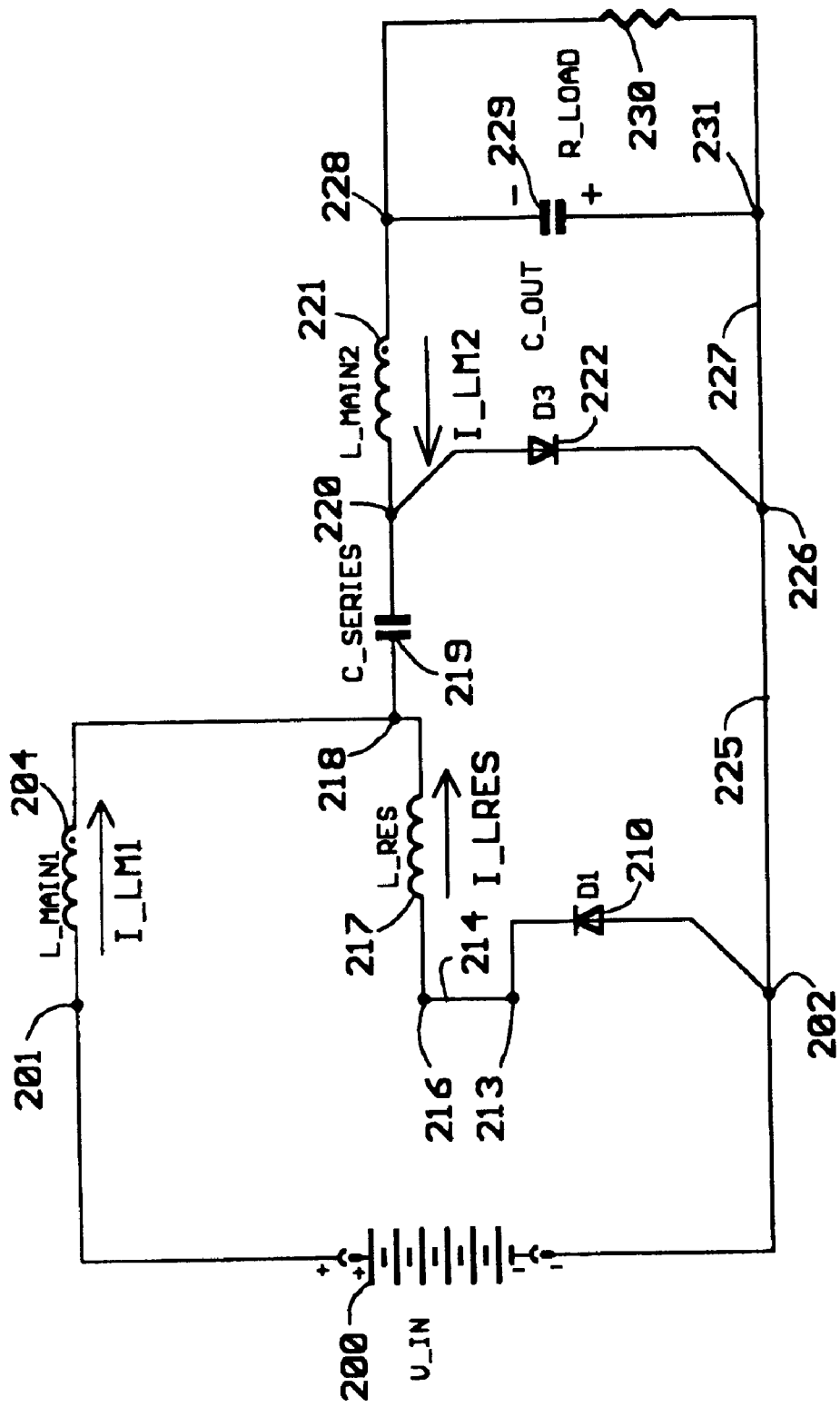

FIG. 39 illustrates a second phase of the turn on transition of the FIG. 29 circuit.

Figure 40:
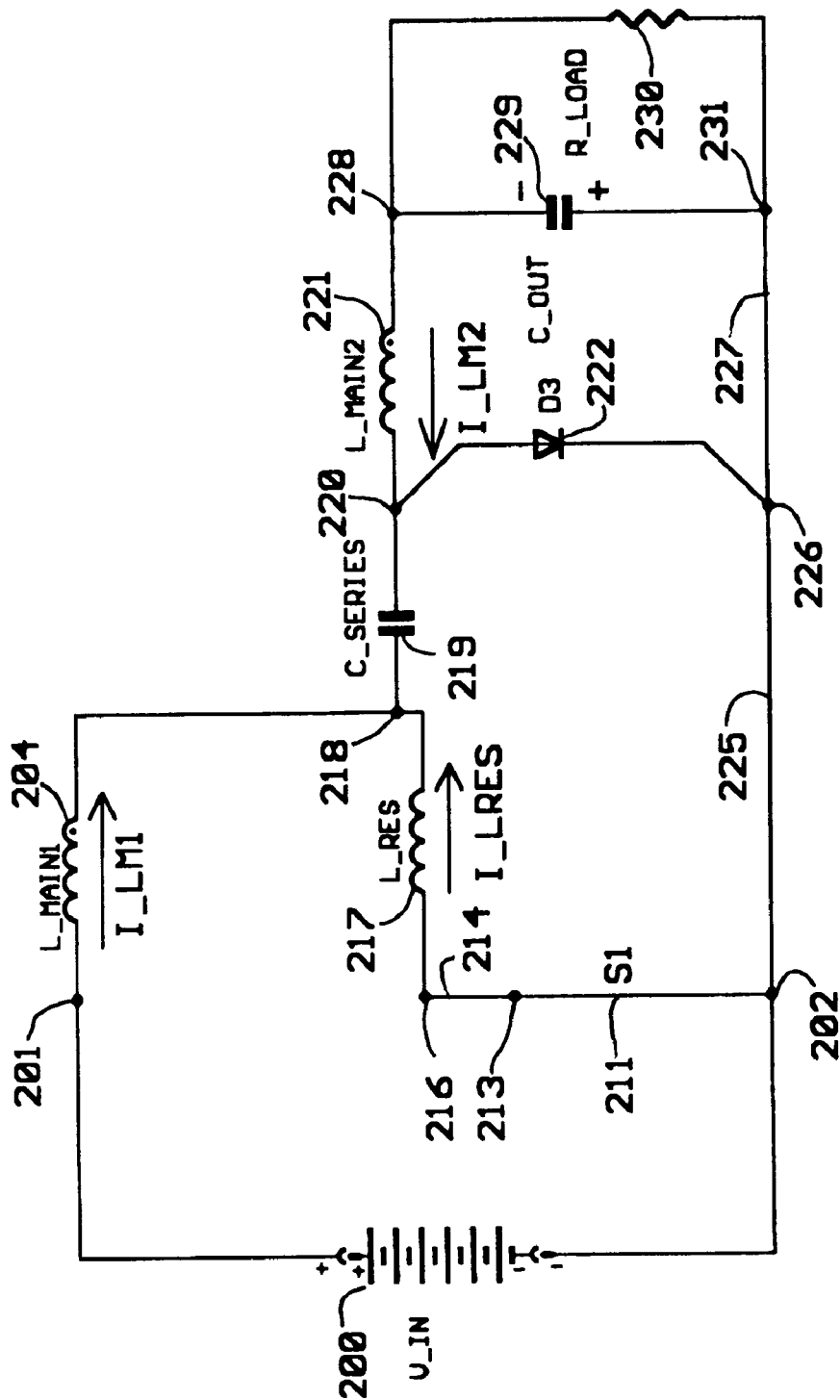

FIG. 40 illustrates a third phase of the turn on transition of the FIG. 29 circuit.

Figure 41:
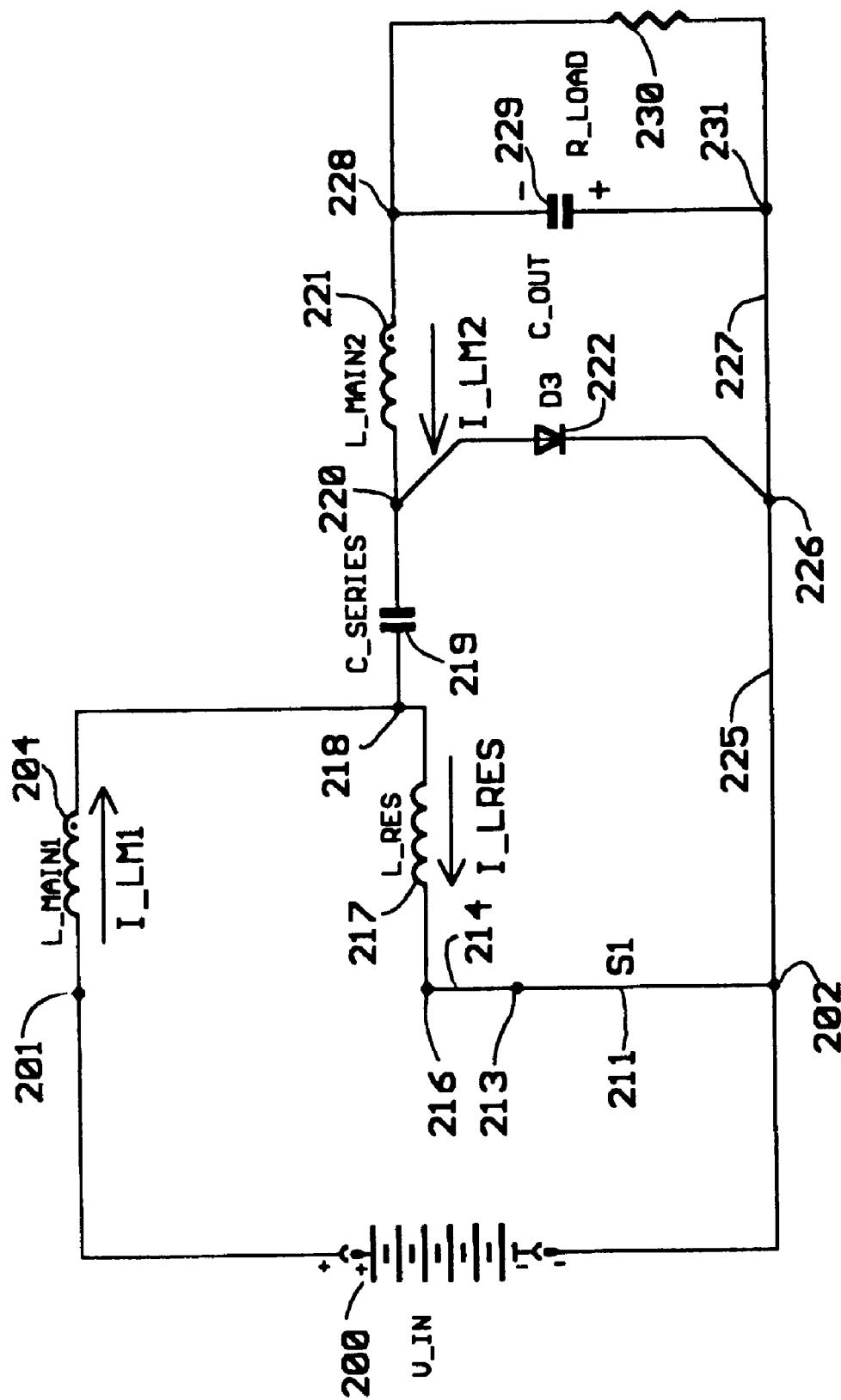

FIG. 41 illustrates a fourth phase of the turn on transition of the FIG. 29 circuit.

Figure 42:
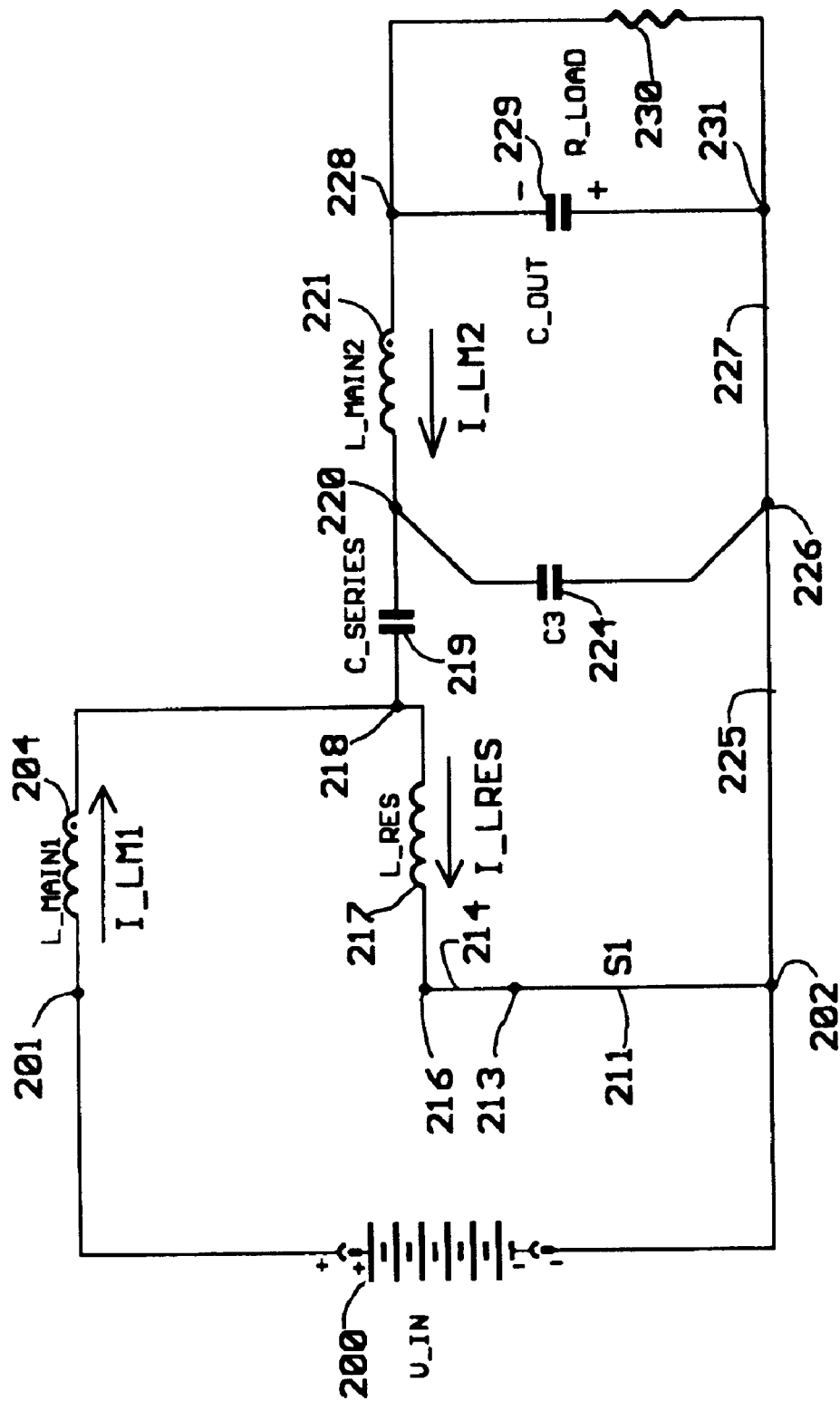

FIG. 42 illustrates a fifth phase of the turn on transition of the FIG. 29 circuit.

Figure 43:
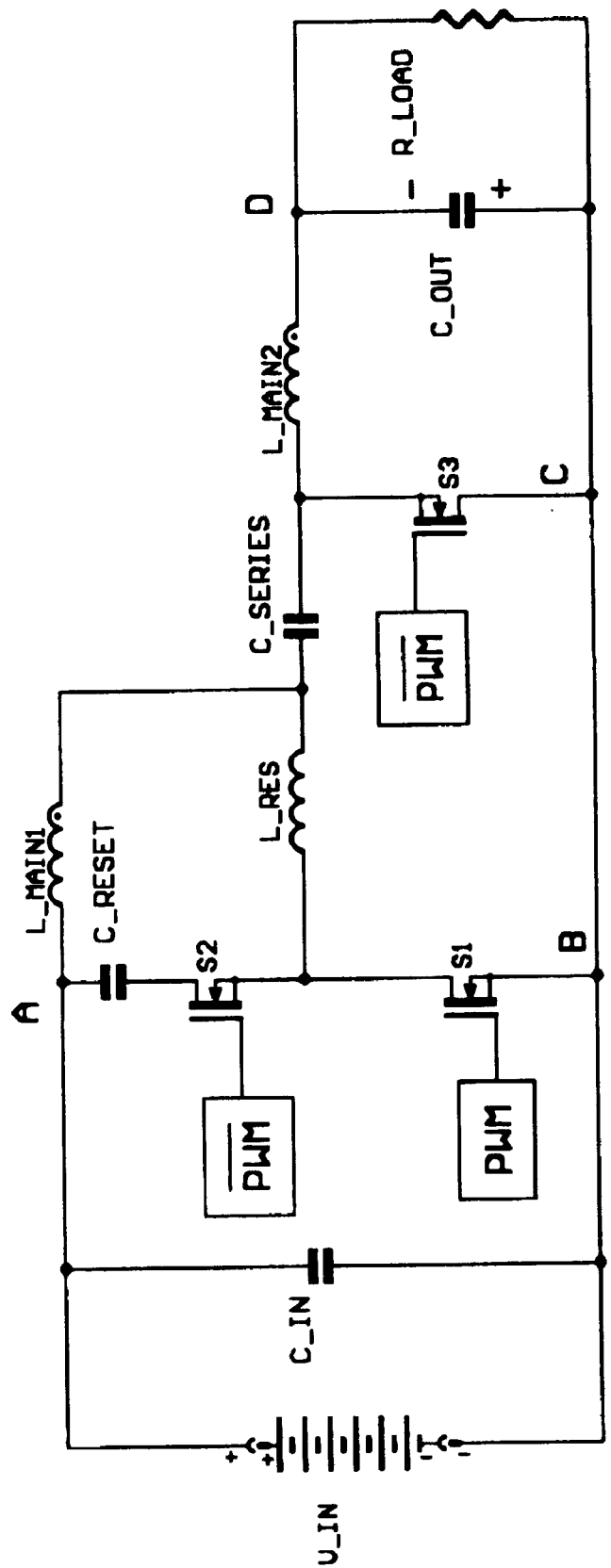

FIG. 43 illustrates an embodiment of the FIG. 29 circuit in which the three switches are implemented using power mosfets.

Figure 44:
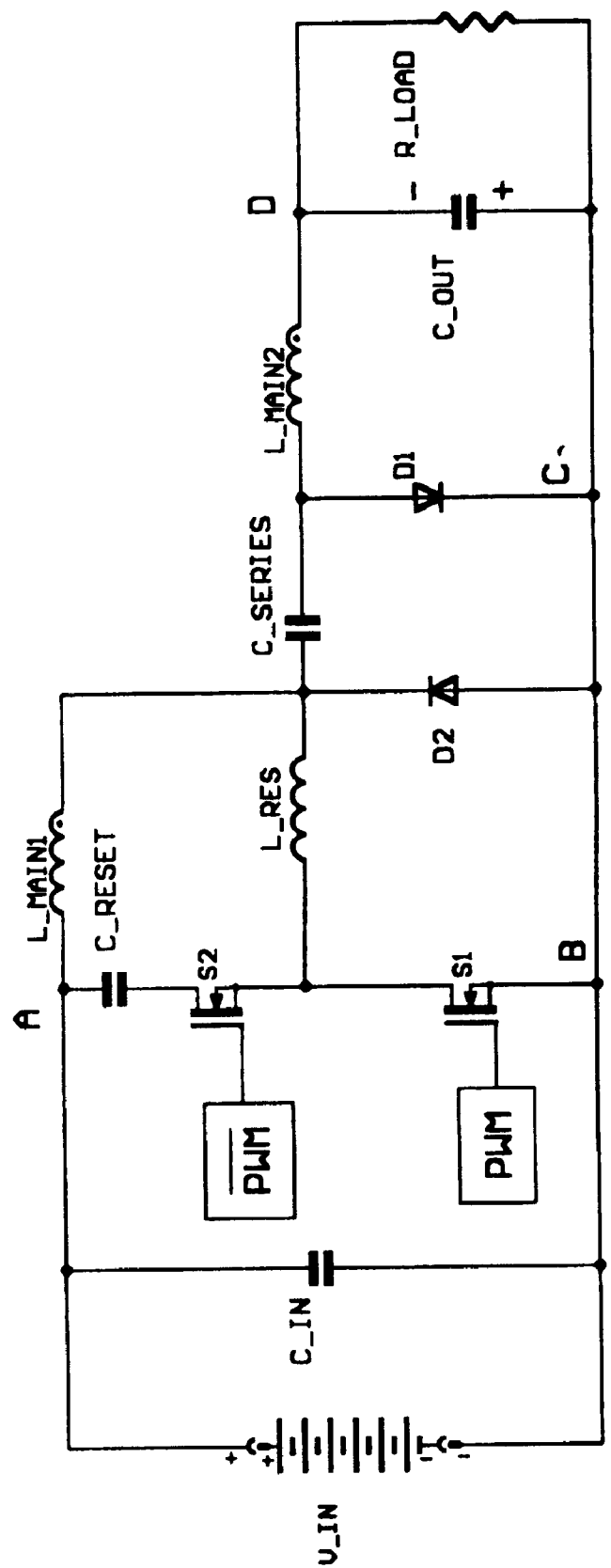

FIG. 44 illustrates an embodiment of the FIG. 29 circuit in which the third switch is implemented with a diode and the circuit is augmented by another diode to clamp ringing associated with the small inductor and the circuit's parasitic capacitance.

Figure 45:
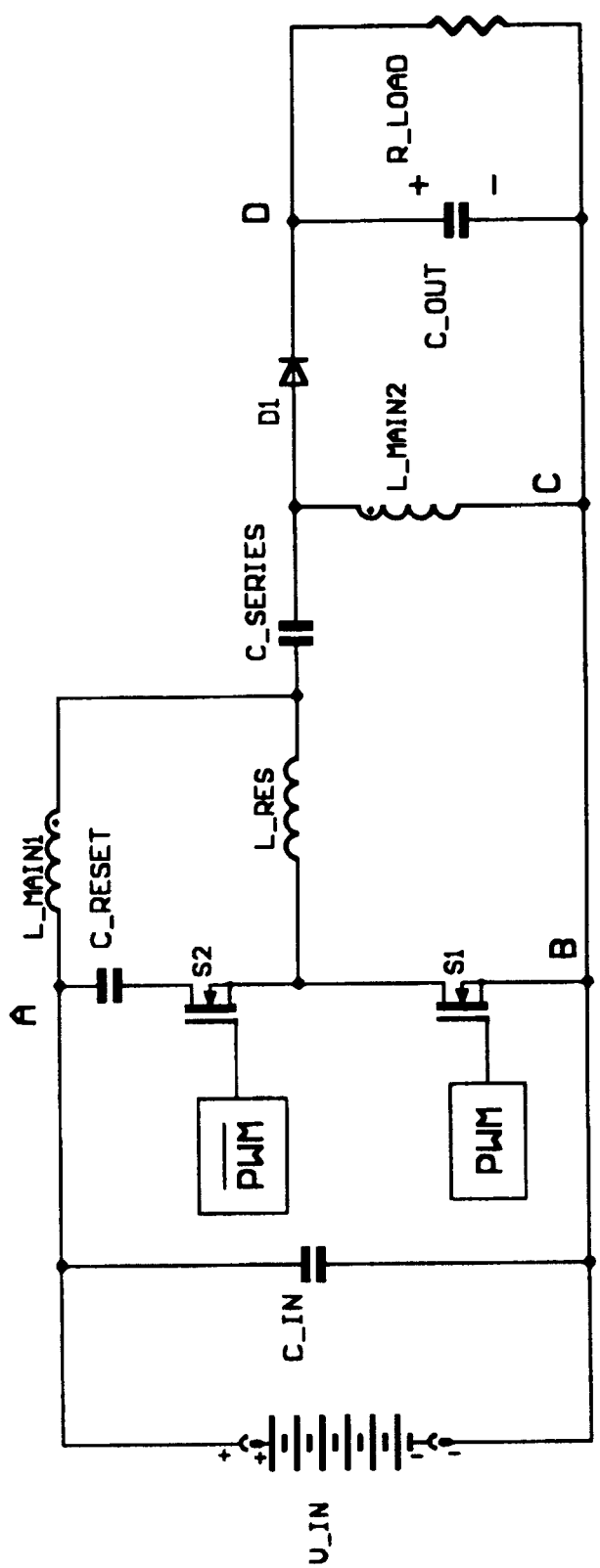

FIG. 45 illustrates a SEPIC implementation of the FIG. 29 circuit.

Figure 46:
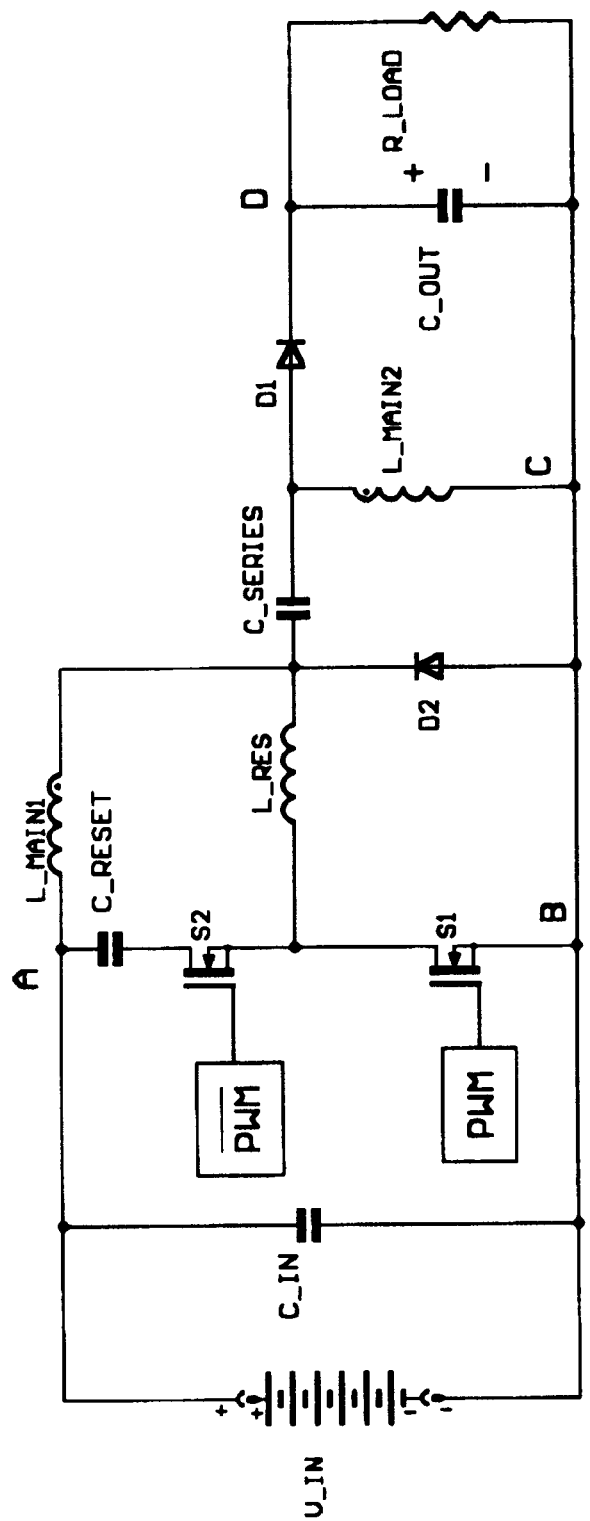

FIG. 46 illustrates a SEPIC implementation of the FIG. 29 circuit with a clamp diode.

Figure 47:
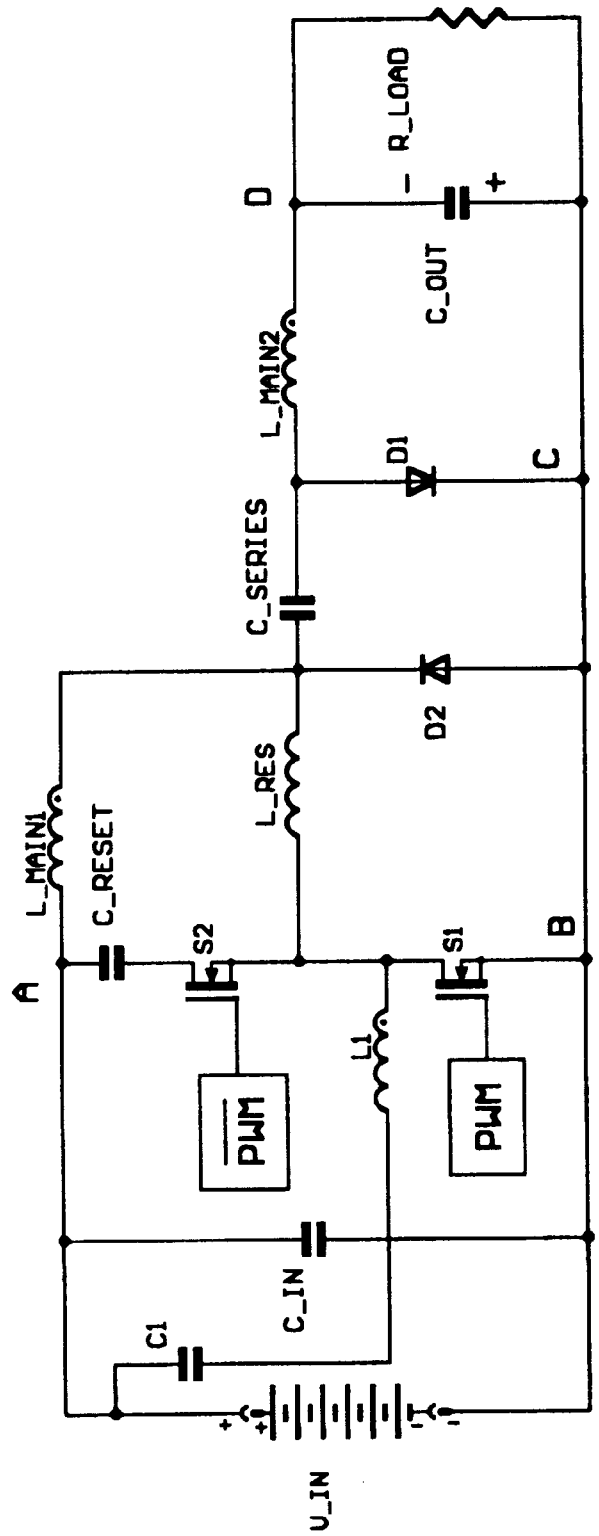

FIG. 47 illustrates a Cuk implementation with a tank circuit to speed the switching transitions.

Figure 48:
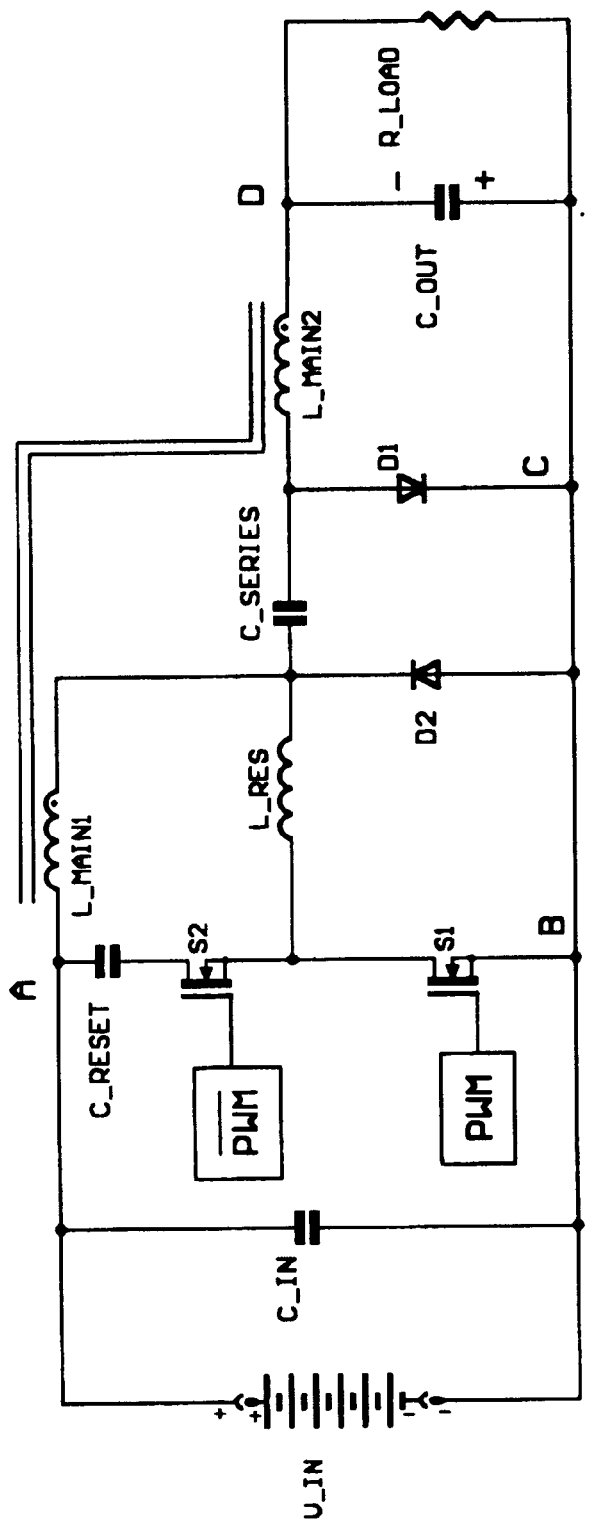

FIG. 48 illustrates a Cuk implementation with the two main inductors coupled on a common core.

Figure 49:
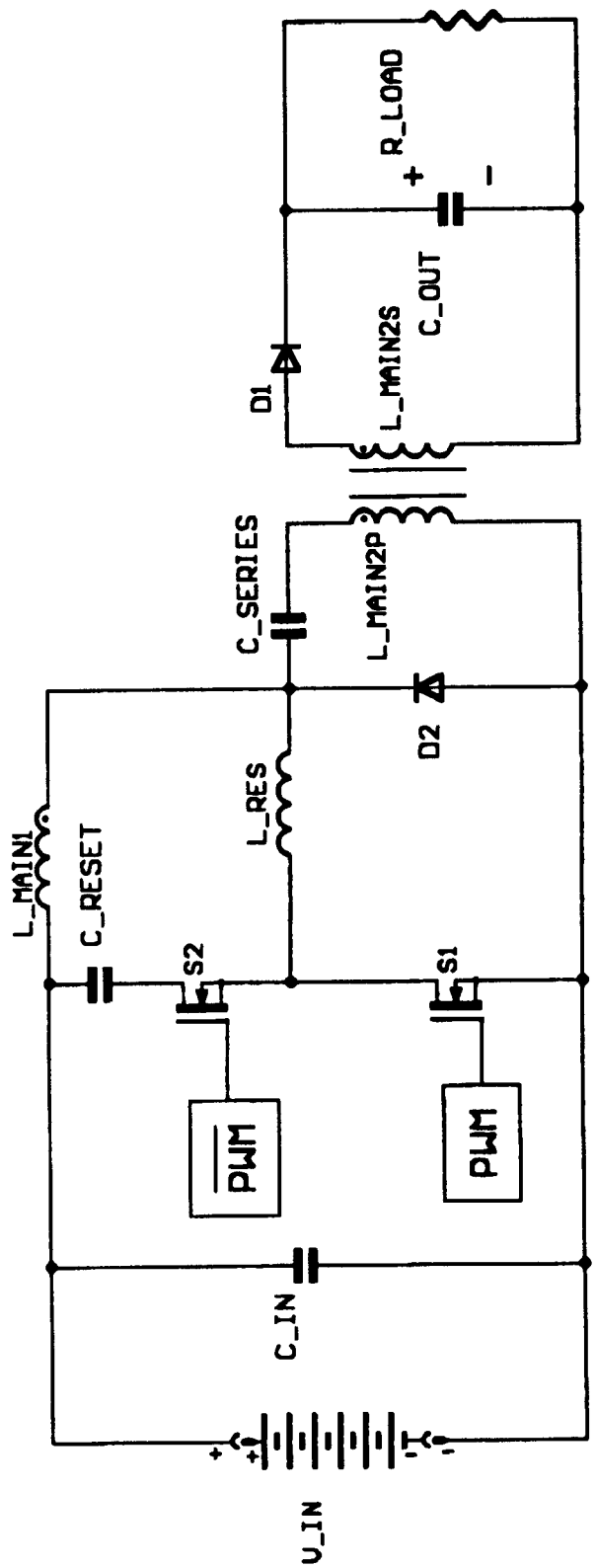

FIG. 49 illustrates a SEPIC implementation with a coupled inductor replacing the second main choke to provide isolation.

Figure 50:
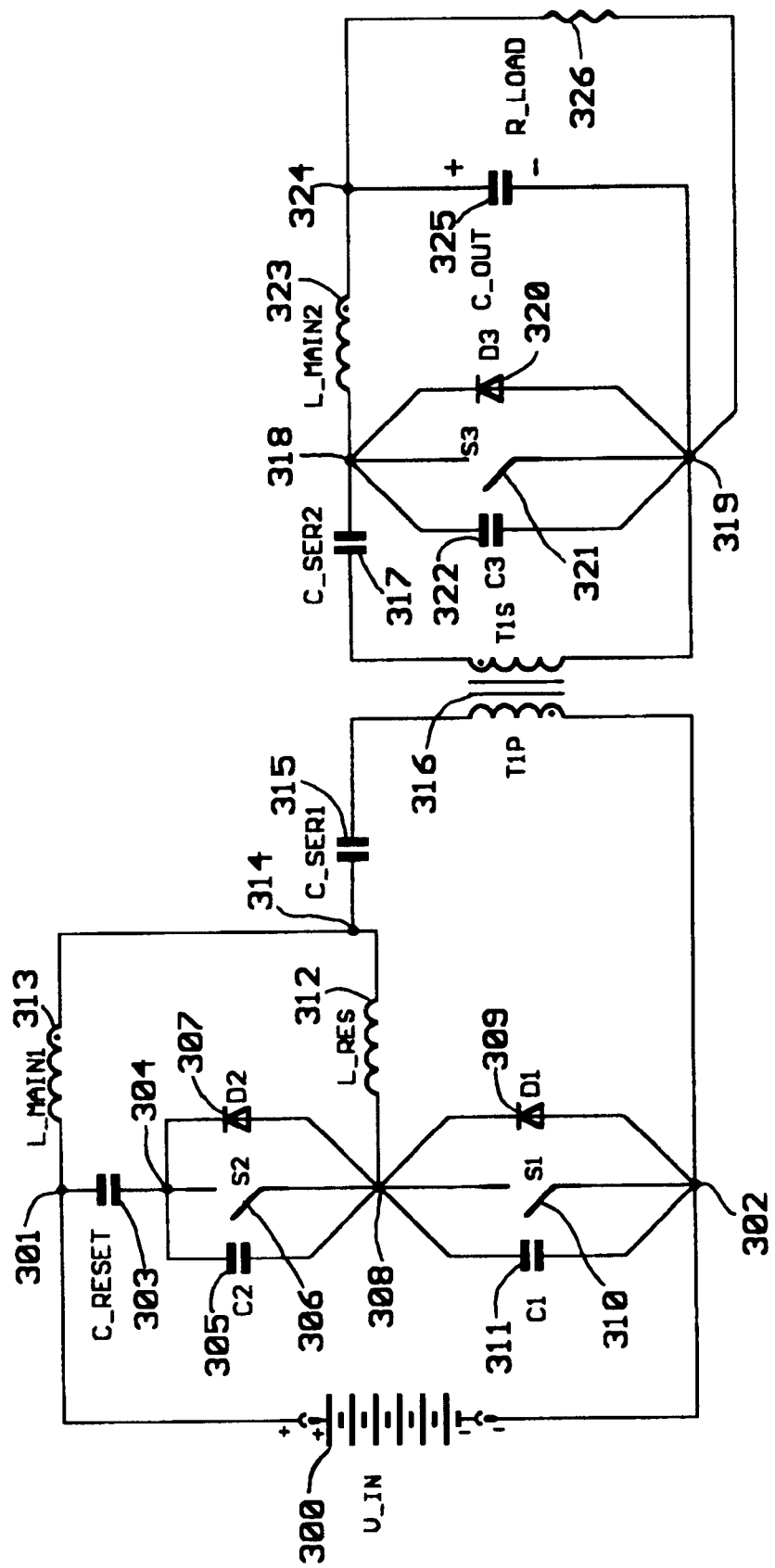

FIG. 50 illustrates a transformer coupled Cuk implementation of the subject invention.

Figure 51:
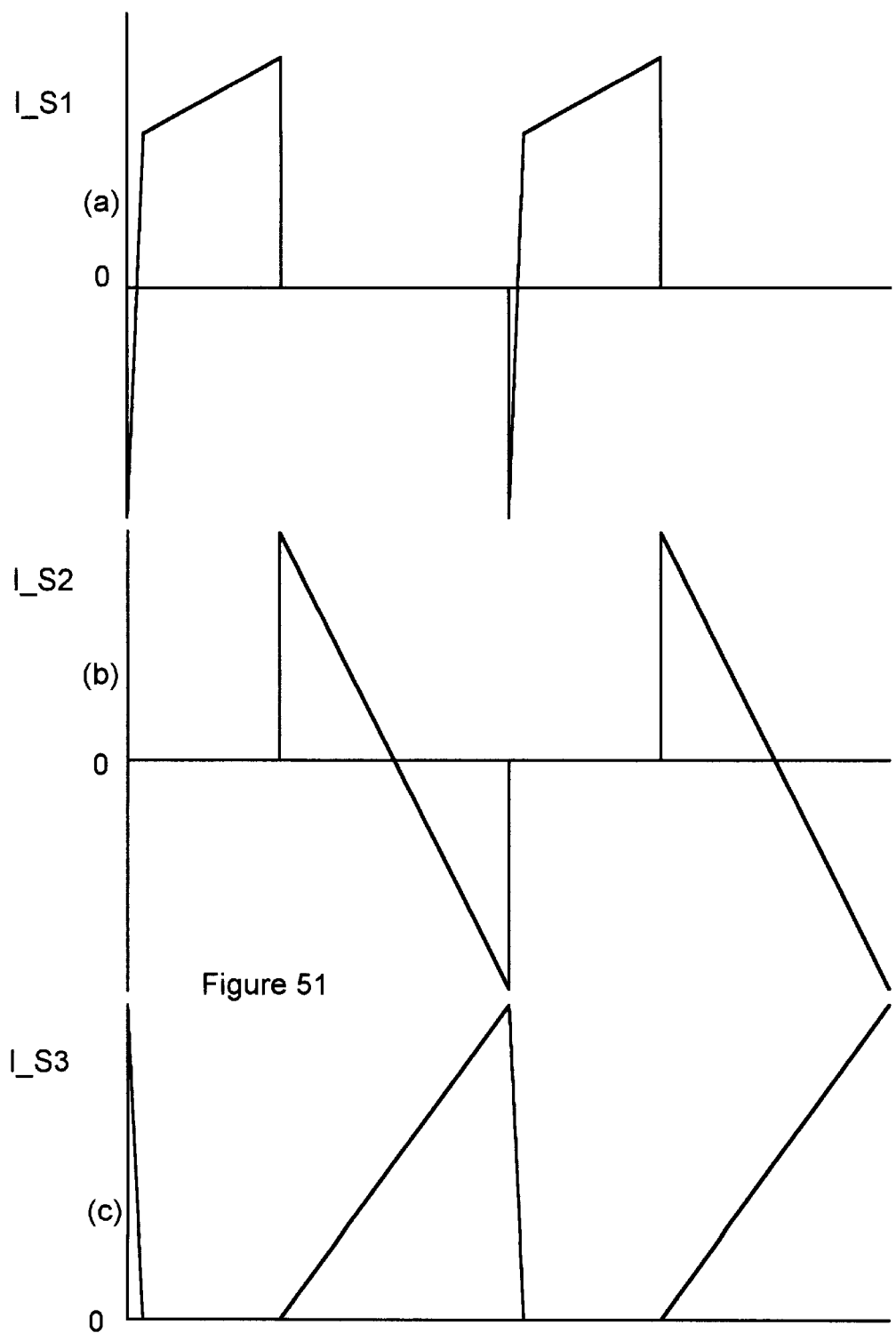

FIG. 51 illustrates the switch current wave forms of the FIG. 50 circuit.

Figure 52:
Figure 52:
Figure 52:
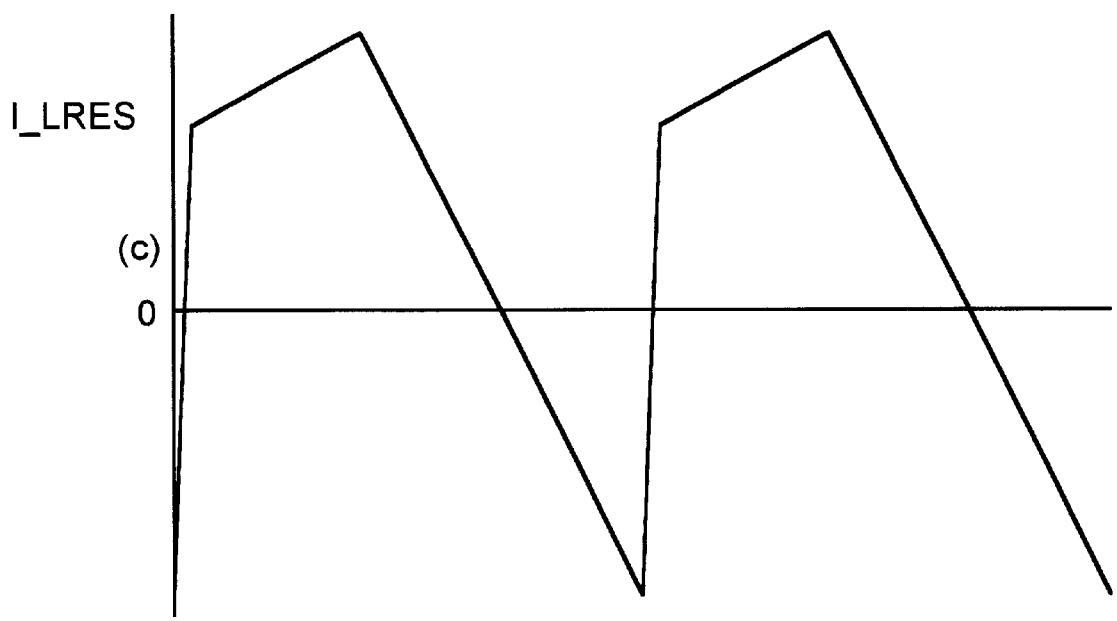

FIG. 52 illustrates the inductor current wave forms of the FIG. 50 circuit.

Figure 53:
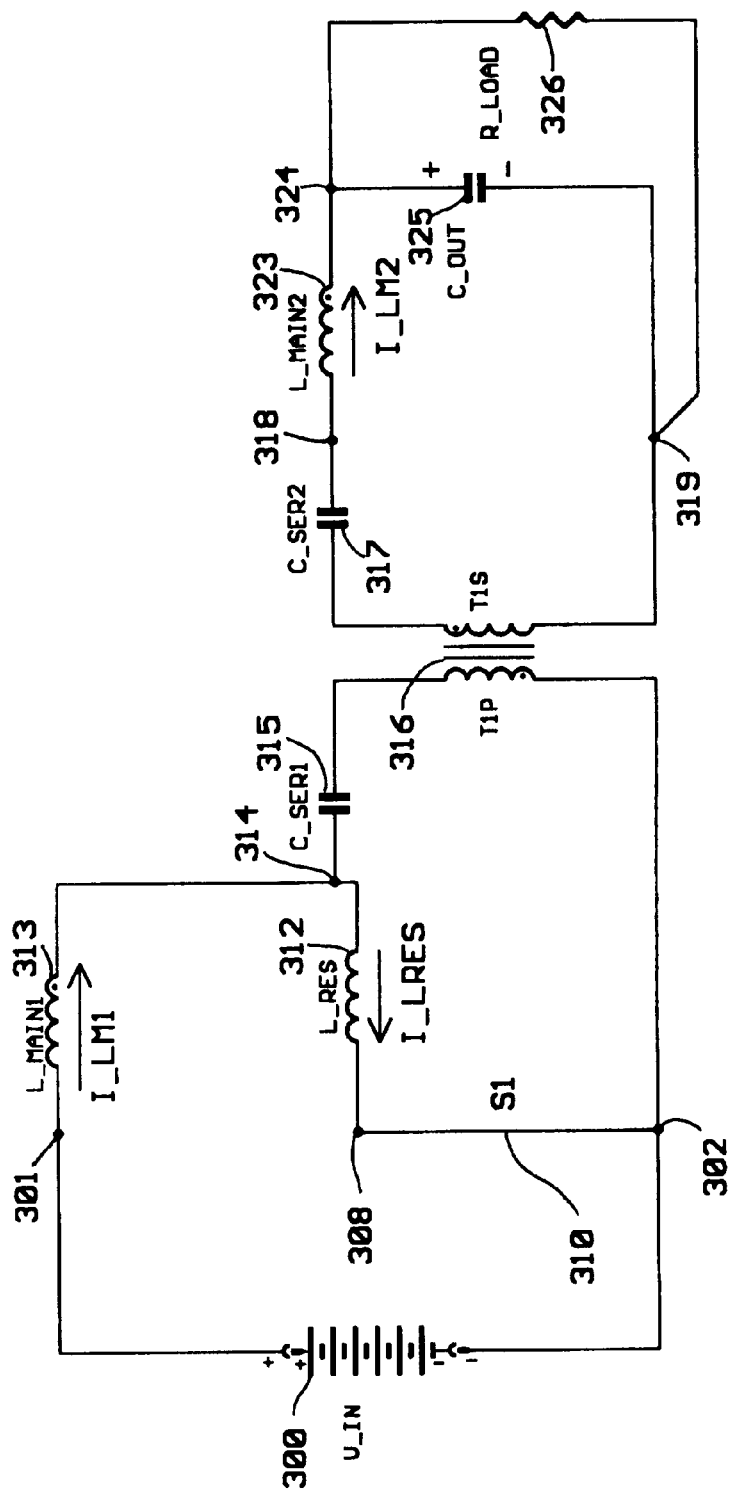

FIG. 53 illustrates the on state and the initial condition of the FIG. 50 circuit.

Figure 54:
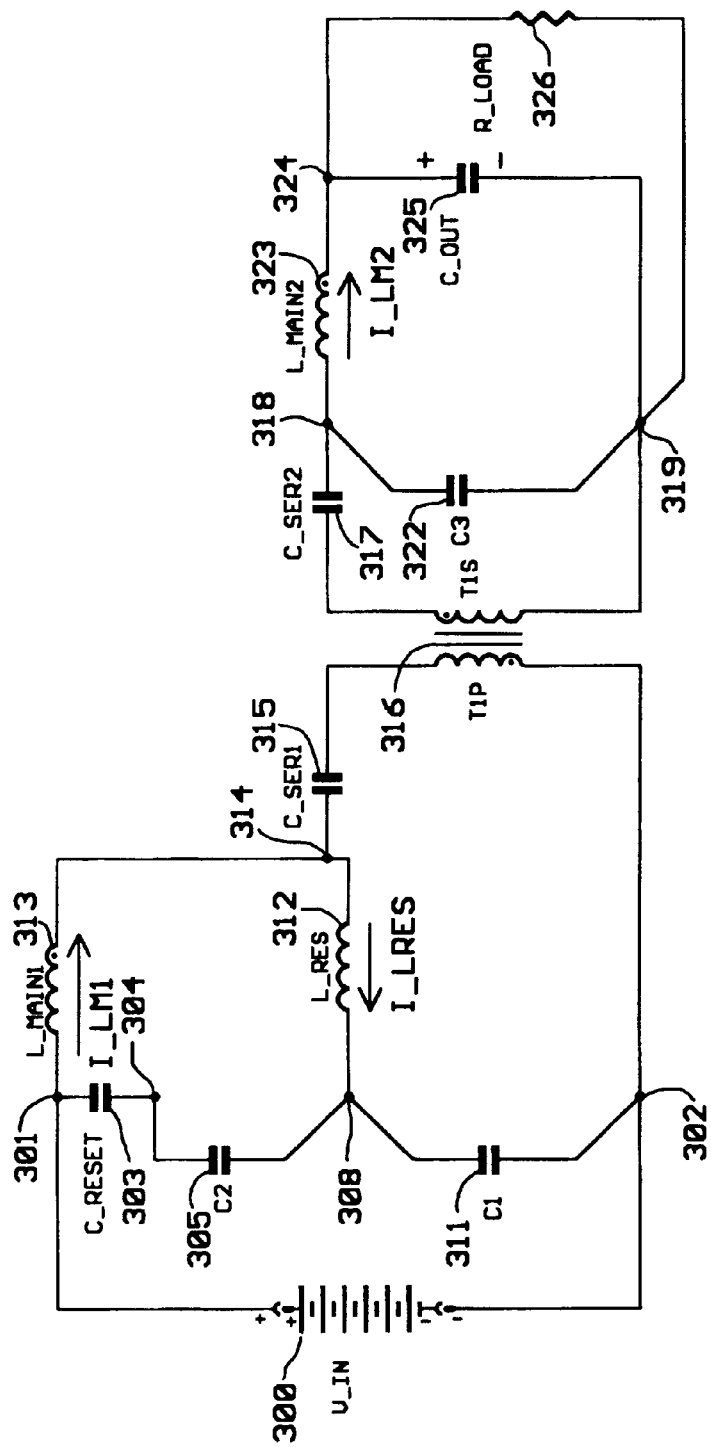

FIG. 54 illustrates the first phase of the turn off transition of the FIG. 50 circuit.

Figure 55:
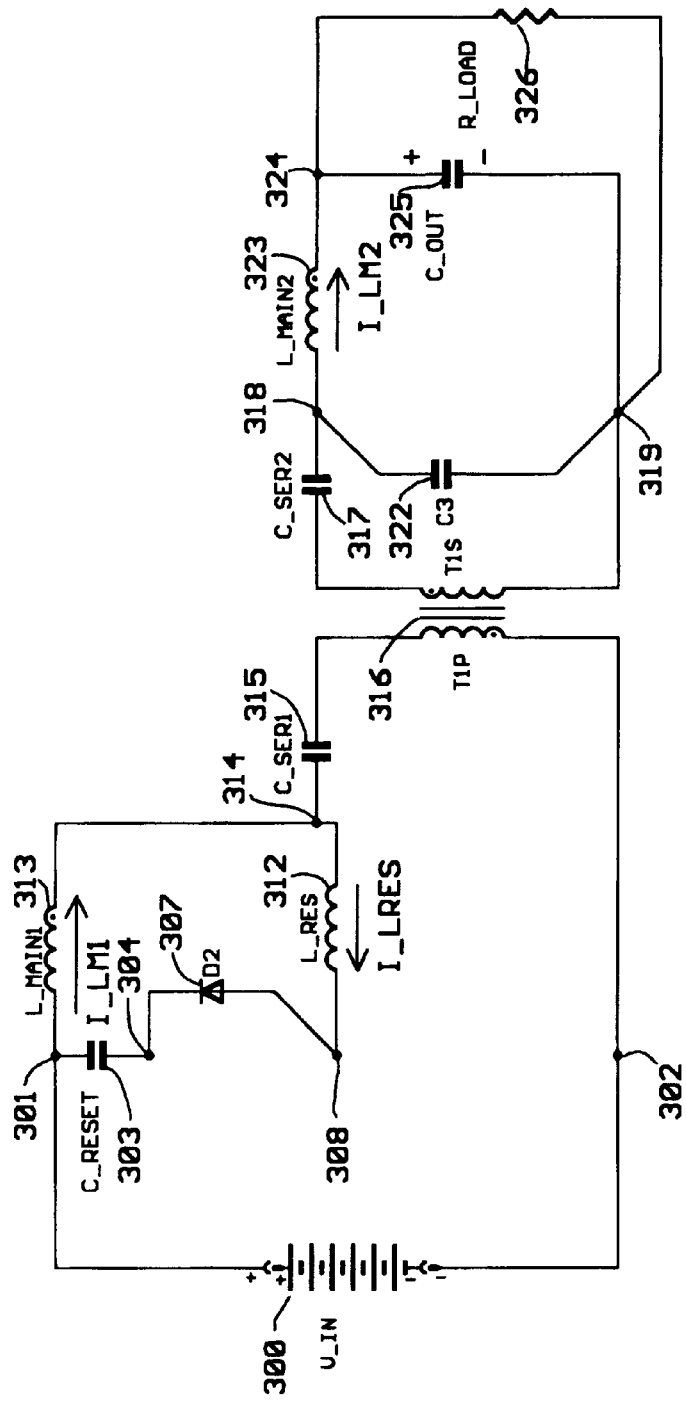

FIG. 55 illustrates the second phase of the turn off transition of the FIG. 50 circuit.

Figure 56:
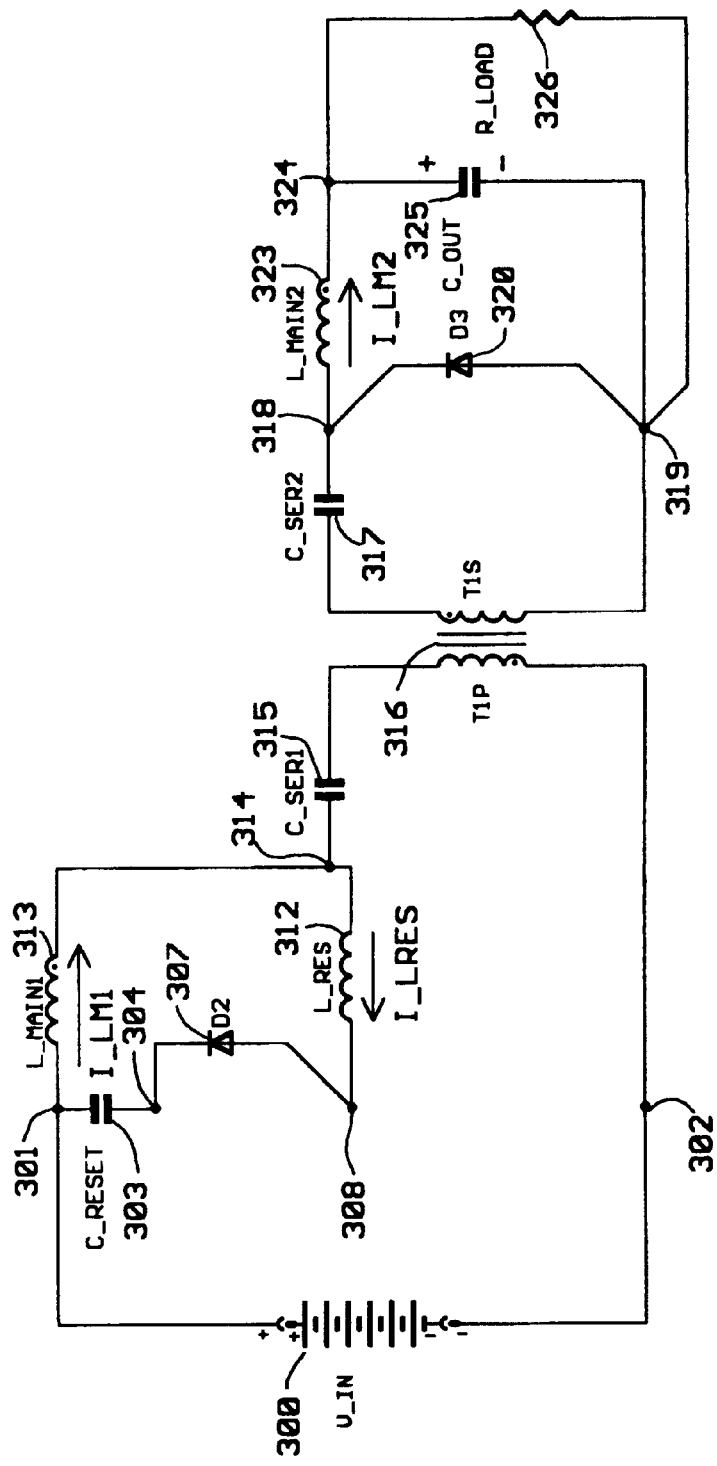

FIG. 56 illustrates the third phase of the turn off transition of the FIG. 50 circuit.

Figure 57:
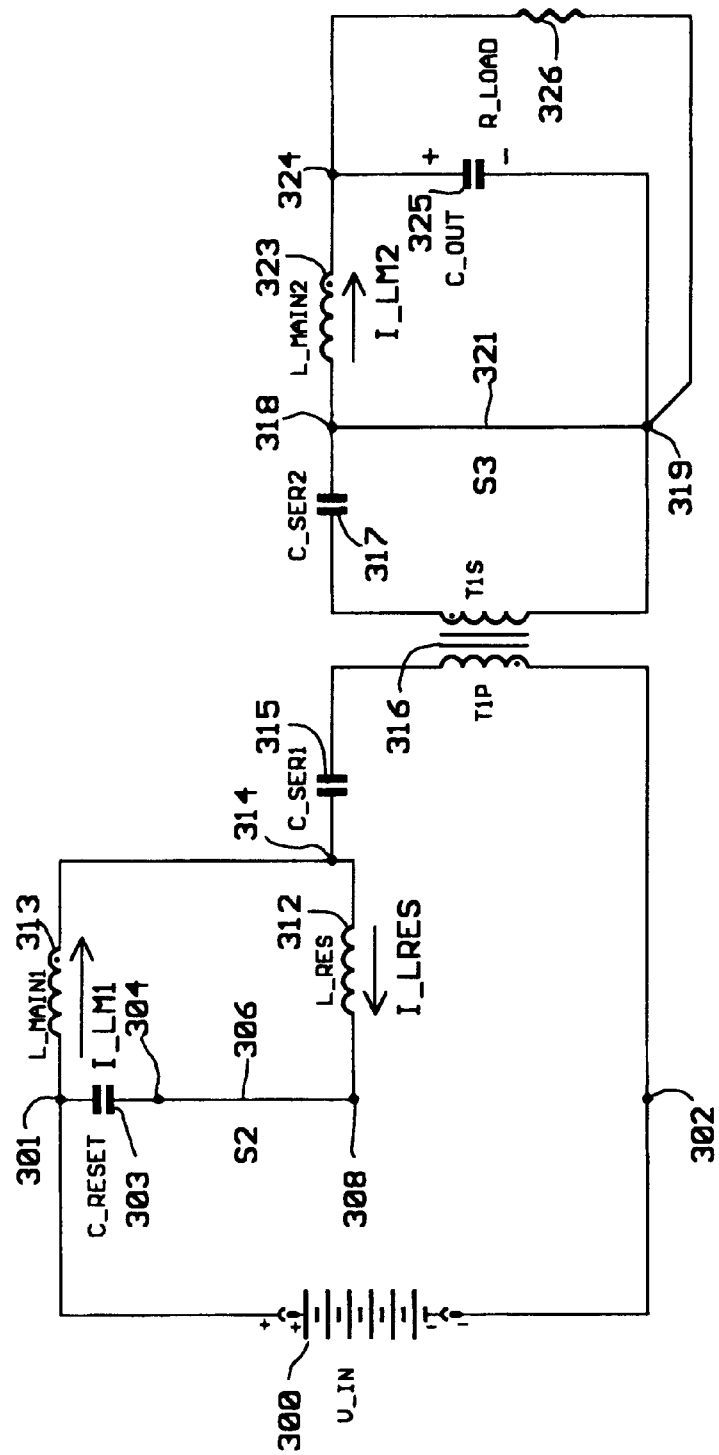

FIG. 57 illustrates the off state of the FIG. 50 circuit.

Figure 58:
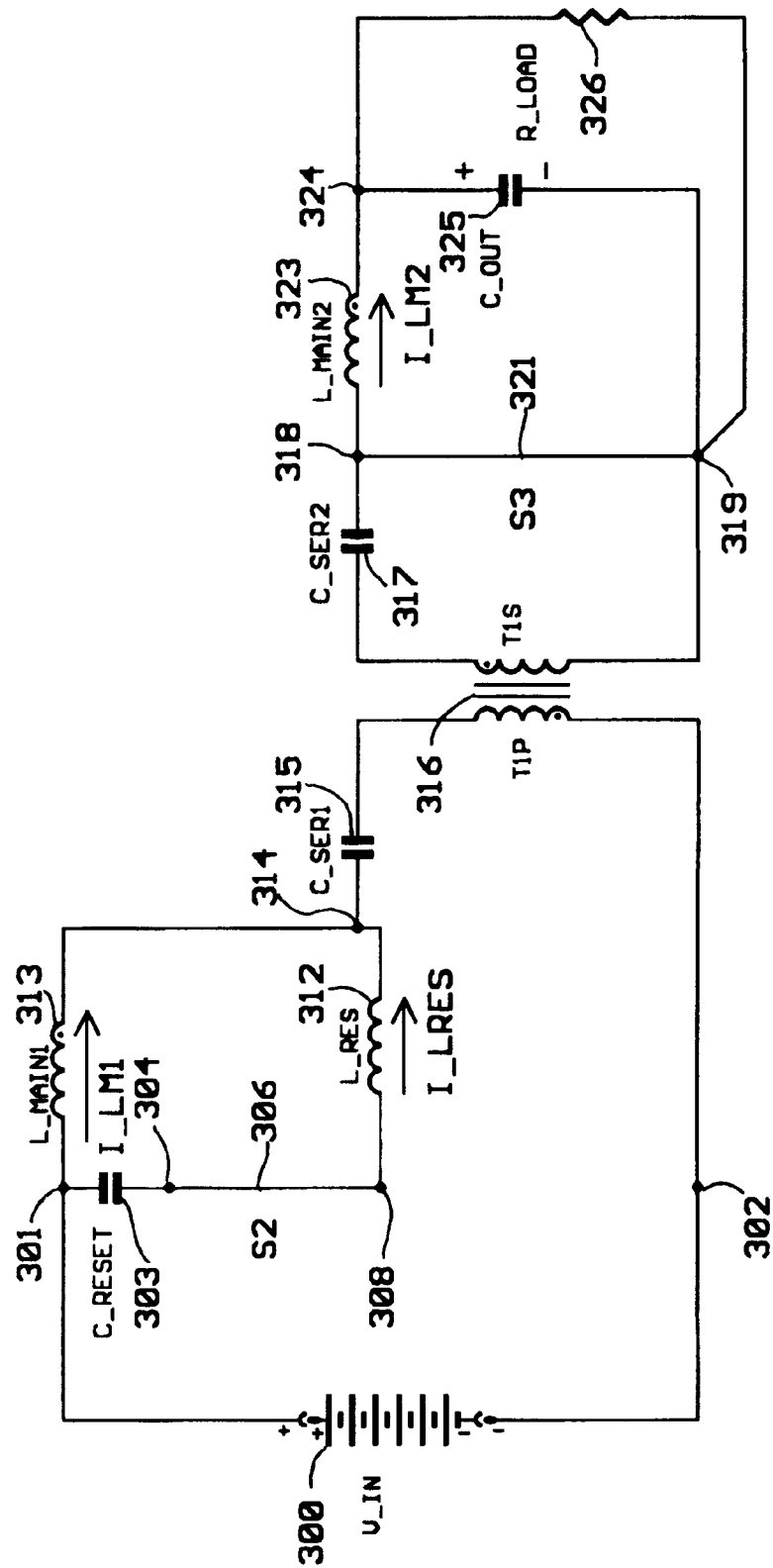

FIG. 58 is another illustration of the off state of the FIG. 50 circuit.

Figure 59:
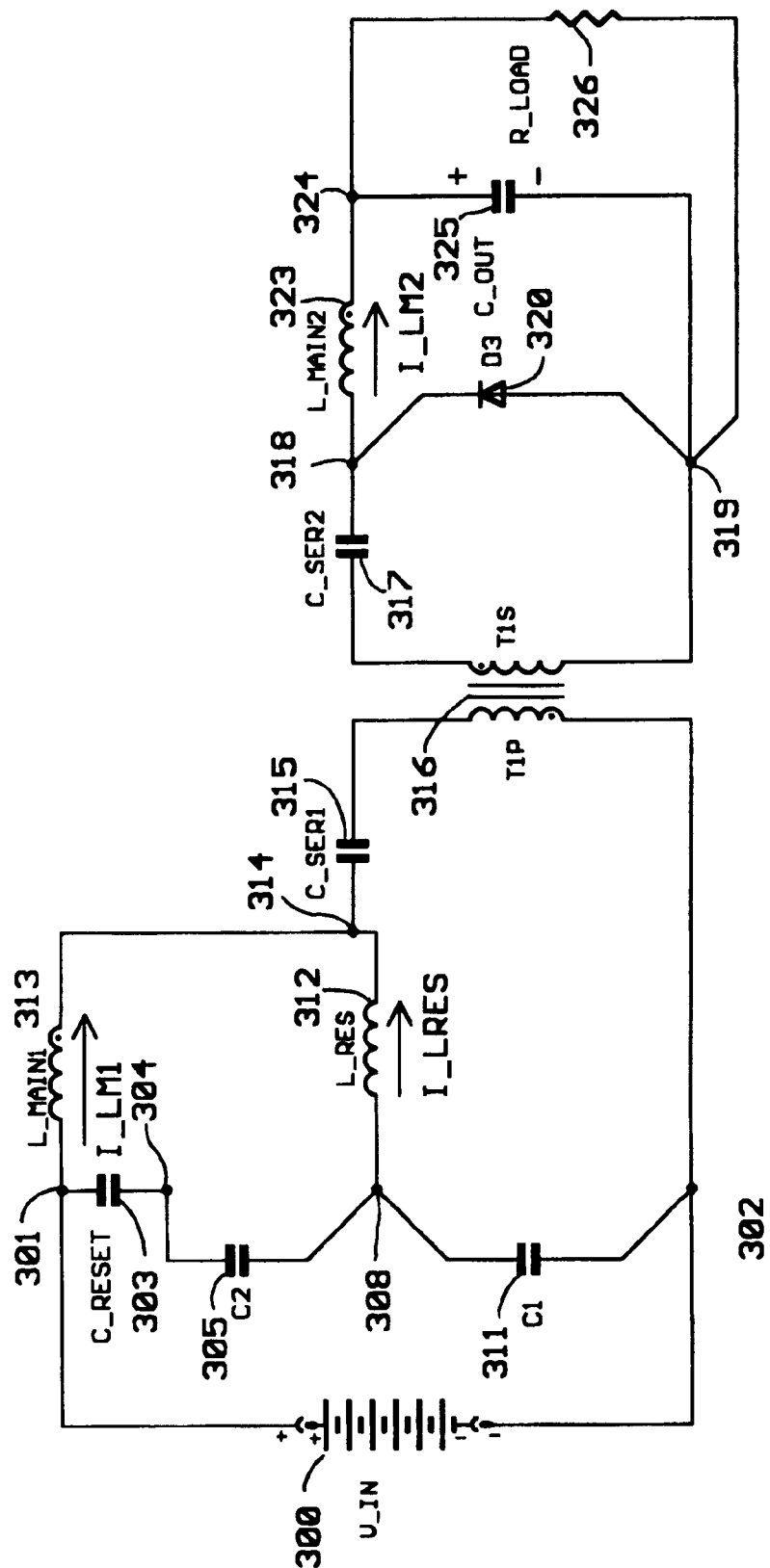

FIG. 59 illustrates the first phase of the turn on transition of the FIG. 50 circuit.

Figure 60:
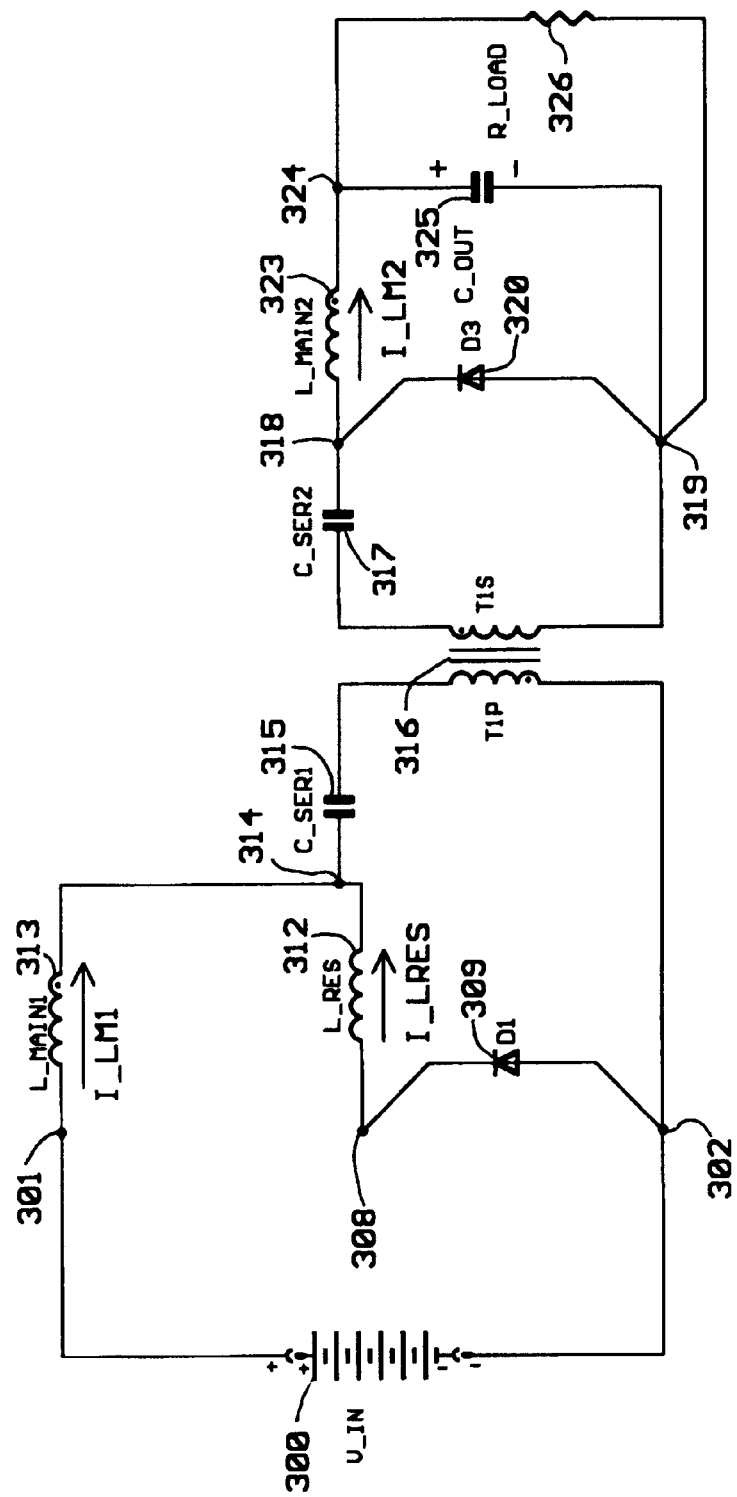

FIG. 60 illustrates the second phase of the turn on transition of the FIG. 50 circuit.

Figure 61:
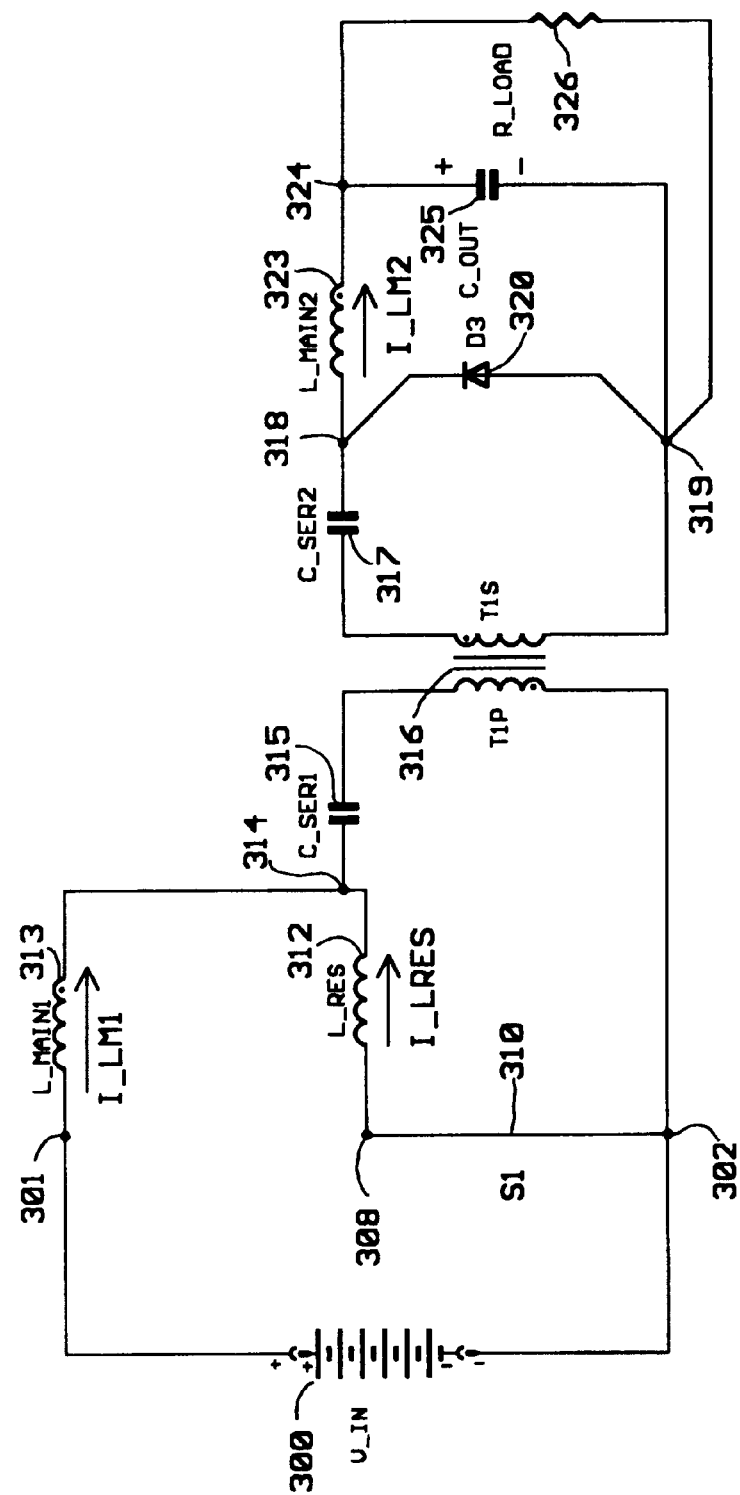

FIG. 61 illustrates the third phase of the turn on transition of the FIG. 50 circuit.

Figure 62:
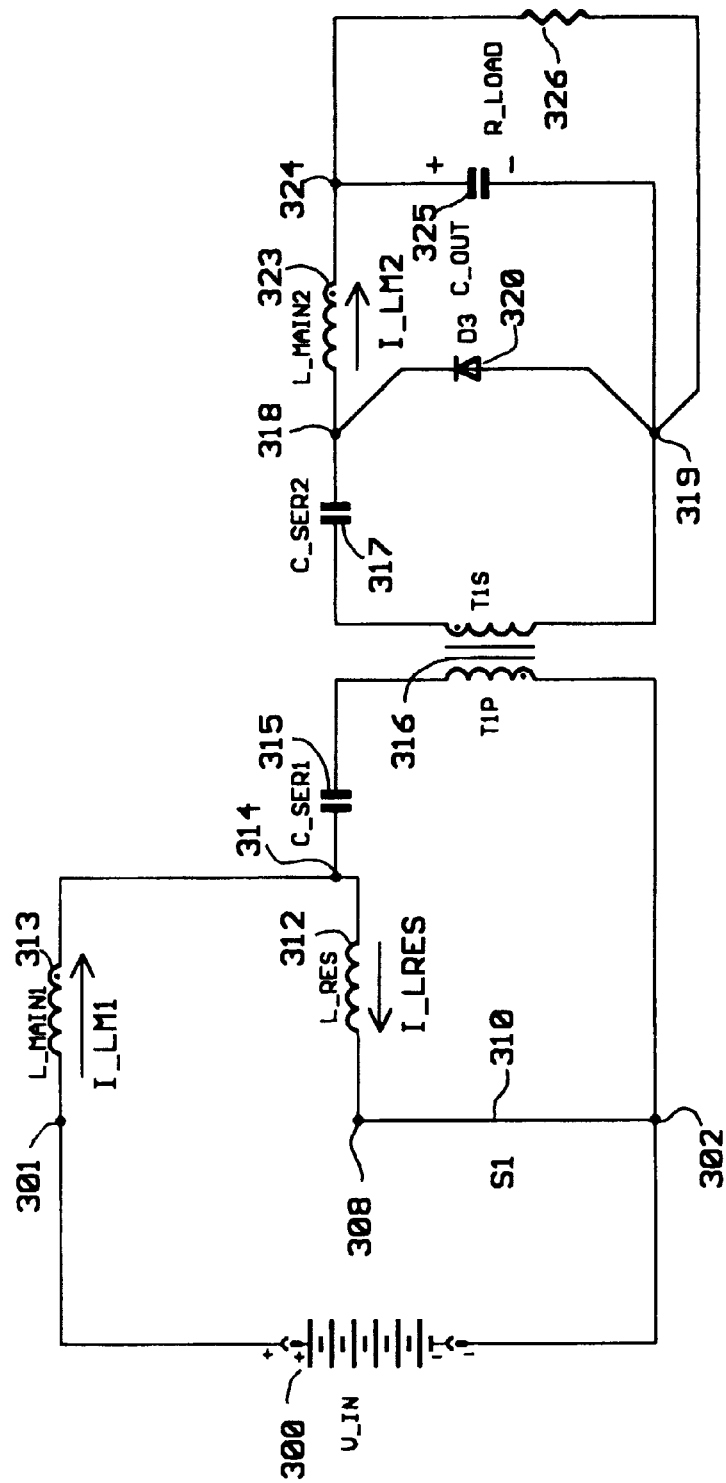

FIG. 62 illustrates the fourth phase of the turn on transition of the FIG. 50 circuit.

Figure 63:
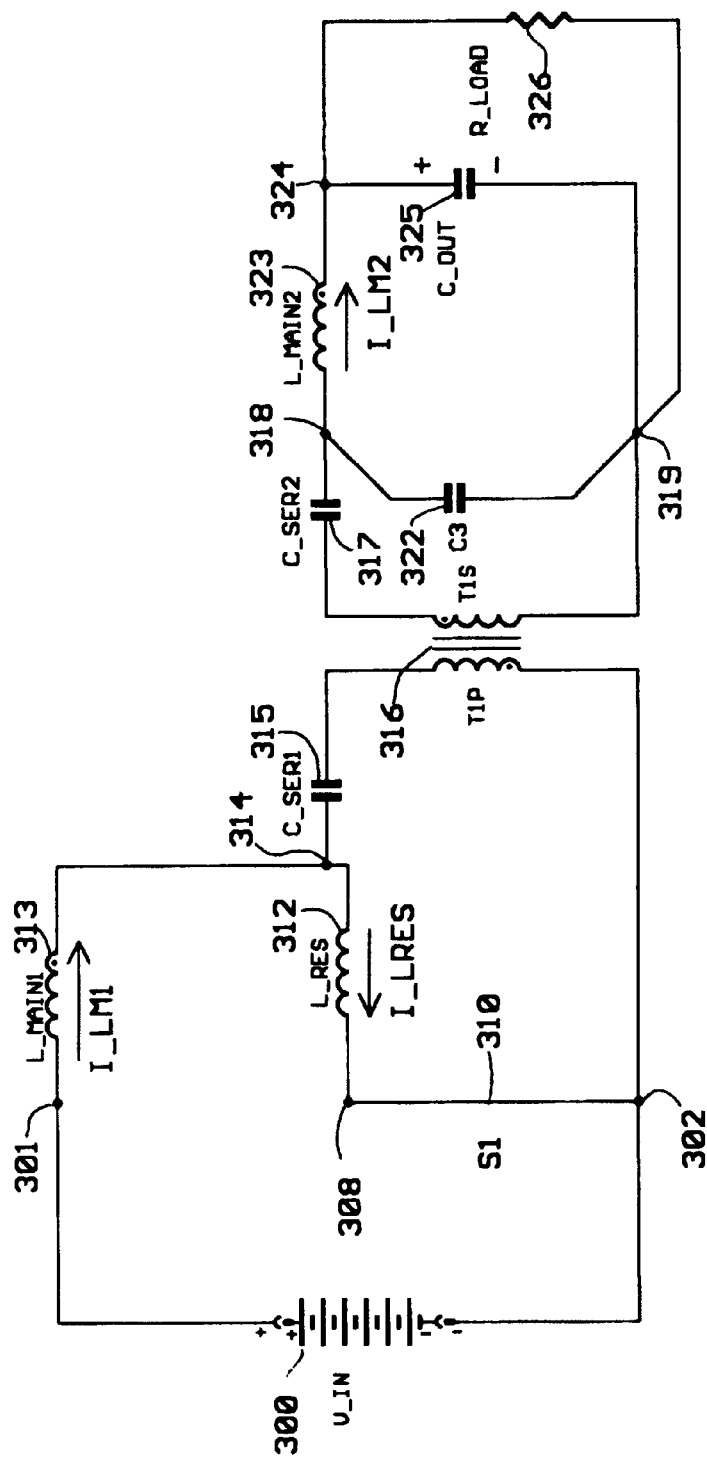

FIG. 63 illustrates the fifth phase of the turn on transition of the FIG. 50 circuit.

Figure 64:
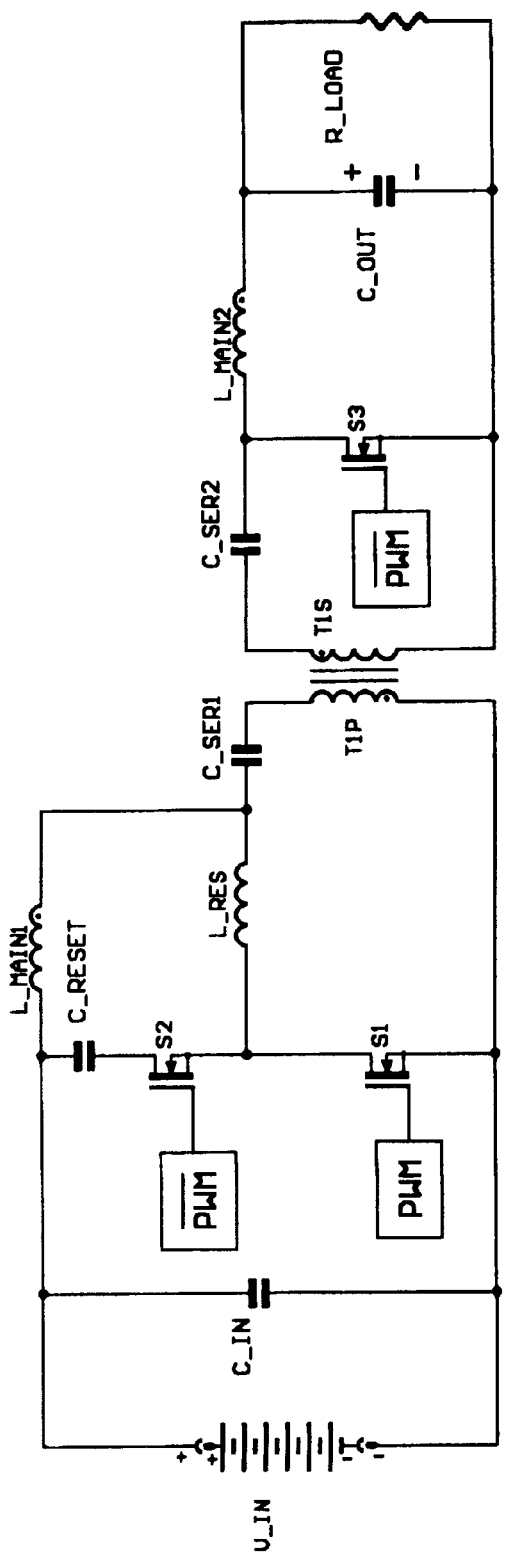

FIG. 64 illustrates an embodiment of the FIG. 50 circuit in which all three switches are implemented using power mosfets.

Figure 65:
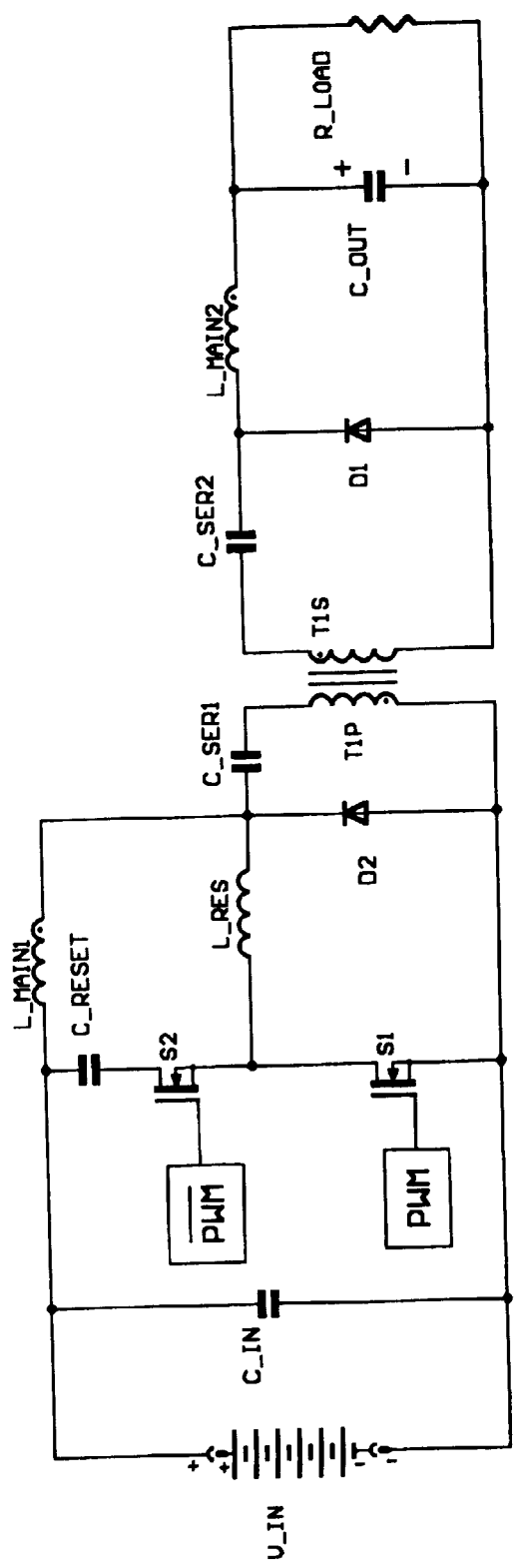

FIG. 65 illustrates a variation of the FIG. 64 circuit which uses a diode for the third switch and is augmented with a clamp diode.

Figure 66:
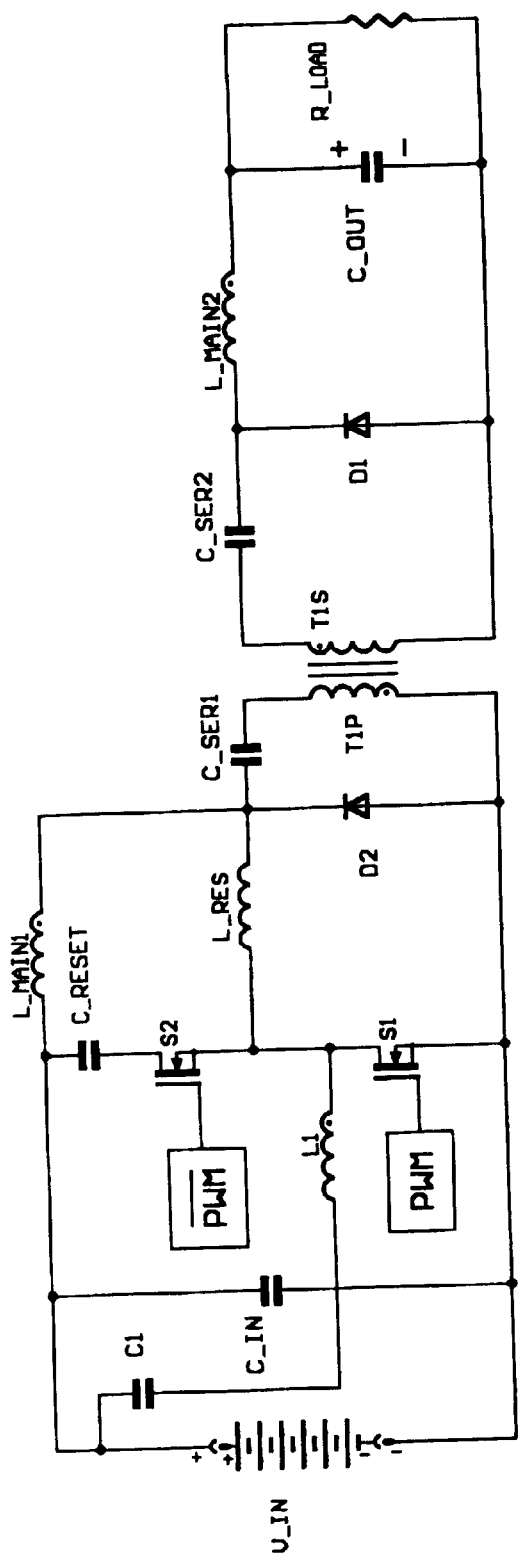

FIG. 66 illustrates the FIG. 65 circuit augmented with a LC tank circuit.

Figure 67:
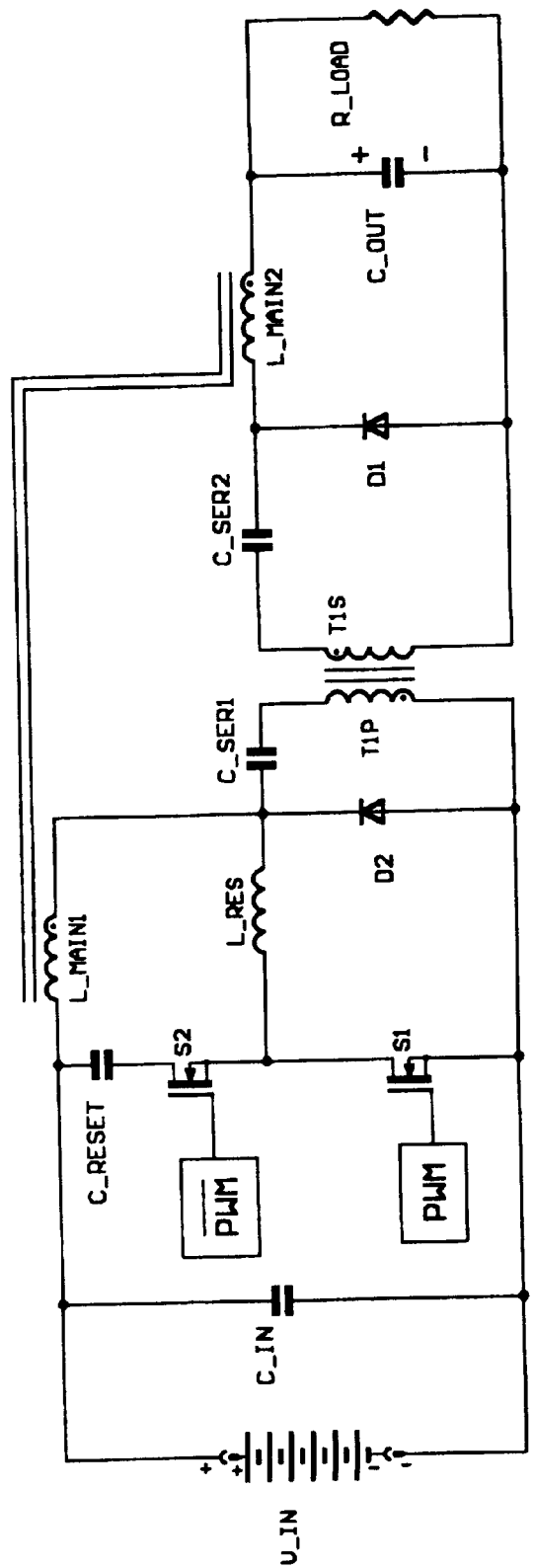

FIG. 67 illustrates the FIG. 65 circuit wherein the two main chokes are integrated on a common core.

| Reference Numerals | | | |
|---|---|---|---|
| 100 | DC input voltage source | 101 | node |
| 102 | node | 103 | lead |
| 104 | lead | 105 | node |
| 106 | node | 107 | capacitor |
| 108 | switch | 109 | diode |
| 110 | capacitor | 111 | switch |
| 112 | diode | 113 | node |
| 114 | node | 115 | lead |
| 116 | lead | 117 | node |
| 118 | inductor | 119 | node |
| 120 | lead | 121 | node |
| 122 | capacitor | 123 | switch |
| 124 | diode | 125 | inductor |
| 126 | lead | 127 | node |
| 128 | node | 129 | capacitor |
| 130 | load | 131 | capacitor |
| 132 | capacitor | 133 | node |
| 200 | DC input voltage source | 201 | node |
| 202 | node | 203 | capacitor |
| 204 | inductor | 205 | node |
| 206 | diode | 207 | switch |
| 208 | capacitor | 209 | node |
| 210 | diode | 211 | switch |
| 212 | capacitor | 213 | node |
| 214 | lead | 215 | lead |
| 216 | node | 217 | inductor |
| 218 | node | 219 | capacitor |
| 220 | node | 221 | inductor |
| 222 | diode | 223 | switch |
| 224 | capacitor | 225 | lead |
| 226 | node | 227 | lead |
| 228 | node | 229 | capacitor |
| 230 | load | 231 | node |
| 300 | DC input voltage source | 301 | node |
| 302 | node | 303 | capacitor |
| 304 | node | 305 | capacitor |
| 306 | switch | 307 | diode |
| 308 | node | 309 | diode |
| 310 | switch | 311 | capacitor |
| 312 | inductor | 313 | inductor |
| 314 | node | 315 | capacitor |
| 316 | transformer | 317 | capacitor |
| 318 | node | 319 | node |
| 320 | diode | 321 | switch |
| 322 | capacitor | 323 | inductor |
| 324 | node | 325 | capacitor |
| 326 | load | | |

SUMMARY

The subject invention uses a generalized active reset switching cell consisting of two switches, a capacitor, and a small inductor in a variety of converter topologies as a substitute for the main switch to form zero voltage switching converters with similar properties to the original hard switching forms of the converters, except that first order switching losses are eliminated. During the off time of each switching cycle the current in the small inductor of the generalized cell reverses direction so that there is energy available in the small inductor to drive every switching transition.

DESCRIPTION OF THE PREFERRED EMBODIMENTS

Figure 1:
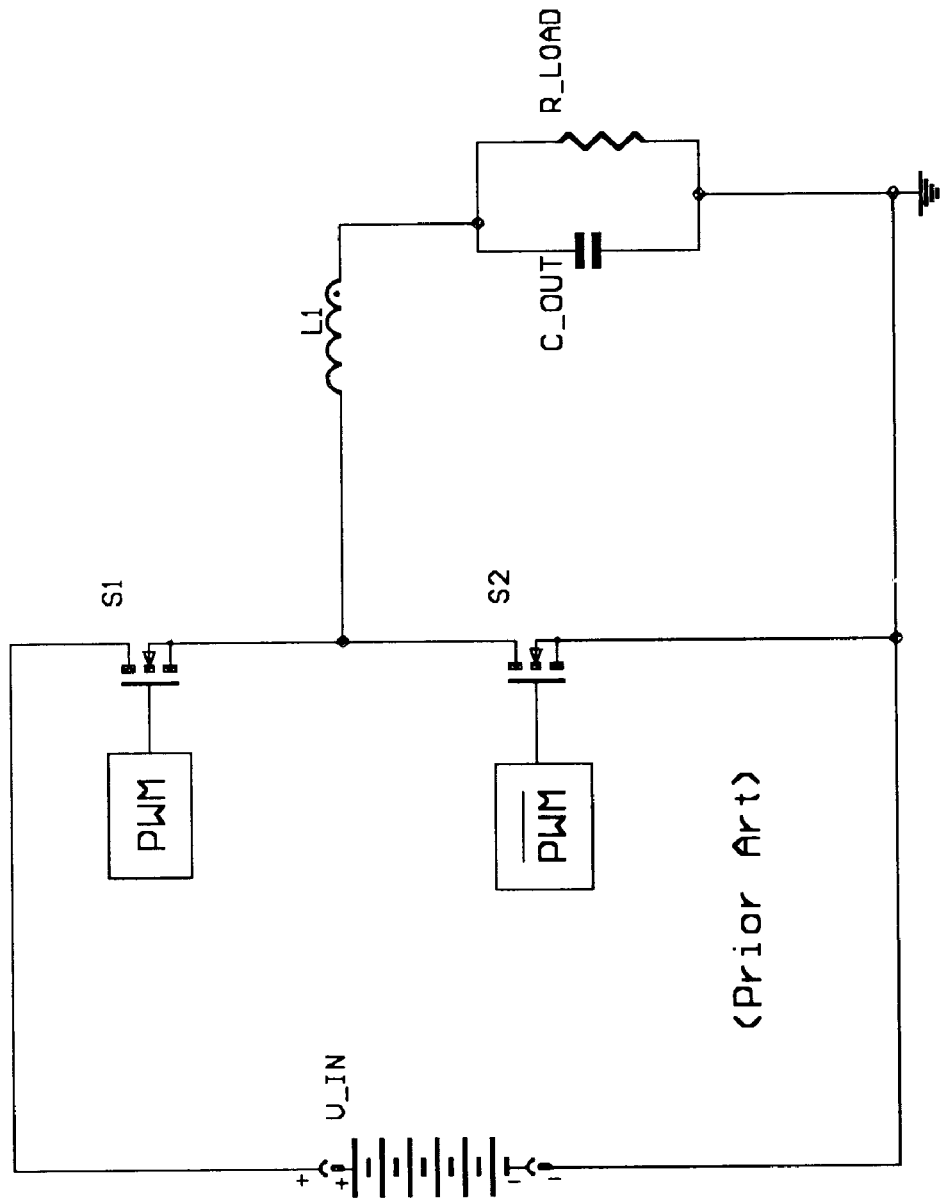
FIG. 1 illustrates a circuit schematic drawing of a prior art zero voltage switching buck converter in which the inductor current is reversed each cycle in order to provide a properly directed current for driving a zero voltage switching transition.
Figure 2:
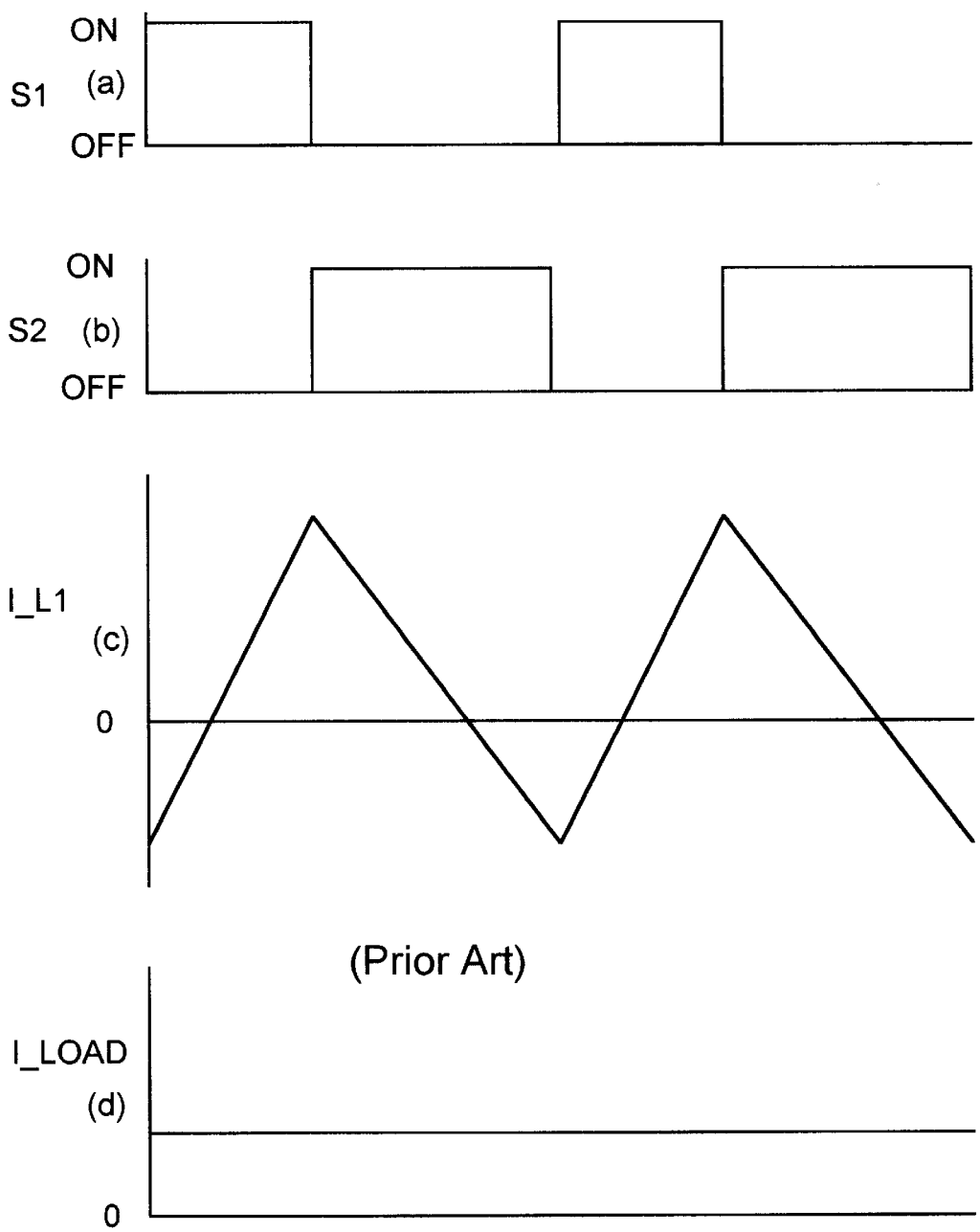
FIG. 2 illustrates the switch timing and current wave forms of the FIG. 1 circuit.
Figure 3:
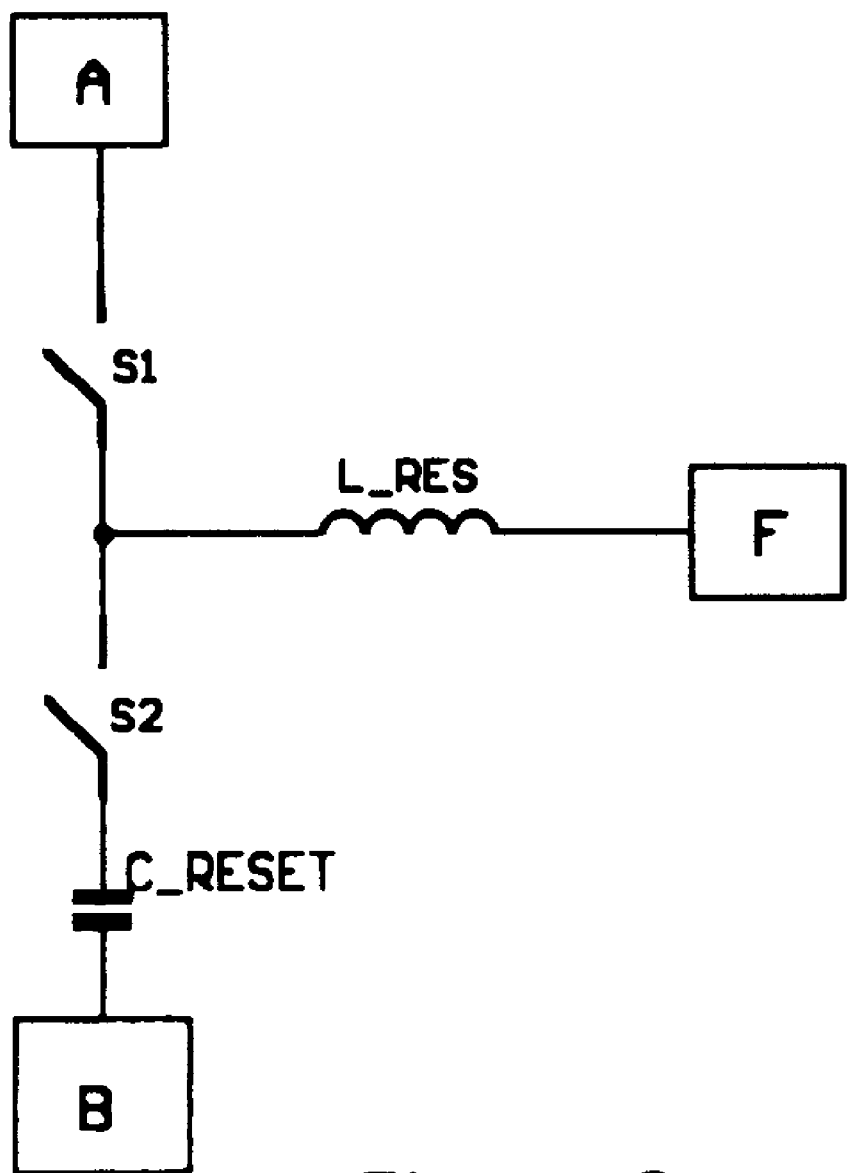
FIG. 3 illustrates the generalized active reset zero voltage switching cell of the subject invention.

FIG. 3 illustrates a generalized active reset switching cell which can be used to provide zero voltage switching to a wide variety of hard switching converter topologies. FIG. 4 illustrates a generalized single inductor power converter based on the generalized active reset switching cell which can be made to be either a buck, boost, or buck boost converter by appropriate selection of connection of the terminals. Table 1 indicates how the terminals of the FIG. 4 circuit are connected to form the buck, boost, and buck boost topologies. FIG. 5 illustrates a buck converter using the generalized active reset switching cell. FIG. 6 illustrates a boost converter using the generalized active reset switching cell. FIG. 7 illustrates a buck boost converter using the generalized active reset switching cell. FIG. 8 illustrates an improvement to the switching cell that provides a clamp for potential ringing that would occur at the junction of the diode and the inductor when switch 3 is off (open). FIG. 9 illustrates a generalized power converter based on the modified generalized switching cell of FIG. 8. Table 1 can be used with the FIG. 9 circuit to determine how to configure the basic switching converter types. FIG. 10 illustrates a buck converter based on the modified generalized active reset switching cell.

Referring to FIG. 11, there is shown a series type power processing topology. The circuit employs a source of substantially DC voltage, a switching network consisting of three switches, a reset capacitor, a small resonator inductor, a main choke, a main filter capacitor, an input capacitor, and a load. For purposes of the operational state analysis, it is assumed that the reset and output filter capacitors are sufficiently large that the voltages developed across the capacitors are approximately constant over a switching interval. It is also assumed that the main choke is sufficiently large that the current in the main choke is approximately constant over a switching cycle. Also for purposes of the operational state analysis, it is assumed that the input DC voltage source has sufficiently low source impedance that the voltage developed across the input DC voltage source is approximately constant over a switching interval. It will be assumed that the parasitic capacitors that parallel the switches are small and their effects can be ignored, except during the switching transitions. It will be assumed that diodes are ideal and have no leakage and no forward voltage drop. It will finally be assumed that the power switches are ideal; that is, lossless and able to carry current in either direction.

Structure

The structure of the circuit of the subject invention is shown in FIG. 11. A positive terminal of an input source of DC potential 100 is connected to a node 101. A negative terminal of source 100 is connected to a node 102. A first terminal of an input capacitor 131 is connected to the node 101. A second terminal of capacitor 131 is connected to node 102. A lead 103 is connected to node 101 and a node 105. A lead 104 is connected to node 102 and to a node 106. A first terminal of a capacitor 107 is connected to node 105. A second terminal of capacitor 107 is connected to a node 113. A first terminal of a switch 108 is connected to node 105. A second terminal of a switch 108 is connected to node 113. A cathode terminal of a diode 109 is connected to node 105. An anode terminal of diode 109 is connected to node 113. A first terminal of a reset capacitor 132 is connected to node 106. A second terminal of capacitor 132 is connected to a node 133. A first terminal of a capacitor 110 is connected to node 133. A second terminal of capacitor 110 is connected to a node 114. A first terminal of a switch 111 is connected to node 133. A second terminal of switch 111 is connected to node 114. An anode terminal of a diode 112 is connected to node 133. A cathode terminal of diode 112 is connected to node 114. A lead 115 is connected to node 113 and to a node 117. A lead 116 is connected to node 114 and to node 117. A first terminal of an inductor 118 is connected to node 117. A second terminal of inductor 118 is connected to a node 119. A lead 120 is connected to node 106 and to a node 121. An anode terminal of a diode 124 is connected to node 121. A cathode terminal of diode 124 is connected to node 119. A first terminal of a switch 123 is connected to node 121. A second terminal of switch 123 is connected to node 119. A first terminal of a capacitor 122 is connected to node 121. A second terminal of capacitor 122 is connected to node 119. A first terminal of a choke 125 is connected to node 119. A second terminal of choke 125 is connected to a node 127. A lead 126 is connected to node 121 and to a node 128. A first terminal of a capacitor 129 is connected to node 127. A second terminal of capacitor 129 is connected to node 128. A first terminal of a load 130 is connected to node 127. A second terminal of load 130 is connected to node 128.

Operation

It is assumed in this analysis that the system has reached a settled operating condition. Except for the short, but finite, switching intervals there are two states of the circuit of FIG. 11, an on state and an off state. It is also assumed, for purpose of analysis, that the switching intervals between the states are approximately zero seconds and that capacitors 107, 110, and 122 are small and do not contribute significantly to the operation of the converter, except during the brief switching transitions. It is also assumed that the capacitors 131, 132, and 129 are large and the voltages on these capacitors are constant over a switching cycle.

In operation consider an initial condition, illustrated in FIG. 13, in which the switch 108 is on and the other two switches are off. Current flows through the two inductors, 118 and 125 to the load and stored energy and current in the two inductors is increasing in magnitude, as indicated in FIGS. 12d and 12e. The current wave forms of the switches are illustrated in FIGS. 12a, 12b, and 12c. At a time determined by the control circuit the switch 108 is turned off (opened), as illustrated in FIG. 14. During the interval illustrated by FIG. 14 capacitor 107 is charged while the capacitors 110 and 122 are discharged, due to the currents and stored energies in the inductors 118 and 125, as the voltages at nodes 117 and 119 fall, until the diode 112 is forward biased as illustrated in FIG. 15. After diode 112 turns on the voltage at node 117 is clamped by diode 112, but the voltage at node 119 continues to fall until diode 124 becomes forward biased, as illustrated in FIG. 16. Shortly after diode 124 begins to conduct switches 111 and 123 are turned on (closed), as illustrated in FIG. 17. The circuits of FIGS. 17 and 18 represent the off state of the converter. During the off state the voltage applied to the small inductor 118 causes its current to decrease to zero and then increase in the negative direction, as illustrated in FIG. 18 and FIG. 12d. During the off state all of the energy stored in the inductor 118 is transferred to the capacitor 132 and back to the inductor 118 so that the energy stored in the inductor 118 is the same at the end of the off state as it was at the beginning of the off state, but the current in the inductor 118 is reversed. At the end of the off state as determined by the control circuit the switches 111 and 123 are turned off (opened) as illustrated in FIG. 19. When switch 123 is turned off the current in inductor 125 forces the diode 124 to conduct again. When switch 111 is turned off the current in inductor 118 forces current into capacitors 107 and 110 so that capacitor 110 is charged and capacitor 107 is discharged until the diode 109 is forward biased, as illustrated in FIG. 20. Shortly after diode 109 begins to conduct switch 108 is turned on (closed), as illustrated in FIG. 21. The applied voltage to the inductor 118 is now large and equal to the source 100 voltage V_IN, so that the current in the small inductor 118 changes rapidly in both magnitude and direction, as illustrated in FIG. 22 and FIG. 12d, until the current in the inductor 118 is equal to the current in inductor 125, at which time the current in diode 124 becomes zero and the voltage at node 119 begins to rise charging capacitor 124, as indicated in FIG. 23. The voltage at node 119 will rise until the voltage reaches the level of the source 100 voltage. The converter is now in the state of the initial condition as illustrated in FIG. 13, which represents the on state of the converter. During the full cycle of operation each of the three switches were turned on and off at zero voltage.

Related Embodiments

FIG. 24 illustrates an embodiment of the FIG. 11 circuit in which the switches S1 and S2 are implemented with power mosfets and the switch S3 is implemented with a diode.

FIG. 25 illustrates an embodiment of the FIG. 11 circuit similar to the FIG. 24 circuit except that the switch S3 is implemented with a power mosfet and a diode D1 is added to clamp potential ringing associated with L_RES and C3, where C3 is the parasitic output capacitance of S3.

FIG. 26 is another embodiment of the FIG. 11 circuit in which an LC tank circuit is added to the generalized switching cell. The tank circuit consisting of L1 and C1 in series provides additional energy and current for driving the switching transitions while L_RES is also providing some energy and a delay since the time required by L_RES to reverse its current is small but not zero. The additional current provided by the tank circuit reduces the size and cost of the L_RES inductor and also reduces the insertion loss associated with L_RES. The tank circuit reduces the transition time and reduces the value of L_RES thereby enabling higher effective duty cycles and enabling effective converter operation at lower line voltages. Reducing the value of the inductor L_OUT has a similar effect as adding the tank circuit and has the additional benefit of reducing the size and cost of the inductor. The value of reducing the value of L_OUT must be weighed against the cost of reducing L_OUT in additional output filter capacitance required to obtain the desired output ripple performance.

FIG. 27 shows another embodiment of the subject invention in which the components are arranged to form a boost converter. The operation of the generalized switching cell is identical to the buck converter, described in detail above, but the circuit is arranged so that the main choke is connected to the input's positive terminal and the main switch is connected to the negative terminal of the input, as indicated in table 1.

FIG. 28 shows another embodiment of the subject invention in which the components are arranged to form a buck boost converter. The operation of the generalized switching cell is identical to the buck converter, described in detail above, but the circuit is arranged so that the main choke is connected to the input's negative terminal, which is also the output's positive terminal, as indicated in table 1.

Structure

The structure of the circuit of the subject invention is shown in FIG. 29. A positive terminal of a source 200 of DC potential is connected to a node 201. A negative terminal of source 200 is connected to a node 202. A first terminal of a capacitor 203 is connected to node 201. A second terminal of capacitor 203 is connected to a node 205. A first terminal of a first main inductor 204 is connected to node 201. A second terminal of inductor 204 is connected to a node 218. A cathode terminal of a diode 206 is connected to node 205. An anode terminal of diode 206 is connected to a node 209. A first terminal of a switch 207 is connected to node 205. A second terminal of switch 207 is connected to node 209. A first terminal of a capacitor 208 is connected to node 205. A second terminal of capacitor 208 is connected to node 209. An anode terminal of a diode 210 is connected to node 202. A cathode terminal of diode 210 is connected to a node 213. A first terminal of a switch 211 is connected to node 202. A second terminal of switch 211 is connected to node 213. A first terminal of a capacitor 212 is connected to node 202. A second terminal of capacitor 212 is connected to node 213. Node 213 is connected to a lead 214. Lead 214 is connected to a node 216. Node 216 is connected to a lead 215. Lead 215 is connected to node 209. A first terminal of a small inductor 217 is connected to node 216. A second terminal of inductor 217 is connected to node 218. A first terminal of a capacitor 219 is connected to node 218. A second terminal of capacitor 219 is connected to a node 220. A lead 225 is connected to node 202. Lead 225 is connected to a node 226. An anode terminal of a diode 222 is connected to node 220. A cathode terminal of diode 222 is connected to node 226. A first terminal of a switch 223 is connected to node 220. A second terminal of switch 223 is connected to node 226. A first terminal of a capacitor 224 is connected to node 220. A second terminal of capacitor 224 is connected to node 226. A first terminal of a second main inductor 221 is connected to node 220. A second terminal of inductor 221 is connected to a node 228. A lead 227 is connected to node 226. Lead 227 is connected to a node 231. A first terminal of an output capacitor 229 is connected to node 228. A second terminal of capacitor 229 is connected to node 231. A first terminal of a load 230 is connected to node 228. A second terminal of load 230 is connected to node 231.

Operation

It is assumed in this analysis that the system has reached a settled operating condition. Except for the short, but finite, switching intervals there are two states of the circuit of FIG. 29, an on state and an off state. It is also assumed, for purpose of analysis, that the switching intervals between the states are approximately zero seconds and that capacitors 208, 212, and 224 are small and do not contribute significantly to the operation of the converter, except during the brief switching transitions. It is also assumed that the capacitors 203, 219, and 229 are large and the voltages on these capacitors are constant over a switching cycle. The circuit of FIG. 29 is a Cuk form of the subject invention based on the generalized active reset switching cell.

In operation consider an initial condition which is also the on state of the converter, illustrated in FIG. 32, in which the switch 211 is on and the other two switches are off. Current flows from the source 200 through the inductors 204 and 217 and through the switch 211. Current also flows from the output through the inductor 221 through the capacitor 219 through the inductor 217 and through the switch 211. During the on state the current in the switch 211 is increasing, as illustrated in FIG. 30a, and the currents in all three inductors are increasing as illustrated in FIGS. 31a, 31b, and 31c. At a time determined by the control circuit the switch 211 is turned off. The current flowing in the switch 211 is now diverted into the capacitors 208 and 212. At the time that the switch 211 is turned off the voltages at the node 216 begins to rise and the capacitor 208 begins to discharge as the capacitor 212 begins to charge. At the same time there is some discharging of the capacitor 224 as the voltage at the nodes 218 and 220 begin to rise. This condition is shown in FIG. 33. The voltages at the nodes 216, 218, and 220 continue to rise until the diode 206 becomes forward biased clamping the voltage at node 216. This condition is illustrated in FIG. 34. The voltage at the nodes 218 and 220 continue to rise until the diode 222 is forward biased, as illustrated in FIG. 35. Soon after diode 222 becomes forward biased the switches 207 and 223 are turned on, as illustrated in FIG. 36. FIG. 36 represents the off state of the converter. During the off state the current in the inductor 217 ramps down to zero then ramps up in the opposite direction to the same magnitude that it had at the beginning of the off state. This is illustrated in FIG. 37 and in FIG. 31c. During the off state all of the energy stored in the inductor 217 is transferred to the capacitor 203 and then the energy is transferred back to the inductor 217 so that the energy stored in the inductor 217 is the same at the end of the off state as it was at the beginning of the off state, but the current in the inductor 217 is reversed. At a time determined by the control circuit the switches 207 and 223 are turned off. The current in the inductor 217 is channeled into capacitors 208 and 212 charging capacitor 208 and discharging capacitor 212. During this time the current in the switch 223 is diverted into the diode 222, as illustrated in FIG. 38. When the voltage at node 216 falls to the level of the negative terminal of source 200 the diode 210 begins to conduct, as illustrated in FIG. 39. Soon after diode 210 begins to conduct switch 211 is turned on at zero voltage, as illustrated in FIG. 40. At this point there is a large voltage applied across inductor 217 so that the current in the inductor 217 is changing rapidly, as indicated in FIGS. 31c and 30a. The current in the inductor 217 will change sign, as illustrated in FIG. 41, and ramp up to the level of the sum of the currents in inductors 204 and 218. During this time interval the current in diode 222 is ramping down towards zero, as illustrated in FIG. 30c. When the current in the diode 222 reaches zero the voltages at the nodes 218 and 220 begins to drop as the capacitor 224 begins to charge, as illustrated in FIG. 42. When the voltage at node 218 reaches a level near the negative terminal of the source 200 the charging of capacitor 224 is complete and the circuit enters a first on state, which is the initial condition, as illustrated in FIG. 32. During the full cycle of operation each of the three switches were turned on and off at zero voltage.

Related Embodiments

FIG. 43 illustrates an embodiment of the FIG. 29 circuit in which all three of the switches are implemented with power mosfets.

FIG. 44 illustrates an embodiment of the FIG. 29 circuit similar to the FIG. 43 circuit except that the S3 switch is implemented with a diode and a diode D2 is added to clamp potential ringing associated with L_RES and C3, where C3 is the parasitic output capacitance of D1.

FIG. 45 illustrates another embodiment of the FIG. 29 circuit in which the positions of the output choke and output switch are rearranged to form a SEPIC form of the converter, rather than the Cuk form. The differences between the Cuk form and SEPIC form are well known to those skilled in the art of power conversion. One difference is that the Cuk form yields an output that is inverted with respect to the input and the output of the SEPIC form is non-inverted. Another difference is that the SEPIC relies on the output capacitor to hold up the load when the S3 switch is off.

FIG. 46 illustrates another embodiment in the SEPIC form of the invention with a clamp diode to prevent ringing of the output switch parasitic capacitance.

FIG. 47 illustrates another embodiment in the Cuk form of the invention with an LC tank circuit used to speed up the switching transitions and to reduce the value of the small inductor L_RES, thereby reducing the insertion loss of L_RES and enabling operation at lower line voltages.

FIG. 48 illustrates another embodiment of the invention in the Cuk form in which the two main chokes are coupled and integrated onto a single core.

FIG. 49 illustrates another embodiment of the invention in the SEPIC form in which the output inductor is replaced by a coupled inductor which provides for an output with galvanic isolation.

Structure

The structure of the circuit of the subject invention is shown in FIG. 50. A positive terminal of a DC input power source 300 is connected to a node 301. A negative terminal of source 300 is connected to a node 302. A first terminal of a capacitor 303 is connected to node 301. A second terminal of capacitor 303 is connected to a node 304. A cathode terminal of a diode 307 is connected to node 304. An anode terminal of diode 307 is connected to a node 308. A first terminal of a switch 306 is connected to node 304. A second terminal of switch 306 is connected to node 308. A first terminal of a capacitor 305 is connected to node 304. A second terminal of capacitor 305 is connected to node 308. A cathode terminal of a diode 309 is connected to node 308. An anode terminal of diode 309 is connected to node 302. A first terminal of a switch 310 is connected to node 308. A second terminal of switch 310 is connected to node 302. A first terminal of a capacitor 311 is connected to node 308. A second terminal of capacitor 311 is connected to node 302. A first terminal of an inductor 312 is connected to node 308. A second terminal of inductor 312 is connected to a node 314. A first terminal of an inductor 313 is connected to node 301. A second terminal of inductor 313 is connected to node 314. A first terminal of a capacitor 315 is connected to node 314. A second terminal of capacitor 315 is connected to an undotted terminal of a primary winding of a transformer 316. A dotted terminal of the primary winding of transformer 316 is connected to node 302. A dotted terminal of a secondary winding of transformer 316 is connected to a first terminal of a capacitor 317. An undotted terminal of the secondary winding of transformer 316 is connected to a node 319. A second terminal of capacitor 317 is connected to a node 318. A cathode terminal of a diode 320 is connected to node 318. An anode terminal of diode 320 is connected to node 319. A first terminal of a switch 321 is connected to node 318. A second terminal of switch 321 is connected to node 319. A first terminal of a capacitor 322 is connected to node 318. A second terminal of capacitor 322 is connected to node 319. A first terminal of an inductor 323 is connected to node 318. A second terminal of inductor 323 is connected to a node 324. A first terminal of a capacitor 325 is connected to node 324. A second terminal of capacitor 325 is connected to node 319. A first terminal of a load 326 is connected to node 324. A second terminal of load 326 is connected to node 319.

Operation

It is assumed in this analysis that the system has reached a settled operating condition. Except for the short, but finite, switching intervals there are two states of the circuit of FIG. 50, an on state and an off state. It is also assumed, for purpose of analysis, that the switching intervals between the states are approximately zero seconds and that capacitors 305, 311, and 322 are small and do not contribute significantly to the operation of the converter, except during the brief switching transitions. It is also assumed that the capacitors 303, 315, 317, and 325 are large and the voltages on these capacitors are constant over a switching cycle. The circuit of FIG. 50 is an implementation of the generalized active reset switching cell in the transformer coupled Cuk form.

In an initial condition illustrated in FIG. 53 the switch 310 is on and the switches 306 and 321 are off. Current is flowing from the source 300 through the inductor 313 through the inductor 312 through the switch 310 and back to the source 300. Current also flows in a loop consisting of the primary winding of transformer 316, the capacitor 315, the inductor 312, and the switch 310. The current in the primary winding of the transformer 316 flows out of the undotted terminal. A current is induced in the secondary winding of the transformer 316 which flows out of the dotted terminal, through the capacitor 317, through the inductor 323 to the load 326 and the output filter capacitor 325. The initial condition also represents a first on state of the converter during which time the currents in all three inductors is increasing as illustrated in FIGS. 52a, 52b and 52c. At a time determined by the control circuit the switch 310 is turned off, as illustrated in FIG. 54 and FIG. 51a. The current flowing in switch 310 is diverted to capacitors 311 and 305. During this time the voltage at node 308 rises as capacitor 311 charges and capacitor 305 discharges. During this time the voltage at node 314 begins to rise as the voltage at node 318 begins to fall and capacitor 322 begins to discharge. The voltage at node 308 rises up until the diode 307 becomes forward biased, as illustrated in FIG. 55. The voltage at node 314 rises up and the voltage at node 318 falls until the diode 320 becomes forward biased, as illustrated in FIG. 56. Shortly after diode 320 becomes forward biased switches 306 and 321 are turned on at zero voltage, as illustrated in FIG. 57. FIG. 57 represents the off state of the converter. During the off state the currents in inductors 313 and 323 are ramping down, as illustrated in FIGS. 52a and 52b. The current in inductor 312 is ramping down too, but at a much higher rate and the current in inductor 312 drops to zero, reverses, and climbs up to its magnitude at the beginning of the off state, as illustrated in FIG. 58 and FIG. 52c. During the off state all of the energy stored in the inductor 312 is transferred to the capacitor 303 and back to the inductor 312 so that the energy stored in the inductor 312 is the same at the end of the off state as it was at the beginning of the off state, but the current in the inductor 312 is reversed, as illustrated in FIGS. 58 and 52c. When the current in inductor 312 has reached its magnitude at the beginning of the off state the switches 306 and 321 are turned off, as illustrated in FIG. 59. The current from switch 306 is diverted into capacitors 305 and 311. The current from switch 321 is diverted into diode 320. During this time the voltage at node 308 falls as capacitor 311 is discharged and capacitor 305 is charged. When the voltage at node 308 falls to the level of the negative terminal of source 300 diode 309 becomes forward biased, as illustrated in FIG. 60. Soon after diode 309 turns on switch 310 is turned on at zero voltage, as illustrated in FIG. 61. The applied voltage on inductor 312 is now large so that its current is changing rapidly, as illustrated in FIGS. 52c, and the current in diode 320 is also ramping down rapidly. The current in inductor 312 reverses again as indicated in FIG. 62. When the current in diode 320 reaches zero it becomes reverse biased and the voltage at node 318 rises up charging capacitor 322, as illustrated in FIG. 63, as the voltage at node 314 falls toward the voltage of the negative terminal of source 300, at which time the circuit enters the on state as illustrated in FIG. 52, and a full cycle of operation has been completed.

Related Embodiments

FIG. 64 illustrates an embodiment of the FIG. 50 circuit in which all three of the switches are implemented with power mosfets.

FIG. 65 illustrates an embodiment of the FIG. 50 circuit similar to the FIG. 64 circuit except that the S3 switch is implemented with a diode, D1, and a diode, D2, is added to clamp potential ringing associated with L_RES and the parasitic capacitance of D1.

FIG. 66 illustrates another embodiment in which an LC tank circuit is added to speed the switching transition and reduce the value of L_RES and the associated insertion loss of L_RES, thereby enabling circuit operation at lower line voltages.

FIG. 67 illustrates an embodiment in which the input and output chokes are integrated into a single coupled inductor on a common core.

Additional Embodiments

Additional embodiments are realized by applying the generalized active reset switching cell to other converter topologies. The buck, boost, buck-boost, Cuk, and SEPIC converters are shown here as examples, but it is clear to one skilled in the art of power conversion that by extending the techniques illustrated and demonstrated here to other hard switching topologies that these other hard switching topologies can be converted from hard switching converters to soft switching converters with the elimination of first order switching losses.

CONCLUSION, RAMIFICATIONS, AND SCOPE OF INVENTION

Thus the reader will see that the power converters of the invention provide a mechanism which significantly reduces switching losses, has low component parts counts, and does not require high core losses, high output filter capacitance, or high conduction losses to accomplish zero voltage switching, relying on the energy stored in a small magnetic circuit element.

While my above description contains many specificities, these should not be construed as limitations on the scope of the invention, but rather as exemplifications of preferred embodiments thereof. Many other variations are possible. For example, interleaved, parallel power converters with two or more parallel converter sections; power converters arranged in a bridged configuration for amplifier and inverter applications; power converters similar to those shown in the drawings but which integrate individual magnetic circuit elements onto a single magnetic core; power converters similar to those shown but which have instead high AC ripple voltages on input filter capacitors; power converters, similar to those shown in the drawings, but where the DC input source is instead a varying rectified AC signal. Accordingly, the scope of the invention should be determined not by the embodiments illustrated, but by the appended claims and their legal equivalents.

I claim:

1. A power converter comprising
   an input coupleable to a source of DC potential,
   an output coupleable to a load,
   an active reset switching network comprising
      first switch means coupled to said input,
      a series network coupled to said first switch means comprising
         second switch means operable substantially in anti-synchronization to said first switch means,
         a first capacitor coupled in series to said second switch means,
      a first inductor coupled to said first switch means and said series network,
   a second inductor coupled to said active reset switching network,
   third switch means coupled to said first inductor and said output and operable substantially in synchronization with said second switch means,
   whereby said first inductor provides energy to drive a zero voltage turn on transition for said first switch means.

2. The power converter of claim 1 further comprising
   a rectifier diode coupled to said first switch means, said third switch means, said first inductor, and said input,
   whereby said rectifier diode clamps ringing associated with said first inductor and the parasitic capacitance associated with said third switch means during the time interval in which said third switch means is off (open).

3. A power converter comprising
   an input coupleable to a source of DC potential,
   an output coupleable to a load,
   an active reset switching network comprising
      first switch means coupled to said input,
      a series network coupled to said first switch means comprising
         second switch means operable substantially in anti-synchronization to said first switch means, a first capacitor coupled in series to said second switch means, a first inductor coupled to said first switch means and said series network, a second inductor coupled to said active reset switching network, a second capacitor coupled to said active reset switching network, a third inductor coupled to said second capacitor and said output, third switch means coupled to said second capacitor, said third inductor, and said output and operable substantially in synchronization with said second switch means, whereby said first inductor provides energy to drive a zero voltage turn on transition for said first switch means.

4. The power converter of claim 3 further comprising a rectifier diode coupled to said first switch means, said second capacitor, said first inductor, and said input, whereby said rectifier diode clamps ringing associated with said first inductor and the parasitic capacitance associated with said third switch means during the time interval in which said third switch means is off (open).

5. The power converter of claim 3 wherein said second and third inductors are mutually magnetically coupled on a common core.

6. A power converter comprising an input coupleable to a source of DC potential, an output coupleable to a load, an active reset switching network comprising first switch means coupled to said input, a series network coupled to said first switch means comprising second switch means operable substantially in anti-synchronization to said first switch means, a first capacitor coupled in series to said second switch means, a first inductor coupled to said first switch means and said series network, a second inductor connected to said active reset switching network a second capacitor coupled to said active reset switching network, a transformer with a primary winding coupled to said second capacitor, a third capacitor coupled to a secondary winding of said transformer, a third inductor coupled to said third capacitor and said load, third switch means coupled to said third capacitor, said third inductor, and said load, whereby said first inductor provides energy to drive a zero voltage turn on transition for said first switch means.

7. The power converter of claim 6 further comprising a rectifier diode coupled to said first switch means, said second capacitor, said first inductor, and said input, whereby said rectifier diode clamps ringing associated with said first inductor and the parasitic capacitance associated with said third switch means during the time interval in which said third switch means is off (open).

8. The power converter of claim 6 wherein said second and third inductors are mutually magnetically coupled on a common core.

* * * * *